US012035837B2

(12) United States Patent
Takahashi

(10) Patent No.: US 12,035,837 B2
(45) Date of Patent: Jul. 16, 2024

(54) ELECTRONIC DEVICE AND INFORMATION PROCESSING DEVICE

(71) Applicant: Ayako Takahashi, Saitama (JP)

(72) Inventor: Ayako Takahashi, Saitama (JP)

(*) Notice: Subject to any disclaimer, the term of this patent is extended or adjusted under 35 U.S.C. 154(b) by 1066 days.

(21) Appl. No.: 16/772,698

(22) PCT Filed: Dec. 13, 2018

(86) PCT No.: PCT/JP2018/045944
§ 371 (c)(1),
(2) Date: Sep. 8, 2020

(87) PCT Pub. No.: WO2019/117260
PCT Pub. Date: Jun. 20, 2019

(65) Prior Publication Data
US 2020/0405088 A1  Dec. 31, 2020

(30) Foreign Application Priority Data

Dec. 14, 2017 (JP) .................. 2017-239307

(51) Int. Cl.
*A47J 31/02* (2006.01)
*A47J 31/06* (2006.01)
*A47J 31/44* (2006.01)
*G06F 3/16* (2006.01)

(52) U.S. Cl.
CPC ........... *A47J 31/02* (2013.01); *A47J 31/0636* (2013.01); *A47J 31/446* (2013.01); *G06F 3/16* (2013.01)

(58) Field of Classification Search
CPC ...... A47J 31/02; A47J 31/0636; A47J 31/446; G06F 3/16
See application file for complete search history.

(56) References Cited

U.S. PATENT DOCUMENTS

| 6,418,730 | B1 | 7/2002 | Tremblay |
| 2007/0051246 | A1 | 3/2007 | Suzuki |
| 2014/0366741 | A1 | 12/2014 | Huang |
| 2015/0371554 | A1 | 12/2015 | Garber |
| 2016/0258804 | A1 | 9/2016 | Desautels |
| 2017/0066252 | A1* | 3/2017 | Eliav .................. G06Q 30/0635 |
| 2017/0262729 | A1* | 9/2017 | Penna .................... A47J 31/521 |
| 2017/0295983 | A1 | 10/2017 | Tseng |

FOREIGN PATENT DOCUMENTS

| JP | H0339116 A | 2/1991 |
| JP | 2007-069626 A | 3/2007 |
| JP | 2015-002982 A | 1/2015 |
| JP | 2016139319 A | 8/2016 |

OTHER PUBLICATIONS

Japanese Office Action dated Dec. 12, 2023, in the counterpart Japanese patent application No. 2022-163810.

* cited by examiner

*Primary Examiner* — Brian W Jennison
(74) *Attorney, Agent, or Firm* — Rabin & Berdo, P.C.

(57) ABSTRACT

An electronic device, including circuitry configured to acquire image information related to a beverage stored in a container, and to output a content from an output unit using a transition of the image information.

16 Claims, 41 Drawing Sheets

EXAMPLE OF GROUPING SURFACE OF COFFEE
IN CONTAINER INTO MULTIPLE AREAS

EXAMPLE OF CORRESPONDENCE RELATIONSHIP BETWEEN
TRANSITION OF COFFEE SURFACE IN CONTAINER AND
INFORMATION TO BE OUTPUT

| OI \ T | t1 | t2 | t3 | t4 | t5 | ··· | tn |
|---|---|---|---|---|---|---|---|
| OI1 | A | A | A | A | A | ··· | A |
| OI2 | A | B | A | A | A | ··· | A |
| OI3 | A | B | B | A | A | ··· | A |
| ⋮ | ⋮ | ⋮ | ⋮ | ⋮ | ⋮ | ⋮ | ⋮ |
| OIM | I | I | I | I | I | ··· | I |

EXAMPLE OF OUTPUT INFORMATION BASED ON INFORMATION OF COFFEE SURFACE IN CONTAINER

| OI | AUDIO INFORMATION |
|---|---|
| OI1 | Let's dream longing Santa today |
| OI2 | Feeling like hopping rabbit today |
| OI3 | Spread wings in the wide open sky like bird today |
| OI4 | Feeling sadness like autumn leaves today |
| OI5 | Feeling energetic freedom like watermelon in the Summer |
| ⋮ | ⋮ |
| OIM | Feeling calm like apple today |

FIG. 7

EXAMPLE OF DETERMINING INFORMATION TO BE OUTPUT BY ELECTRONIC DEVICE
(1) 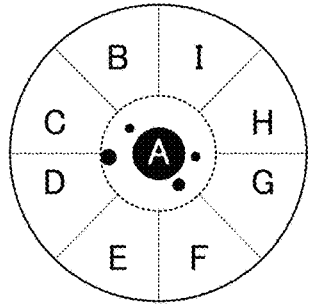
(2) 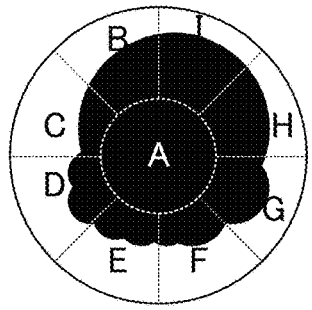
(3) 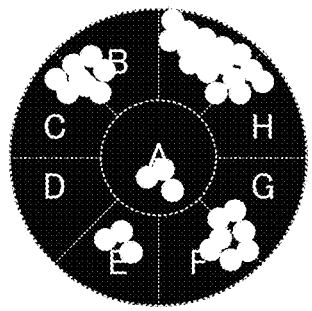
(4) 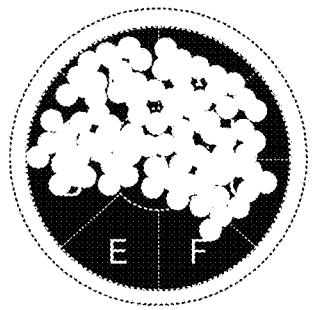
(5) 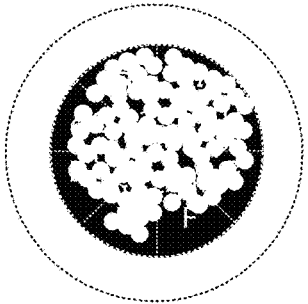
(6) 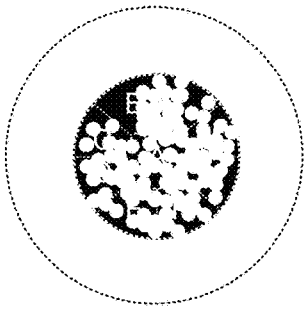
(7) 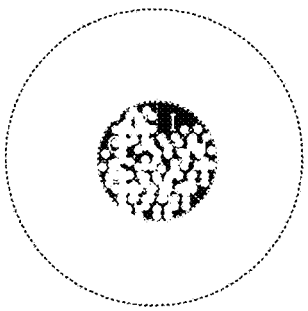
(8) 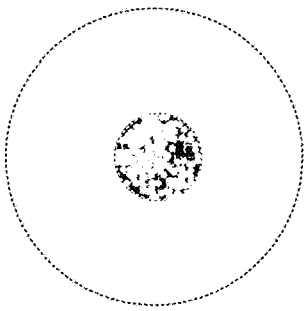
FIG. 8

EXAMPLE OF RECORDING INFORMATION RELATED TO COFFEE SURFACE IN CONTAINER

| t1 | t2 | t3 | t4 | t5 | t6 | t7 | t8 |
|----|----|----|----|----|----|----|----|
| A  | A  | D  | E  | F  | E  | I  | F  |

FIG. 9A

EXAMPLE OF DETERMINING OUTPUT INFORMATION BASED ON INFORMATION RELATED TO COFFEE SURFACE IN CONTAINER

| OI \ T | t1 | t2 | t3 | t4 | t5 | t6 | t7 | t8 |
|--------|----|----|----|----|----|----|----|-----|
| ⋮ | ⋮ | ⋮ | ⋮ | ⋮ | ⋮ | ⋮ | ⋮ | ⋮ |
| OIX1 | A | A | D | E | F | E | I | F |
| ⋮ | ⋮ | ⋮ | ⋮ | ⋮ | ⋮ | ⋮ | ⋮ | ⋮ |
| OIM | I | I | I | I | I | I | I | I |

FIG. 9B

EXAMPLE OF OUTPUT INFORMATION BASED ON INFORMATION RELATED TO COFFEE SURFACE IN CONTAINER

| OI | AUDIO INFORMATION |
|----|-------------------|
| OI1 | Let's dream longing Santa today |
| ⋮ | ⋮ |
| OIX1 | Let's wait like snowman without haste today |
| ⋮ | ⋮ |
| OIM | Feeling calm like apple today |

FIG. 9C

EXAMPLE OF OUTPUT AUDIO INFORMATION FROM ELECTRONIC DEVICE20

EXAMPLE OF IMAGE PATTERN RELATED TO COFFEE SURFACE IN CONTAINER

| | IMAGE PATTERN |
|---|---|
| PA1 | |
| PA2 | |
| PA3 | |
| PA4 | |
| ⋮ | ⋮ |
| PAN | |

FIG. 12A

EXAMPLE OF DETERMINING OUTPUT INFORMATION BASED ON INFORMATION RELATED TO COFFEE SURFACE IN CONTAINER

| T / OI | t1 | t2 | t3 | t4 | t5 | ⋯ | tn |
|---|---|---|---|---|---|---|---|
| OI1 | PA1 | PA1 | PA1 | PA1 | PA1 | ⋯ | PA1 |
| OI2 | PA1 | PA2 | PA1 | PA1 | PA1 | ⋯ | PA1 |
| OI3 | PA1 | PA2 | PA2 | PA1 | PA1 | ⋯ | PA1 |
| ⋮ | ⋮ | ⋮ | ⋮ | ⋮ | ⋮ | ⋮ | ⋮ |
| OIM | PAN | PAN | PAN | PAN | PAN | ⋯ | PAN |

FIG. 12B

EXAMPLE OF OUTPUT INFORMATION BASED ON INFORMATION RELATED TO COFFEE SURFACE IN CONTAINER

| OI | AUDIO INFORMATION | IMAGE INFORMATION |
|---|---|---|
| OI1 | Let's dream longing Santa today |  |
| OI2 | Feeling like hopping rabbit today |  |
| OI3 | Spread wings in the wide open sky like bird today |  |
| OI4 | Feeling sadness like autumn leaves today |  |
| OI5 | Feeling energetic freedom like watermelon in the Summer |  |
| ⋮ | ⋮ | ⋮ |
| OIM | Feeling calm like apple today | 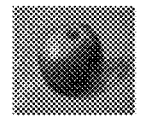 |

FIG. 15

EXAMPLE OF STORAGE INFORMATION RELATED TO COFFEE SURFACE IN CONTAINER

| t1 | t2 | t3 | t4 | t5 | t6 | t7 | t8 |
|---|---|---|---|---|---|---|---|
| A | A | D | E | F | E | I | F |

FIG. 16A

EXAMPLE OF DETERMINING OUTPUT INFORMATION BASED ON INFORMATION RELATED TO COFFEE SURFACE IN CONTAINER

| OI \ T | t1 | t2 | t3 | t4 | t5 | t6 | t7 | t8 |
|---|---|---|---|---|---|---|---|---|
| ⋮ | ⋮ | ⋮ | ⋮ | ⋮ | ⋮ | ⋮ | ⋮ | ⋮ |
| OIX1 | A | A | D | E | F | E | I | F |
| ⋮ | ⋮ | ⋮ | ⋮ | ⋮ | ⋮ | ⋮ | ⋮ | ⋮ |
| OIM | I | I | I | I | I | I | I | I |

FIG. 16B

EXAMPLE OF OUTPUT INFORMATION BASED ON INFORMATION RELATED TO COFFEE SURFACE IN CONTAINER

| OI | AUDIO INFORMATION (61) | IMAGE INFORMATION (62) |
|---|---|---|
| OI1 | Let's wait longing Santa with hope today |  |
| ⋮ | ⋮ | ⋮ |
| OIX1 | Let's wait like snowman without haste today |  |
| ⋮ | ⋮ | ⋮ |
| OIM | Feeling calm like apple today | 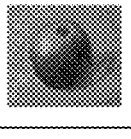 |

FIG. 16C

EXAMPLE OF OUTPUTTING IMAGE INFORMATION AND
AUDIO INFORMATION FROM ELECTRONIC DEVICE 220

EXAMPLE OF OUTPUT AUDIO INFORMATION AND IMAGE INFORMATION FROM DEVICE OTHER THAN ELECTRONIC DEVICE 320 (ELECTRONIC DEVICE 350)

EXAMPLE OF OUTPUT AUDIO INFORMATION AND IMAGE INFORMATION FROM DEVICE OTHER THAN ELECTRONIC DEVICE 320 (ELECTRONIC DEVICE 360)

EXAMPLE OF MANAGEMENT INFORMATION TO BE MANAGED BY SERVER 410

| TERMINAL IDENTIFICATION INFORMATION | RECEPTION TIME | RECEPTION INFORMATION | JUDGEMENT RESULT INFORMATION | PROVIDING CONTENT INFORMATION |
|---|---|---|---|---|
| 461 | 462 | 463 | 464 | 465 |
| AB0001 | 20171204 01:03 | ... | 567 | CT567 |
| AA0002 | 20171204 01:04 | ... | 109 | CT109 |
| CA0003 | 20171204 01:05 | ... | 1 | CT1 |
| ⋮ | ⋮ | ⋮ | ⋮ | ⋮ |
| AWOXYZ | 20171204 23:57 | ... | 43 | CT43 |

FIG. 28A

EXAMPLE OF CONTENT TO BE PROVIDED TO USERS OF COFFEE EXTRACTOR

| PROVIDING CONTENT INFORMATION | CONTENT |
|---|---|
| 471 | 472 |
| CT1 | CharacterA |
| CT2 | CharacterB |
| CT3 | CharacterC |
| ⋮ | ⋮ |
| CTN | CharacterXYZ |

FIG. 28B

EXAMPLE OF STORAGE INFORMATION RELATED
TO ELECTRONIC DEVICES 431, 441, 451

| TERMINAL IDENTIFICATION INFORMATION | RECEPTION TIME | RECEPTION INFORMATION | JUDGEMENT RESULT INFORMATION | PROVIDING CONTENT INFORMATION |
|---|---|---|---|---|
| ⋮ | ⋮ | ⋮ | ⋮ | ⋮ |
| EX0431 | 20171204 06:04 | X1 | 167 | CT67 |
| ⋮ | ⋮ | ⋮ | ⋮ | ⋮ |
| EX0441 | 20171204 07:14 | Y3 | 217 | CT217 |
| ⋮ | ⋮ | ⋮ | ⋮ | ⋮ |
| EX0451 | 20171204 09:17 | Z7 | 347 | CT347 |
| ⋮ | ⋮ | ⋮ | ⋮ | ⋮ |

FIG. 29A

EXAMPLE OF CONTENT TO BE PROVIDED
TO ELECTRONIC DEVICES 431, 441, 451

| PROVIDING CONTENT INFORMATION | CONTENT |
|---|---|
| ⋮ | ⋮ |
| CT67 | CharacterABC |
| ⋮ | ⋮ |
| CT217 | CharacterEFG |
| ⋮ | ⋮ |
| CT347 | CharacterHIJK |
| ⋮ | ⋮ |

FIG. 29B

EXAMPLE OF OUTPUTTING INFORMATION ACQUIRED BY ELECTRONIC DEVICE 700

EXAMPLE OF OUTPUTTING INFORMATION ACQUIRED BY ELECTRONIC DEVICE 700 FROM OTHER DEVICE (ELECTRONIC DEVICE 350)

EXAMPLE OF OUTPUTTING INFORMATION ACQUIRED BY ELECTRONIC DEVICE 700 FROM OTHER DEVICE (ELECTRONIC DEVICE 360)

ELECTRONIC DEVICE AND INFORMATION PROCESSING DEVICE

TECHNICAL FIELD

The present invention relates to an extractor, and more particularly, to an extractor used in extracting a beverage, and an electronic device and an information processing device using information acquired about the beverage.

BACKGROUND ART

Various drinks such as coffee, black tea and green tea are drunk all over the world. In addition, a large number of devices exist as equipment (extraction equipment) for brewing these beverages. For example, there is a coffee dripper for extracting coffee (for example, JP2014-104155A).

SUMMARY OF INVENTION

In the prior art, various devices can be used to brew beverages according to individual preferences. In addition, it takes a certain amount of time to brew a beverage using various devices. Therefore, it is considered that when a beverage is produced using various types of equipment, the enjoyment of producing a beverage increases if some information can be provided to a person who produces a beverage using information that can be obtained at the timing of producing the beverage.

Therefore, the object of the present invention is to provide an enjoyment of drinks.

An aspect of the present invention is an extractor comprising: a dripper for dropping a liquid poured into a substance for extracting a beverage; a container for storing a liquid dropping from the dripper; and an electronic device disposed between the dripper and the container and used, the electronic device acquiring information about a liquid stored in the container and outputting a content from an output unit using the information. Further, a processing method for performing the control and a program for causing the computer to execute the method.

Further, in this embodiment, the electronic device may have a hole for passing the liquid dropped from the dripper, and may have an annular portion corresponding to the shape of the opening of the container, and in use, may be sandwiched between the dripper and the container to be supported by the opening of the container and support the dripper.

In this embodiment, the electronic device may include an image acquisition unit for acquiring image information on a liquid stored in the container, and the image acquisition unit may be attached to the electronic device such that a lens faces a surface of the liquid stored in the container when the electronic device is installed in the container.

In this embodiment, the image acquisition unit may acquire image information related to the surface of the liquid stored in the container, and the electronic device may determine the content to be output from the plurality of content on the basis of a transition of at least one of a color, a pattern, and a bubble appearing on the surface of the liquid.

In addition, in that form, the content is a content unrelated to both the beverage and the extraction of the beverage, and may be used as information related to at least one of an animation character, an animal, a person, a plant, and object on ground.

In this embodiment, the electronic device may output at least one of audio information and image information as the content.

An aspect of the present invention is an annular electronic device, which is sandwiched between a dripper for dropping a liquid poured into a substance for extracting a beverage and a container for storing a liquid dropping from the dripper, is supported by an opening of the container, and supports the dripper, the electronic device acquires information on a liquid stored in the container, and outputs content from an output unit using the information. Further, a processing method for performing the control and a program for causing the computer to execute the method.

An aspect of the present invention is an information processing device for acquiring information on the generated beverage in each beverage placed in a plurality of containers at any of the time of the formation when the beverage produced by a substance for producing a beverage and a liquid is stored in a container, and when the generated beverage is placed in a container, and after the generated beverage is placed in the container, and providing the content determined from among the plurality of content on the basis of the analysis of the acquired information to the electronic device of each person related to the plurality of containers. The aspect of the present invention also relates to a determination method for performing the determination, a content providing method for providing the determined content, and a program for causing a computer to execute each of the methods.

In this embodiment, the information processing device may obtain judgement information for each beverage on the basis of information on a natural phenomenon occurring in relation to the beverage, and determine content to be provided to the electronic device from among the plurality of content using the judgement information.

For example, an electronic device that connects (or approaches) each of a plurality of containers acquires information on a beverage contained in a container (information related to a natural phenomenon occurring with respect to a beverage) at least at one timing of the beverage production by a substance for producing a beverage and a liquid in a container, at the time of placing the produced beverage in a container and after placing the produced beverage in a container. Next, each electronic device transmits the acquired information (i.e., information on a natural phenomenon that occurs with respect to the beverage) to the information processing device by using the communication function. The information processing device acquires the respective pieces of information transmitted as described above (i.e., the information on the natural phenomenon that occurs with respect to the beverage). Next, the information processing device obtains comparable judgement information for each beverage on the basis of the analysis of the acquired information. Next, using the judgement information, the information processing device determines content to be provided to each electronic device (electronic device of each person related to the plurality of containers from which the information has been acquired) from among the plurality of content. Next, the information processing device provides the determined content to the electronic device of each person associated with the plurality of containers from which the information has been acquired.

An aspect of the present invention is an extractor comprising: a storage portion for storing a substance for extracting a beverage and being provided with a hole for dropping a liquid poured into the stored substance; a container for storing a liquid dropping from the storage portion; an acquisition unit for acquiring information on a liquid stored in the container; and a control unit for performing control for outputting a content on the basis of the information acquired by the acquisition unit. Further, a processing method for performing the control and a program for causing the computer to execute the method.

The acquisition unit may be an image acquisition unit that acquires image information on a liquid stored in the container via a lens, and the acquisition unit may be attached so that the optical axis direction of the lens faces the surface of the liquid.

The container may be a transparent container, the acquisition unit may be an image acquisition unit for acquiring image information on a liquid stored in the container via a lens, and the acquisition unit may be attached to a position where image information on a liquid stored in the container can be acquired from the outside of the container.

The electronic device including the acquisition unit and the control unit may be detachable from the extractor.

In addition, the control unit may perform control to transmit information for causing another device capable of outputting the content to output the content.

The content may be content unrelated to both the beverage and the extraction of the beverage and may be information about at least one of an animation character, an animal, a person, a plant, and an object on ground.

The control unit may select at least one content from the plurality of content as an output target on the basis of the information acquired by the acquisition unit.

Another aspect of the present invention is an electronic device used by being sandwiched between the storage portion for storing a substance for extracting a beverage with a hole for dropping a liquid poured into the stored substance and a container for storing a liquid dropping from the storage portion, and wherein the electronic device has a sensor for acquiring information about the liquid stored in the container.

Further, the electronic device has an annular portion having a shape corresponding to the shape of the flange portion provided in the storage portion and the shape of the opening of the container. The sensor may be disposed in the opening of the container when the electronic device is installed at the same time the lower surface of the flange portion is in contact with the upper surface of the annular portion, and the opening edge of the container is in contact with the lower surface of the annular portion.

In addition, a gripping portion may be provided in the annular portion. In addition, the shape may be such that a part of the annulus of the annular portion is lacking, the shape may be U-shaped, the shape may be Y-shaped, or the shape may be polygonal, trapezoidal, elliptical, or the like.

In addition, an aspect of the present invention is an information processing device for determining content on the basis of information acquired with respect to a beverage generated when the beverage generated by a substance for generating a beverage and a liquid is stored in a container, when the generated beverage is put in a container, or after the generated beverage is put in the container. The aspect of the present invention also relates to a determination method for performing the determination, a content providing method for providing the determined content, and a program for causing a computer to execute each of the methods.

In addition, an aspect of the present invention is an information processing device for determining content to be provided to each person associated with the plurality of containers on the basis of the information acquired by acquiring information regarding the generated beverage for each beverage placed in the plurality of containers when the beverage generated by the substance for generating the beverage and the liquid is stored in the container, when the generated beverage is placed in the container, or after the generated beverage is placed in the container. The aspect of the present invention also relates to a determination method for performing the determination, a content providing method for providing the determined content, and a program for causing a computer to execute each of the methods.]

Effect of the Invention

According to the present invention, it provides an effect that it can be providing enjoyment regarding a beverage.

BRIEF DESCRIPTION OF DRAWINGS

FIG. 7 is a diagram showing an example of various information used in determining the information of the output target by the electronic device 20 in the first embodiment.

FIG. 8 is a diagram showing the relationship between an image capable of being acquired by the electronic device 20 in the first embodiment (an image of the surface of the coffee that accumulates in the container 30) and the regions A-I shown in FIG. 6A.

FIG. 9A is a diagram showing a determination example for determining the information to be output by the electronic device 20 in the first embodiment.

FIG. 9B is a diagram showing a determination example for determining the information to be output by the electronic device 20 in the first embodiment.

FIG. 9C is a diagram showing a determination example for determining the information to be output by the electronic device 20 in the first embodiment.

FIG. 12A is a diagram showing an example of various information used in determining the information of the output target by the electronic device 20 in the first embodiment.

FIG. 12B is a diagram showing an example of various information used in determining the information of the output target by the electronic device 20 in the first embodiment.

FIG. 15 is a diagram showing an example of output information by the electronic device 220 in the second embodiment.

FIG. 16A is a diagram showing a determination example of determining the information to be output by the electronic device 220 in the second embodiment.

FIG. 16B is a diagram showing a determination example of determining the information to be output by the electronic device 220 in the second embodiment.

FIG. 16C is a diagram showing a determination example of determining the information to be output by the electronic device 220 in the second embodiment.

FIG. 28A is a diagram showing an example of management information stored in the storage unit 413 in the fifth embodiment.

FIG. 28B is a diagram showing an example of management information stored in the storage unit 413 in the fifth embodiment.

FIG. 29A is a diagram showing a storage example of information relating to the electronic devices 431, 441, and 451 in the fifth embodiment, and an example of the content to be provided to the electronic devices 431, 441, 451.

FIG. 29B is a diagram showing a storage example of information relating to the electronic devices 431, 441, and 451 in the fifth embodiment, and an example of the content to be provided to the electronic devices 431, 441, 451.

DESCRIPTION OF EMBODIMENT

Next, embodiments of the present invention will be described in detail with reference to the drawings.

First Embodiment: An Example of Providing Audio Information Using Colors and Patterns Formed when Brewing Coffee

[Example of Appearance Configuration of Coffee Extractor and Electronic Device]

Figure 1A:
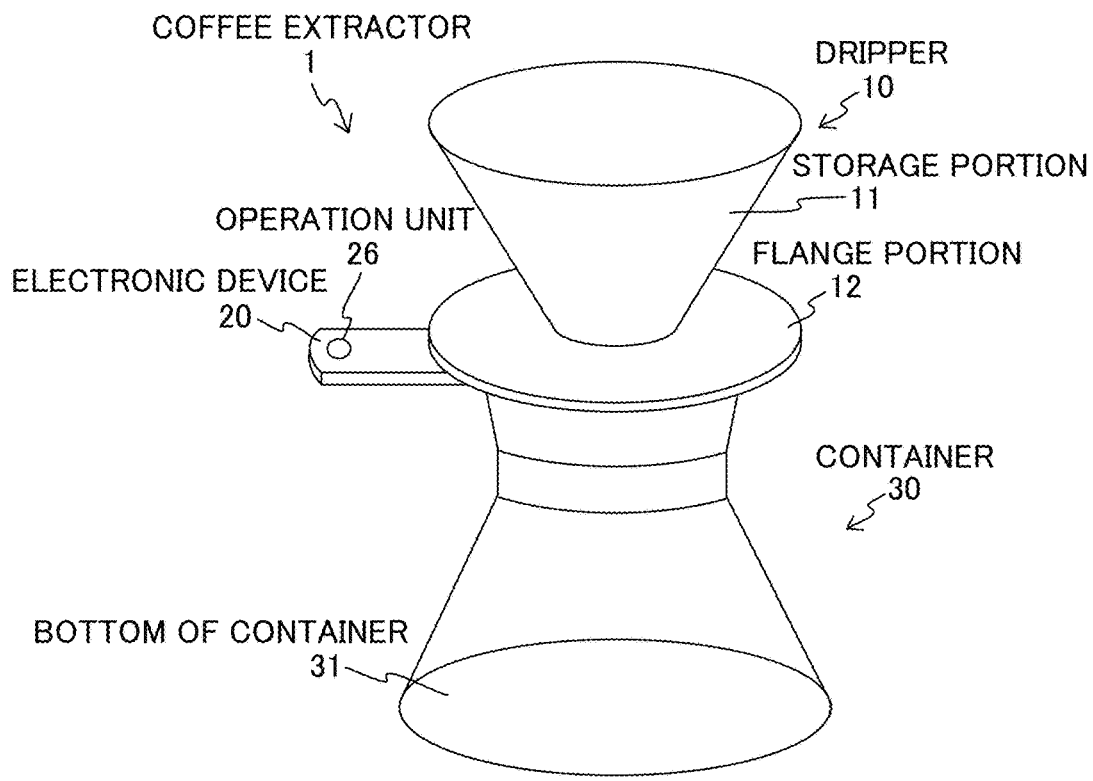
FIG. 1A is a diagram showing an example of an external configuration of a coffee extractor 1 to which an electronic device 20 according to a first embodiment is attached.
Figure 1B:
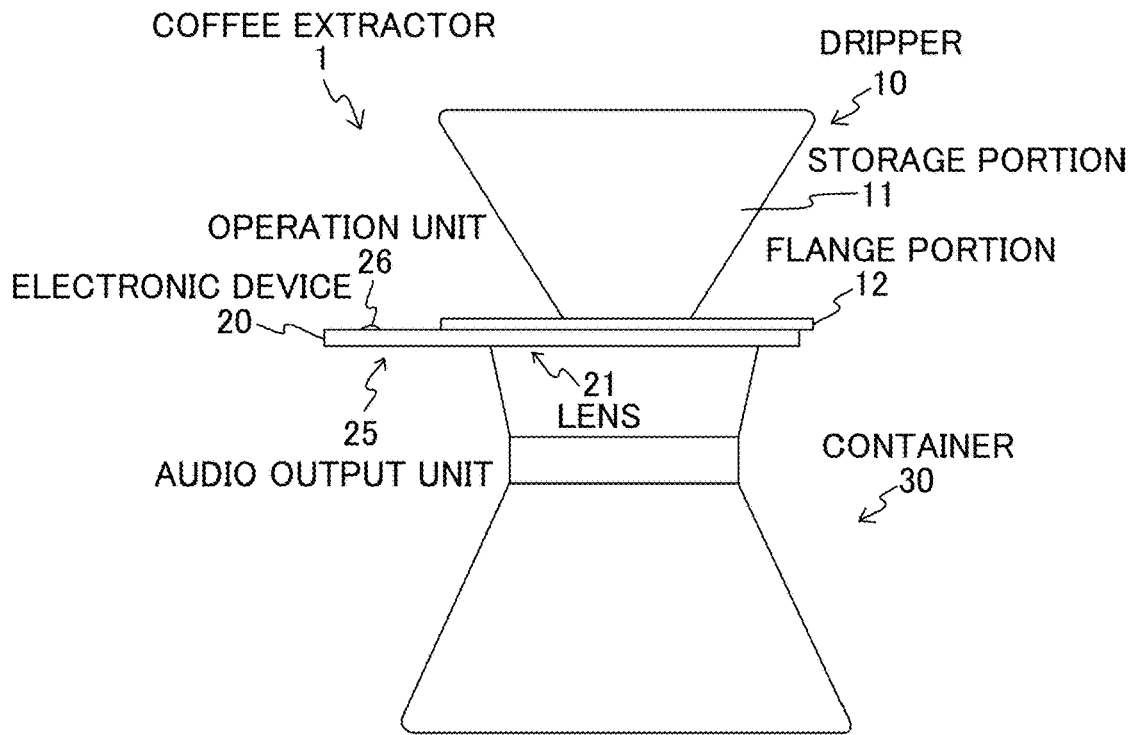
FIG. 1B is a diagram showing an example of an external configuration of a coffee extractor 1 to which an electronic device 20 according to a first embodiment is attached.

FIG. 1A and FIG. 1B is a diagram showing an example of an external configuration of a coffee extractor 1 to which an electronic device 20 in accordance with the first embodiment is attached. FIG. 1A shows a perspective view of the coffee extractor 1 to which the electronic device 20 is attached. And FIG. 1B shows a side view of the coffee extractor 1 to which the electronic device 20 is attached.

Figure 2A:
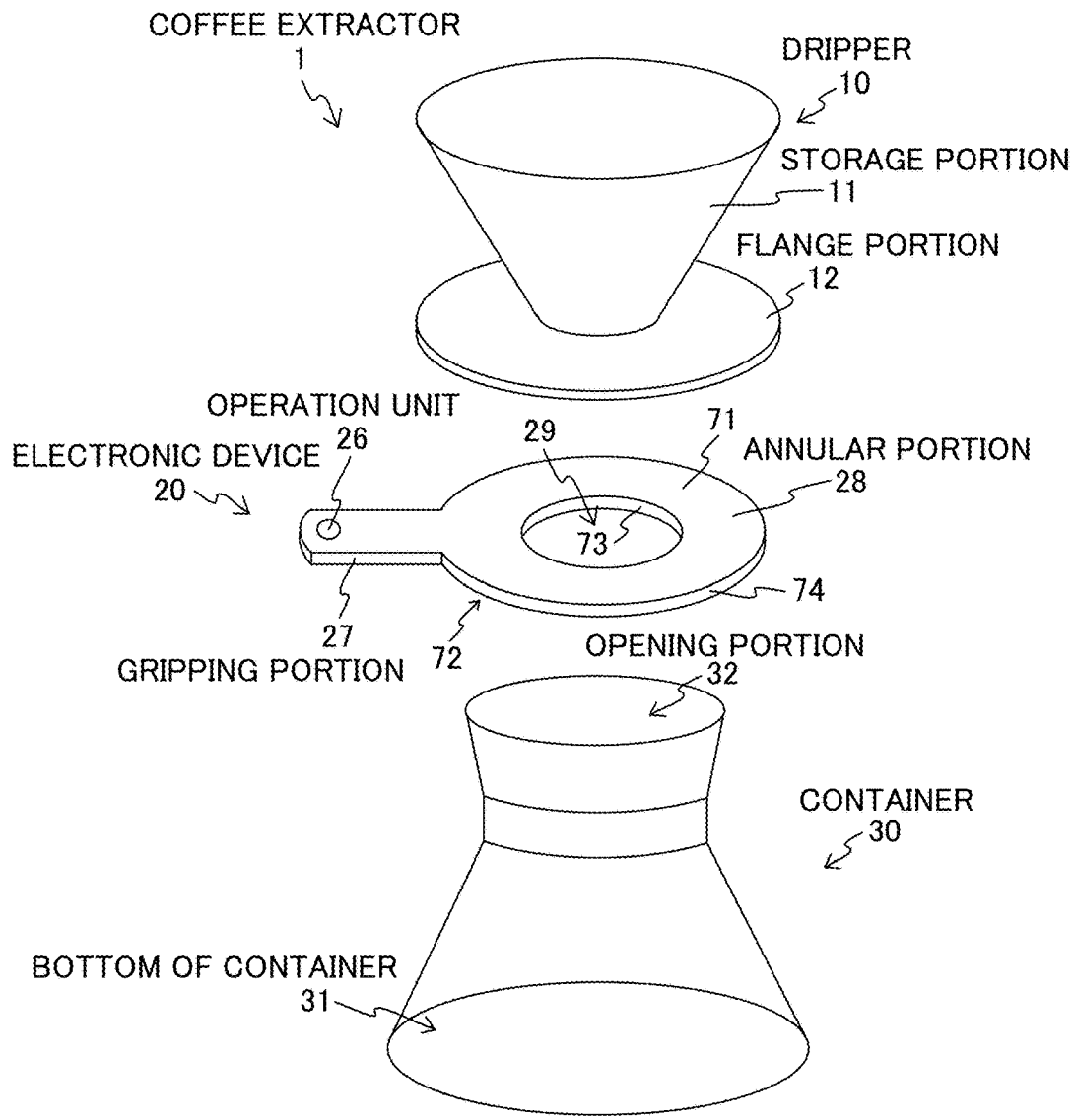
FIG. 2A is a diagram showing an example of an external configuration of a dripper 10, an electronic device 20, and a container 30 according to a first embodiment.
Figure 2B:
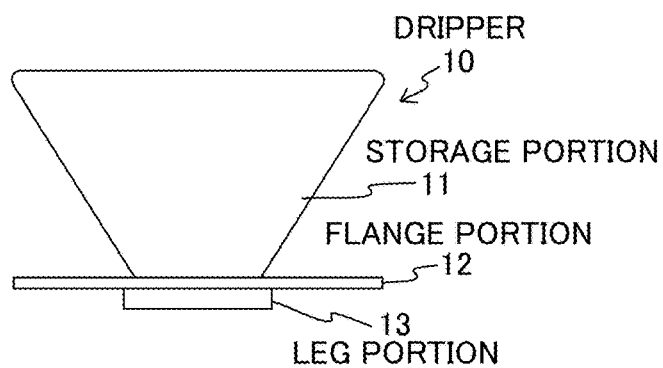
FIG. 2B is a diagram showing an example of an external configuration of a dripper 10, an electronic device 20, and a container 30 according to a first embodiment.

FIG. 2A and FIG. 2B is a diagram showing an example of an external configuration of the dripper 10, the electronic device 20, and the container 30 in accordance with the first embodiment. FIG. 2A shows a perspective view in the case of removing the electronic device 20 from the coffee extractor 1 shown in FIG. 1A and FIG. 1B. And FIG. 2B shows a side view of the dripper 10.

Figure 3A:
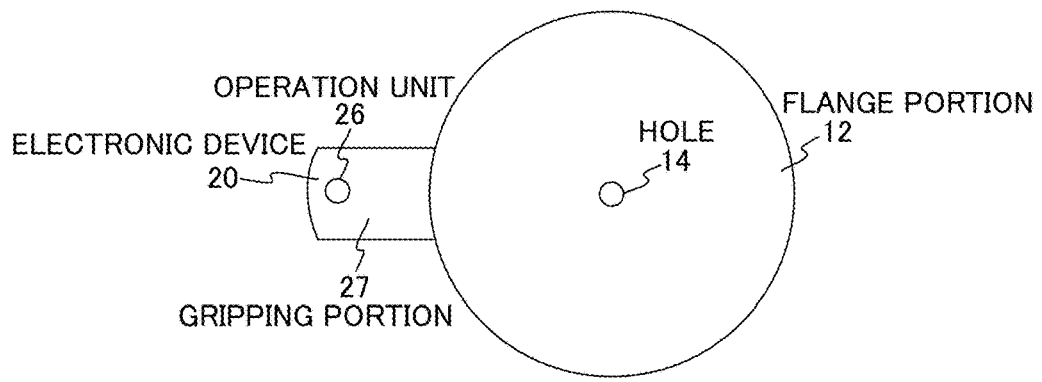
FIG. 3A is a diagram showing an example of an external configuration of a dripper 10 and an electronic device 20 according to a first embodiment.
Figure 3B:
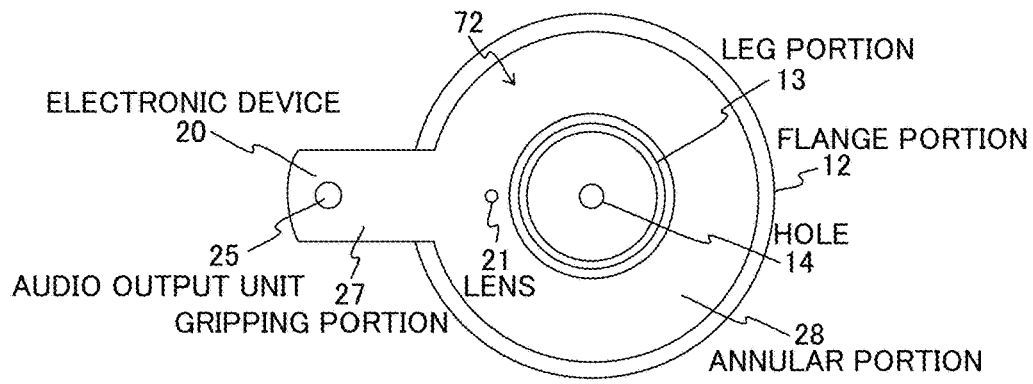
FIG. 3B is a diagram showing an example of an external configuration of a dripper 10 and an electronic device 20 according to a first embodiment.
Figure 3C:
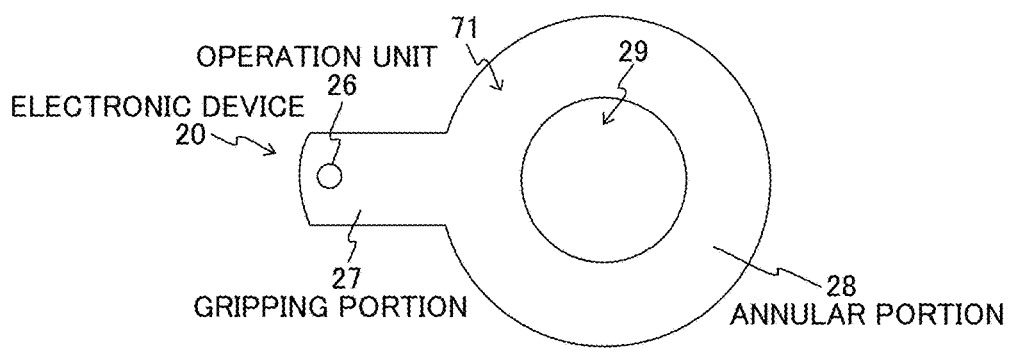
FIG. 3C is a diagram showing an example of an external configuration of a dripper 10 and an electronic device 20 according to a first embodiment.
Figure 3D:
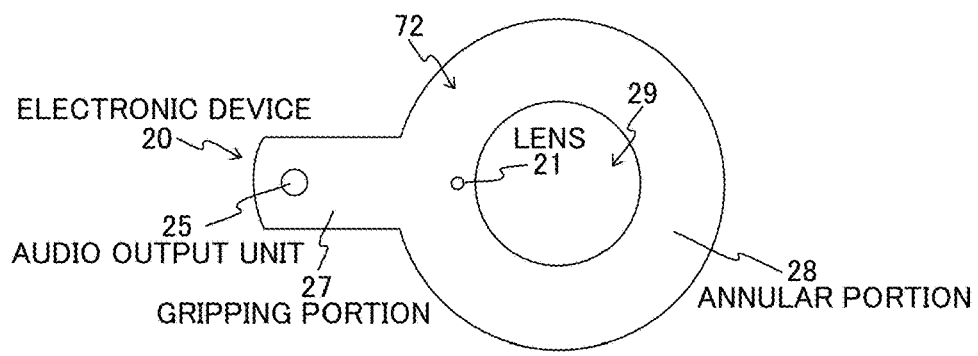
FIG. 3D is a diagram showing an example of an external configuration of a dripper 10 and an electronic device 20 according to a first embodiment.

FIG. 3A to FIG. 3D is a diagram showing an example of the external configuration of the dripper 10 and the electronic device 20 in accordance with the first embodiment. FIG. 3A shows a top view of the dripper 10 in a state of attaching the electronic device 20 to the lower part of the flange portion 12 and the electronic device 20. And FIG. 3B shows a lower view of the dripper 10 in a state of attaching the electronic device 20 to the lower part of the flange portion 12 and the electronic device 20. Also, FIG. 3C shows a top view of the electronic device 20. And FIG. 3D shows a bottom view of the electronic device 20.

The coffee extractor 1 includes a dripper 10, an electronic device 20, and a container 30. The coffee extractor 1 may also be called a beverage extractor, an equipment for filtering beverages, a beverage production device, or the like.

The dripper 10 has a storage portion 11, a flange portion 12, and a leg portion 13, and it is a coffee dripper which is used by placing at the opening portion 32 of the container 30. Also, at the lower part of the flange portion 12, the electronic device 20 is attached.

The storage portion 11 is a container for accommodating the powder obtained by pulverizing coffee beans therein, and at the bottom, the hole 14 for flowing down the hot water poured into the storage portion 11 (vertically through hole 14) is provided. In this manner, the storage portion 11 has an upper opening portion for pouring hot water into the powder (ground coffee beans) from the upper side, and a hole 14 (opening portion at the lower part, extraction port) for dropping the hot water poured into the powder (ground coffee beans) into the container 30. Also, the storage portion 11 is a device for pouring hot water poured into the powder accommodated therein (the powder obtained by pulverizing coffee beans) into the container 30 placed below the storage portion 11 through the powder. Although not shown in FIG. 1A and FIG. 1B, various members such as a handle may be provided on the outer surface of the storage portion 11.

For example, the storage portion 11 may be formed into a funnel shape and may hold a paper filter for straining out a liquid extracted from coffee beans. In addition, the storage portion 11 may be a metal filter, or may be a storage portion for holding a flannel filter. The shape of the storage portion 11 can be trapezoidal, conical, various shapes such as a basket type.

The flange portion 12 is a disk-shaped flange portion extending outward from the lower part of the storage portion 11 in the horizontal direction. Also, the flange portion 12 is provided at the lower part of the storage portion 11, and stably supports the storage portion 11 when installing the storage portion 11 in the opening portion 32 of the container 30.

The leg portion 13 is a ring-shaped projection provided on the lower surface of the flange portion 12. The leg portion 13 is intended to support the dripper 10 when placing the dripper 10 directly at a place other than the opening portion 32 of the container 30. The leg portion 13 corresponds to a bottom, a bottom rim of a pottery (a tea cap or a bowl for example). Further, in FIG. 2A to FIG. 3D, an example which the leg portion 13 is a ring-shaped protrusion is shown, but the leg 13 may be a plurality of protrusions (e.g., a plurality of protrusions arranged on the circumference) having three or more points so as to support the dripper 10.

Incidentally, the storage portion 11, the flange portion 12, and the leg portion 13 may be constituted integrally by a heat-resistant glass, ceramic, resin or the like, or may be joined after constituting individually. The leg portion 13 may be omitted.

The container 30 is a container (coffee server) for storing an extraction liquid of coffee beans flowing down from the dripper 10. Also, the container 30 has an opening portion 32 for putting an extraction liquid of coffee beans flowing down from the dripper 10 and supports a dripper 10 placed at the opening portion 32. Also, the container 30 may be made of heat-resistant glass. In addition, the container 30 may be made of some members having heat retention property (stainless server for example) or ceramic. In addition, the shape of the container 30 may be various shapes other than the shape shown in FIG. 1A and FIG. 1B. Although not shown in FIG. 1A and FIG. 1B, various members such as a handle may be provided on the outer surface of the container 30.

The electronic device 20 is an electronic device or information processing device mounted so as to be sandwiched between the flange portion 12 of the dripper 10 and the opening portion 32 of the container 30. That is, the electronic device 20 is an electronic device or information processing device used with being sandwiched between the flange portion 12 of the dripper 10 and the opening portion 32 of the container 30.

The electronic device 20 is composed of a rectangular (flat plate-shaped) portion (the gripping portion 27) and a ring-shaped (annular) portion (the annular portion 28). The annular portion 28 forms a ring-shaped (annular) in the top view, and has the upper surface (upper part) 71 where dripper 10 is installed, the lower surface (lower part) 72 to be installed in the opening portion 32 of the container 30, the inner surface (inner wall) 73 facing the leg portion 13 in the lower surface of the flange portion 12, and an outer surface (outer wall, peripheral wall) 74. Thus, the annular portion 28 is a doughnut shape having a hollow portion (hole 29), and is placed so as to be sandwiched between the flange portion 12 of the dripper 10 and the opening portion 32 of the container 30 so that the upper surface (upper part) 71 and the dripper 10 is in contact, the lower surface (lower part) 72 and the mouth edge of the opening portion 32 of the container 30 is in contact, Also, the electronic device 20 has a shape in which a rectangular portion (the gripping portion 27) is joined to a ring-shaped portion (the annular portion 28), and for example, has a shape such as magnifying glass or a goldfish scooping. Further, the annular portion 28 has an inner diameter (the size of the diameter of the hole 29) whose size is larger than the diameter (outer diameter) of the leg portion 13 on the lower surface of the flange portion 12 of the dripper 10. Further, the annular portion 28 has an outer diameter whose size is smaller than the diameter of the lower surface of the flange portion 12 of the dripper 10.

Further, as shown in FIG. 3B, the electronic device 20 is mounted so as to be sandwiched between the flange portion 12 of the dripper 10 and the opening portion 32 of the container 30 so that the leg portion 13 of the flange portion 12 enters the hole 29 of the annular portion 28. That is, the electronic device 20 is supported by the opening portion 32 of the container 30, and the dripper 10 is supported by the annular portion 28 of the electronic device 20. For example, as shown in FIG. 1B and FIG. 3B, by setting the shape of the annular portion 28 of the electronic device 20 to match the shape of the opening portion 32 (mouth edge) of the container 30 as well as the flange portion 12 of the dripper 10, even if the electronic device 20 is mounted so as to be sandwiched between the flange portion 12 of the dripper 10 and the opening portion 32 of the container 30, the electronic device 20 and the dripper 10 are stably supported by the container 30.

Thus, the annular portion 28 has a shape corresponding to the annular shape of the flange portion 12, and the annular shape of the opening portion 32 of the container 30. Further, the electronic device 20 is installed so that the lower surface of the flange portion 12 is in contact with the upper surface 71 of the annular portion 28, and the mouth edge of the opening portion 32 of the container 30 is in contact with the lower surface 72 of the annular portion 28, as the lens 21 is disposed in the opening portion 32.

Further, in the case of mounting or removing of the electronic device 20, the user can hold the gripping portion 27 by hand, to perform each operation. Therefore, the gripping portion 27 functions as a grip portion of the electronic device 20. Further, since the gripping portion 27 includes an operation unit 26, the gripping portion 27 also functions as an operation unit of the electronic device 20. Further, since the gripping portion 27, includes the audio output unit 25, the gripping portion 27 also functions as an output unit of the electronic device 20.

In this manner, by forming the electronic device 20 into a shape like a magnifying glass or a goldfish scooping, it is easy to attach and detach the electronic device 20. In addition, the electronic device 20 can be stably installed in the coffee extractor 1.

The shapes of the gripping portion 27 and the annular portion 28 are not limited to these. For example, the outer diameter of the annular portion 28 may be sized to be greater than the diameter of the lower surface of the flange portion 12 of the dripper 10. Also, the annular portion 28 may have other shapes as long as it can be stably disposed in the opening portion 32 of the container 30 and can stably support the dripper 10. For example, it may be shaped such that a part of the ring-shaped portion is missing, in a top view, it may be a U-shape, or it may be a Y-shape, polygonal, trapezoidal, elliptical or the like shape (at least having a portion corresponding to a hole with a larger size of the diameter (outer diameter) of the leg portion 13). Incidentally, a modification of the annular portion 28 is shown in FIG. 38A to FIG. 38D.

Further, the electronic device 20 includes the lens 21, the audio output unit 25, and the operation unit 26. The functional configurations of the lens 21, the audio output unit 25, and the operation unit 26 will be described in detail with reference to FIG. 4.

The lens 21 of the electronic device 20 is disposed at a lower part (surface of downside (lower surface 72)) of the annular portion 28. When the dripper 10 and the electronic device 20 are set in the container 30, the lens 21 of the electronic device 20 is disposed at a position where the optical axis direction of the lens 21 faces the surface of the coffee extract liquid accumulated in the container 30.

Also, when removing the electronic device 20 or when hot water is poured into the dripper 10, it is assumed that water or the like adhere to the entire electronic device 20, or the respective portions (the lens 21, the audio output unit 25, the operation unit 26). Therefore, it is preferable to perform waterproofing treatment on the entire and each portion of the electronic device 20 (the lens 21, the audio output unit 25, the operation unit 26).

Further, when hot water is poured into the dripper 10, it is assumed that the dripper 10 and the container 30 have heat. Therefore, it is preferable that each device incorporated in the electronic device 20 is enclosed by a heat-insulating member or the like or applied a heat insulating treatment so as not to be affected by heat from the dripper 10. For example, a heat insulating material such as a foam material system or a felt system may be used, and two or more of these materials may be combined.

Further, when hot water is poured into the dripper 10, it is assumed that steam is generated from the coffee (liquid) accumulated in the container 30, and the lens 21 is fogged.

Therefore, it is preferable to perform defogging treatment on the surface of the lens 21. Alternatively, the entire lens 21 may be covered with a transparent member which is subjected to an anti-fogging treatment. In order to prevent the influence of heat, it is preferable that the lens 21 itself or the transparent member subjected to the anti-fogging treatment are also subjected to a heat insulating treatment.

[Example of Functional Configuration of Electronic Device]

Figure 4:
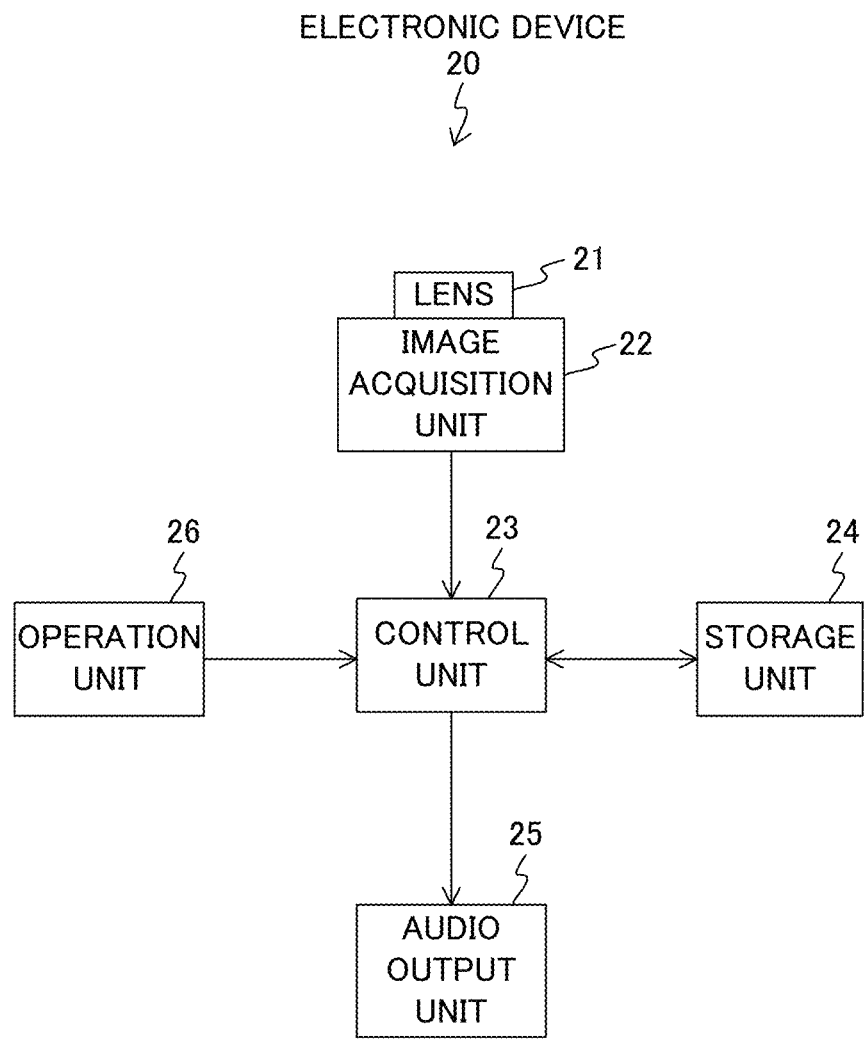
FIG. 4 is a block diagram showing a functional configuration example of the electronic device 20 in the first embodiment.

FIG. 4 is a block diagram showing an example of the functional configuration of the electronic device 20 in accordance with the first embodiment.

The electronic device 20 includes the lens 21, the image acquisition unit 22, the control unit 23, the storage unit 24, the audio output unit 25, and the operation unit 26. Note that the electronic device 20 may use a battery as a power source by incorporating or mounting a battery or may use a power source from the outside without incorporating a battery.

The lens 21 is constituted by a plurality of lenses for collecting light from the subject. Further, the light from the subject condensed by the lens 21 is incident on the image sensor (provided in the image acquisition unit 22).

On the basis of the control of the control unit 23, the image acquisition unit 22 captures an image of the subject and generate the image (image data), and outputs the generated image to the control unit 23. For example, the image acquisition unit 22 includes an image pickup element (image sensor) for receiving the light from the subject condensed by the lens 21, and image processing unit for performing a predetermined image processing on the image data generated by the image pickup element. For example, as the image pickup element it is possible to use a CCD (Charge Coupled Device) type or CMOS (Complementary Metal Oxide Semiconductor) type image pickup device.

Each unit (for example, a zoom lens, a focus lens, or a diaphragm) of the lens 21 may be controlled on the basis of the control of the control unit 23.

The control unit 23 is for controlling each unit of the electronic device 20 on the basis of the control program stored in the storage unit 24. The control unit 23, for example, is realized by a CPU (Central Processing Unit). The CPU is a central processing unit (electronic device) composed of a control unit (control circuit) and an arithmetic unit (arithmetic circuit).

The storage unit 24 is a memory for storing various kinds of information. For example, the storage unit 24 stores various types of information (e.g., control programs, information for determining output information (e.g., information shown in FIG. 6A to FIG. 7)) which is necessary for the electronic device 20 to perform various types of processing.

In addition, the storage unit 24 stores information (for example, as shown in FIG. 9A) determined on the basis of the image (image data) acquired by the image acquisition unit 22.

The audio output unit 25 is an audio output unit (a speaker for example) which outputs various sounds under the control of the control unit 23.

The operation unit 26 receives an operation input for operating the electronic device 20. In the first embodiment, for ease of explanation, the operation unit 26 is assumed to be a switch for turning on the power of the electronic device 20. Although only the simple operation unit 26 is shown in FIG. 1A to FIG. 3D, other operation members may be provided.

[Example of Coffee Surface Transition in Container]

Figure 5:
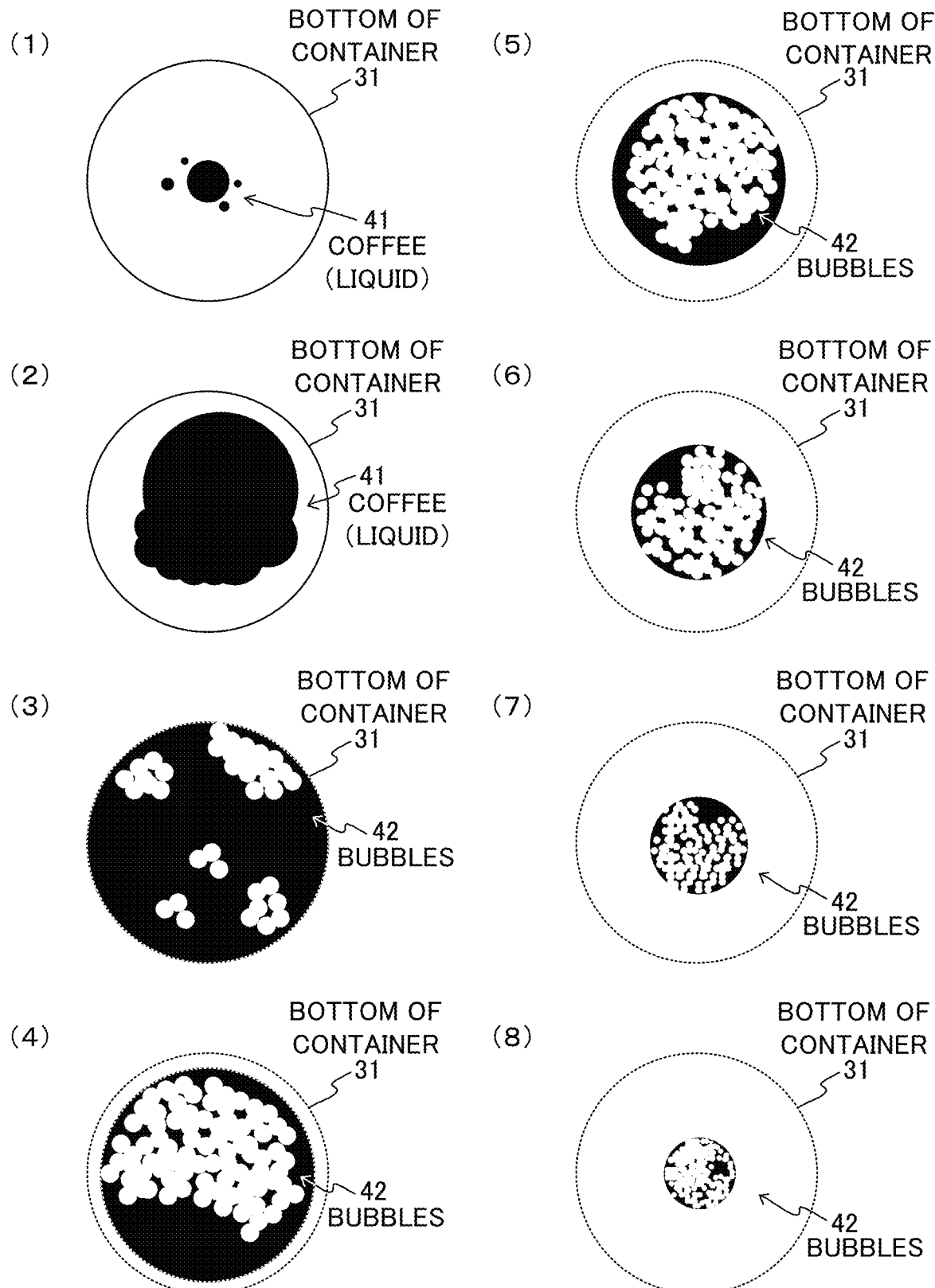
FIG. 5 is a diagram illustrating an example of a transition of an image (an image of the surface of the coffee accumulated in the container 30) that can be acquired by the electronic device 20 in the first embodiment.

FIG. 5 is a diagram showing an example of transition of an image (an image of the coffee surface accumulated in the container 30) that can be acquired by the electronic device 20 in the first embodiment. In FIG. 5, for ease of explanation, the liquid of the coffee, and the bubbles generated on the coffee surface or the like are shown in simplified form by a circle or the like.

FIG. 5(1) shows the state in which the extracted coffee (liquid) 41 dropped on the bottom 31 of the container 30. At first, the user sets the dripper 10 in the upper portion of the container 30, attaches a paper filter to the inside of the storage portion 11 of the dripper 10, and puts coffee bean powder in the paper filter. Next, the user pours a small amount of hot water cooled to about 90 degrees after boiling into the coffee bean powder, which is set in the dripper 10, and steams the coffee bean powder for about 20 to 30 seconds. In this steaming state, amount of hot water which is poured into the coffee bean powder is few, and since the poured hot water is absorbed by the coffee bean powder, the extracted coffee (liquid) 41 does not often drop on the bottom 31 of the container 30 in many cases.

At the end of the steaming period, the user sequentially pours hot water into the steamed coffee bean powder (coffee bean powder set in the dripper 10) by a desired amount at the user's desired timing. When hot water is poured into the coffee bean powder in this manner, as shown in FIG. 5(1), the coffee bean powder cannot completely absorb the hot water, and the coffee (liquid) 41 falls on the bottom 31 of the container 30. In this case, the position (position at the bottom 31), size (size at the bottom 31), and shape (planar shape at the bottom 31) of the coffee (liquid) 41 falling on the bottom 31 of the container 30 are changed depending on the amount of hot water poured into the coffee bean powder and the position (position of the coffee bean powder set in the dripper 10). For example, as shown in FIGS. 5(1) and (2), the first coffee (liquid) 41 falls near the center of the bottom 31 of the container 30, and thereafter, the coffee (liquid) 41 is accumulated so as to spread in either direction.

Further, as shown in FIG. 5(3), when the extracted coffee (liquid) 41 is accumulated to some extent on the bottom 31 of the container 30, the bubble 42 often appears on the surface of the coffee (liquid) 41 accumulated in the container 30. In FIG. 5, the bubble 42 is shown in white and simplified form. Further, when the user pours hot water into the coffee bean powder successively to a desired amount, the surface of the coffee (liquid) 41 becomes smaller in accordance with the shape of the container 30 as shown in FIGS. 5(3) to (8).

As described above, when hot water is poured into the coffee bean powder set in the dripper 10, various colors and patterns such as a coffee color (dark color) and a bubble color (white color) are formed on the bottom 31 of the container 30 (including the surface of the coffee (liquid) 41 accumulated in the container 30), as shown in FIGS. 5(1) to (8). The colors and patterns formed in this way often vary depending on the person who makes coffee and the environment in which coffee is brewed. It is also assumed that the colors and patterns formed in this manner are less likely to be the same or substantially the same even if the same person brews the coffee in the same environment. Therefore, in the first embodiment, an example is shown in which various types of information are provided using colors and patterns formed when coffee is brewed.

[Example of the Judgement Information for Determining the Information to be Output Using Colors and Patterns Formed when Brewing Coffee]

Figures 6A, 6B:
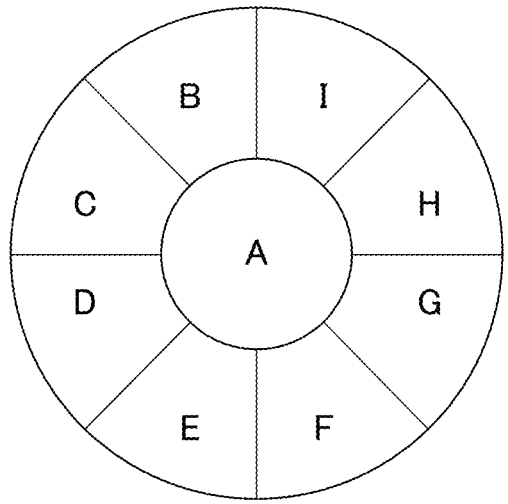
FIG. 6A is a diagram showing an example of various information used in determining the information of the output target by the electronic device 20 in the first embodiment.
FIG. 6B is a diagram showing an example of various information used in determining the information of the output target by the electronic device 20 in the first embodiment.

FIG. 6A to FIG. 7 are diagrams showing an example of various types of information used when the electronic device 20 in the first embodiment determines information to be output.

FIG. 6A shows an example of areas A to I used when information on coffee accumulated in the container 30 (for example, the surface of the coffee (liquid) 41 accumulated in the container 30) is acquired. The circular area shown in FIG. 6A is an area corresponding to the circular shape of the bottom 31 of the container 30 of the image (e.g., a rectangular image acquired by the image pickup device) acquired by the image acquisition unit 22 of the electronic device 20. In addition, the circular area shown in FIG. 6A is divided into nine regions and is defined as areas A to I. For example, the areas A to I can be set so that each are is substantially the same. Note that the division of the circular area shown in FIG. 6A is an example, and the circular area may be divided into a plurality of regions by another division method. For example, the circular area may be divided into four regions by two straight lines passing through the center of the circle (the same straight line as the diameter), the circular area may be divided into six regions by three straight lines passing through the center of the circle (the same straight line as the diameter), or the circular area may be divided into eight regions by four straight lines passing through the center of the circle (the same straight line as the diameter). Alternatively, some regions (closed regions) having an irregular shape (e.g., polygon (e.g., triangle, square, pentagon), circle, ellipse) can be arranged in the circular area so as not to overlap with each other, and each of these regions (closed region, region outside the closed region) may be set as a plurality of regions.

FIG. 6B shows an example of judgement information (table) used when information to be output is determined on the basis of information acquired using the areas A to I shown in FIG. 6A. The judgement information shown in FIG. 6B is information indicating the correspondence relationship between the transition of the information on the coffee accumulated in the container 30 (for example, the surface of the coffee (liquid) 41 accumulated in the container 30) and the data OI to be output. For example, all combinations (patterns) of A to I are defined in the judgement information shown in FIG. 6B. For example, the data OI1 to be output is defined as the case of patterns "A, A, . . . , A, A" which all elements are the A. Also, the data OI2 to be output is defined as the case of patterns "A, B, A, . . . , A, A" which all elements except one (time t2 is "B") are the A. Also, the data OI3 to be output is defined as the case of patterns "A, B, B, . . . , A, A" which all elements except two (time t2 and t3 are "B") are the A. The following data to be output is defined in the same way, and the data OIM to be output is defined as the case of patterns "I, I, . . . , I, I" which all elements are the I.

In FIG. 6B, the times t1, . . . , tn (n is a positive integer) are values indicating elapsed time when the coffee is extracted using the coffee extractor 1. For example, in the case that the interval for acquiring information on coffee stored in the container 30 is 20 seconds, the time t 1 is assumed to be 20 seconds, the time t2 is assumed to be 40 seconds, the time t3 is assumed to be 60 seconds, and the like, and the interval is set to be 20 seconds. Then, at each of the times t1, . . . , tn the control unit 23 (shown in FIG. 4) sequentially judges which area has the largest ratio of black among the areas A to I shown in FIG. 6A, and determines the data OI (OI1 to OIM (M is a positive integer)) to be output on the basis of the judgement result. For example, in the case that the areas having the largest ratio of black are all A (area A shown in FIG. 6A) at each time t1, t2, . . . , tn, among the areas A to I shown in FIG. 6A, the control unit 23 determines OI1 as the data OI to be output. Further, for example, in the case that the areas having the largest ratio of black are all I (area I shown in FIG. 6A) at each time t1, t2, . . . , tn, among the areas A to I shown in FIG. 6A, the control unit 23 determines OIM as the data OI to be output.

Note that the values of the intervals of time t1, . . . , tn, and value of n may be set in advance, or may be set to a user's preferable value by a user's operation. The value of M is determined on the basis of the number of regions for dividing the circular shape corresponding to the surface of the coffee (liquid) 41 accumulated in the container 30 and the value of n. For example, when the number of areas for dividing the circular shape are 4 and the value of n is 4, 256 (=4×4×4×4) is determined. However, depending on the number of areas and the value of n, it is assumed that the value of M becomes too large to prepare the information (for example, the audio information 61 shown in FIG. 7) to be output. Therefore, when the value of M is larger than the number of output information (for example, the audio information 61 shown in FIG. 7), the same audio information 61 may be assigned to different information (data OI to be output).

FIG. 7 shows an example of the correspondence relationship between the data OI to be output determined using the judgement information shown in FIG. 6B and the output information (the audio information 61). For example, when OI1 is determined as the data OI to be output, the information related to Santa is output as the audio information 61. The information related to Santa is, for example, information for outputting a sound of "Let's dream longing Santa today". In FIG. 7 only characters to be the object of sound output are shown in a simplified manner for ease of explanation. Examples of these outputs will be described with reference to FIG. 10.

[Example of Determining the Information to be Output Using the Color and Pattern Formed when Brewing Coffee]

FIG. 8 is a diagram showing a relationship between an image that can be acquired by the electronic device 20 in the first embodiment (an image of the surface of the coffee accumulated in the container 30) and the regions A to I shown in FIG. 6A. Incidentally, the image of the surface of the coffee that accumulates in the container 30 shown in FIGS. 8(1) to (8) is the same as each image shown in FIGS. 5(1) to (8).

FIG. 9A to FIG. 9C is a diagram showing an example of determination of output information by the electronic device 20 according to the first embodiment. FIG. 8 to FIG. 9C show an example in which times t1 to t8 are used as the elapsed time when coffee is extracted using the coffee extractor 1. In this case, since the value of M is 43046721, it is assumed that the number of pieces of audio information 61 cannot be prepared (or stored in the storage unit 24). In such a case, a part of the audio information 61 may be duplicated with respect to the same output target data OI.

It is assumed that the images of the surface of coffee accumulated in the container 30 shown in FIG. 8(1)-(8) has been acquired from time t1-t8.

FIG. 9A shows a storage example in the case of storing an area having the largest ratio of black among the areas A to I shown in FIG. 6A in association with the times t1 to t8 at each time of t1 to t8.

First, the power of the electronic device 20 is turned on. The power on-off can be performed by providing a switch (the operation unit 26) for turning on and off the power to the electronic device 20 and can be operated manually by user. Further, some sensor (e.g., sound sensor) may be provided in the electronic device 20, the power on and off by the sensor may be performed automatically. In addition, a wireless communication unit may be provided in the electronic device 20 to turn on/off the power on the basis of an operation of an external device (a smart phone for example).

Thus, after the power of the electronic device 20 is turned on, the image acquisition unit 22 of the electronic device 20 (shown in FIG. 4) sequentially acquires the captured images (including image data) of coffee accumulated in the container 30.

Further, the control unit 23 of the electronic device 20 (shown in FIG. 4) sequentially acquires images (captured images of the coffee accumulated in the container 30 (including image data)) acquired by the image acquisition unit 22 of the electronic device 20 (shown in FIG. 4).

Here, after the power of the electronic device 20 is turned on, the first information to be judged (the image of the surface of the coffee accumulated in the container 30) may be determined on the basis of the elapse of time, may be determined on the basis of a change in the image, or may be determined on the basis of an operation from the outside. For example, the timing that a predetermined time (e.g., 1 second-20 seconds, the time of steaming) has elapsed after a change occurs in the image of the surface of the coffee accumulated in the container 30 after the power of the electronic device 20 is turned on can be set to time t1. The change in the image of the surface of the coffee accumulated in the container 30 is, for example, a change due to the first drop of the coffee liquid on the bottom 31 of the container 30 (in other words, a change due to the generation of the color (black) of the coffee liquid).

In this manner, the control unit 23 sets the image acquired at the timing of time t1, i.e., the image of the surface of the coffee accumulated in the container 30, as the first judgement target. Then, the control unit 23 determines a circular area (a circular area corresponding to the surface of the coffee (liquid) 41 accumulated in the container 30) in the image acquired at the timing of time t1. Note that the circular area in the image obtained at the timing of time t1 is often the same (or nearly the same) as the size of the bottom 31 of the container 30 because there is hardly any coffee accumulated in the container 30.

Here, the circular area in the image acquired by the control unit 23 is reduced according to the lapse of time. That is, since the surface of the coffee (liquid) 41 becomes higher as the amount of the coffee (liquid) 41 accumulated in the container 30 increases, the area (circular area) of the surface of the coffee (liquid) 41 decreases in accordance with the shape of the container 30. Therefore, as shown in FIGS. 8(1) to (8), the control unit 23 changes the size of the areas A to I in accordance with the determined circular area (a circular area corresponding to the surface of the coffee (liquid) 41 accumulated in the container 30). About the sizes of the regions A to I, it may be fixed without being changed, and performed judgement processing.

Next, the control unit 23 acquires the feature quantity for the image included in the circular area (the circular area corresponding to the surface of the coffee (liquid) 41 accumulated in the container 30) in the image acquired at the timing of time t1. Specifically, the control unit 23 acquires the feature quantity for each image (each image included in the areas A to I shown in FIG. 6A) included in the circular area in the image acquired at the timing of time t1. For example, the control unit 23 obtains information on the color of the coffee as the feature quantity for each image included in the areas A to I. For example, the control unit 23 determines each pixel in each image included in the image acquired by the image acquisition unit 22 to be the black area or the white area. For example, it can be determined by a binarization process (for example, a process which sets up the threshold value preliminarily will judge to be white if the value of a pixel is larger than a threshold value, and will judge to be black if smaller). Note that it is preferable that the threshold value used for the binarization processing is set to a value so that coffee and bubbles can be distinguished from each other. Then, the control unit 23 obtains the ratio of the black region and the white region in each image included in the areas A to I as the feature quantity.

Next, the control unit 23 determines an area which the ratio of the black region is the highest from among the images included in the areas A to I. In the example shown in FIG. 8(1), among the images included in the areas A to I, that are having the highest ratio of black region is the area A. For this reason, the control unit 23 determines the area A as the area having the highest ratio of the black region with respect to the image acquired at the timing of the time t1.

After that, similarly, the control unit 23 determines an area having the highest ratio of the black region for each image (the image of the surface of the coffee accumulated in the container 30) acquired at the timing from time t2 to time t8. Then, the control unit 23 successively stores the feature quantity determined for each image acquired at the timings of the times t1 to t8 in the storage unit 24 in association with the times t1 to t8. An example of this storage is shown in FIG. 9A. That is, the storage example shown in FIG. 9A is a storage example for the example shown in FIGS. 8(1) to 8.

FIG. 9B shows an extraction example in the case of extracting a feature quantity corresponding with the feature quantity shown in FIG. 9A (information associating the times t1 to t8 with the areas A to I) from the judgement information shown in FIG. 6B. The judgement information shown in FIG. 9B is the same as the judgement information shown in FIG. 6B, and a part of the judgement information shown in FIG. 6B is omitted.

Next, the control unit 23 determines output information from the audio output unit 25 on the basis of the acquired feature quantity. Specifically, the control unit 23 extracts a feature quantity that matches the acquired feature quantity (information associating the times t1 to t8 shown in FIG. 9A with the areas A to I) from the judgement information shown in FIG. 6B. For example, as shown in FIG. 9B, the feature quantity shown in FIG. 9A matches the feature quantity shown in the dashed rectangle 51. Therefore, the control unit 23 extracts the feature quantity shown in the dashed rectangle 51 as the feature quantity matching the feature quantity shown in FIG. 9A from the judgement information shown in FIG. 9B. In addition, the control unit 23 determines OIX1 as the data OI (output information) corresponding to the extracted feature quantity.

Next, the control unit 23 causes the audio output unit 25 to output audio on the basis of the audio information 61 stored in the storage unit 24 in association with OIX1 determined as the output target data OI. For example, as shown in FIG. 9C, on the basis of the audio information 61 (shown in the dashed rectangle 52) associated with OIX1, the sound audio unit 25 outputs a sound of "Let's wait like snowman without haste today". An example of this output is shown in FIG. 10.

[Example of Outputting Audio Information from Electronic Device when Brewing Coffee]

Figure 10:
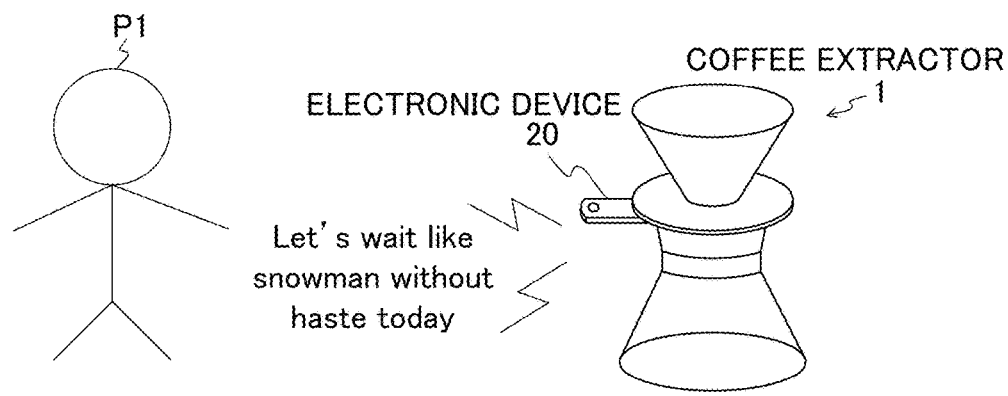
FIG. 10 is a simplified diagram showing an example of a case where audio information is output from the electronic device 20 according to the first embodiment.

FIG. 10 is a simplified diagram showing an example of outputting audio information from the electronic device 20 according to the first embodiment. The example shown in FIG. 10 shows an example of outputting the audio information determined by the example shown in FIG. 8 to FIG. 9C.

As described above, the control unit 23 causes the audio output unit 25 to output the sound of "wait as hard as snow today" on the basis of the sound information associated with OIX1 (in the dashed rectangle 52 in FIG. 9C). As a result, the user P1 who is brewing coffee using the coffee extractor 1 can hear the sound based on the feature quantity acquired by the extraction after brewing the coffee which is user's ideals. For example, even if the user P1 is a professional or a layman of coffee brewing, it is considered that the color or pattern appearing on the surface of the coffee accumulated in the container 30 often differs each time. Therefore, by using such characteristics of the coffee, when the coffee is extracted it is possible to enjoy the audio information (information unrelated to the coffee or extraction of the coffee) based on the feature quantity acquired at the time of the extraction as well as the drinking the extracted coffee.

[Example of Output the Audio Information]

Figure 11:
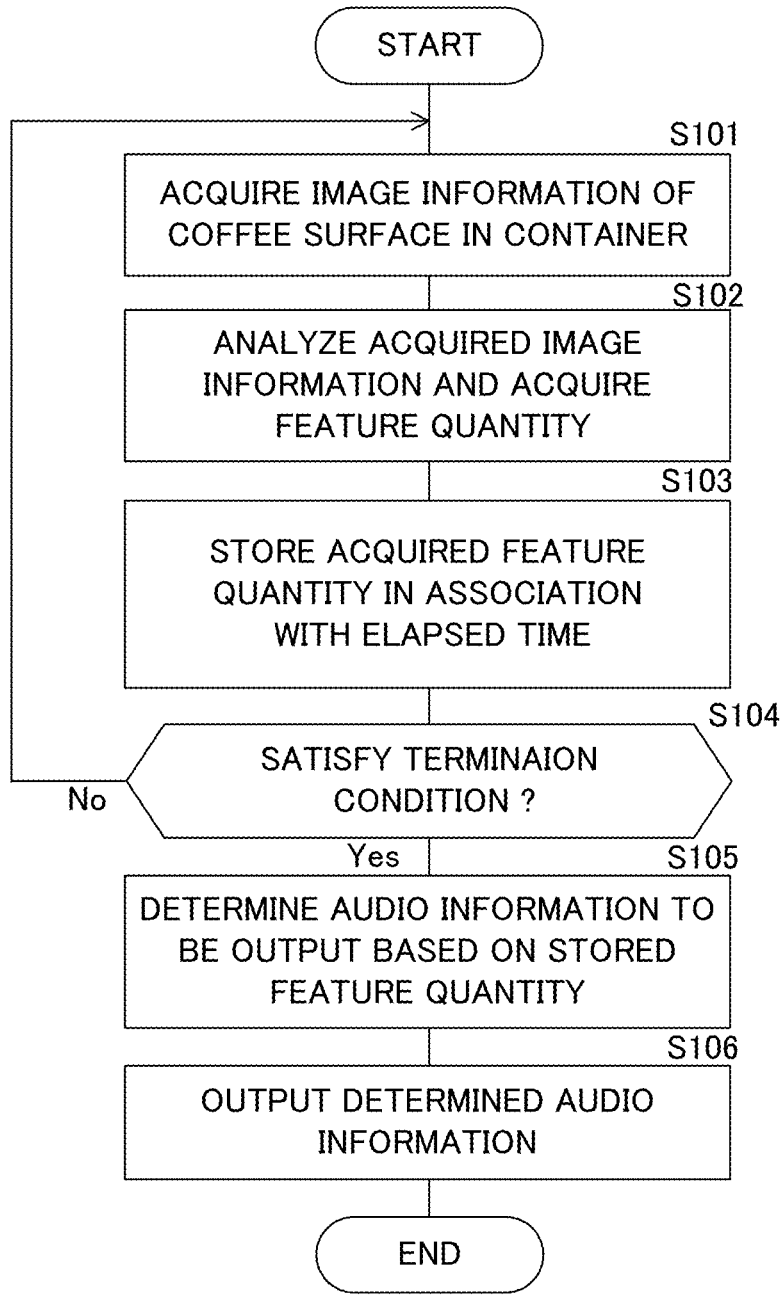
FIG. 11 is a flowchart showing an example of audio output processing by the electronic device 20 in the first embodiment.

FIG. 11 is a flowchart showing an example of the audio output processing by the electronic device 20 in the first embodiment. FIG. 11 shows an example of an operation after a change occurs in an image of the surface of the coffee accumulated in the container 30 after the power of the electronic device 20 is turned on by the operation of the operation unit 26.

At first, the image acquisition unit 22 of the electronic device 20 (shown in FIG. 4) sequentially acquires the captured images (including image data) of the coffee accumulated in the container 30 (step S101), on the basis of the control unit 23 of the electronic device 20 (shown in FIG. 4). Further, the control unit 23 sequentially acquires the images acquired by the image acquisition unit 22 (the images of coffee accumulated in the container 30 is captured (including image data)) (step S101).

Next, the control unit 23 analyzes the acquired image information and acquires the feature quantity (step S102). For example, the control unit 23 determines a circular area (a circular area corresponding to the surface of the coffee (liquid) 41 accumulated in the container 30) in the acquired image. Next, the control unit 23 acquires the feature quantity for the image included in the determined circular area. Specifically, the control unit 23 acquires the feature quantity (the ratio of the black area and the white area) for each image (each image included in the areas A to I shown in FIG. 6A) included in the circular area in the acquired image. Next, the control unit 23 determines an area having the highest ratio of the black region among the images included in the areas A to I.

Next, the control unit 23 stores the acquired feature quantity in the storage unit 24 in association with the elapsed time (step S103). For example, as shown in FIG. 9A, the control unit 23 stores the feature quantity (areas having the highest ratio of black region) determined for each image acquired at the timing of times t1 to t8 in the storage unit 24 in association with times t1 to t8.

Next, the control unit 23 determines whether the termination condition is satisfied or not (step S104). Then, if the termination condition is not satisfied, the process returns to step S101, and if the termination condition is satisfied, the process proceeds to step S105.

Here, as a criterion for judging whether the termination condition is satisfied or not, for example, it is possible to use whether a predetermined time has elapsed, or whether a change doesn't occur (or hardly occurs) or not in the acquired image information. For example, the predetermined time can be determined on the basis of an elapsed time since the power of the electronic device 20 is turned on, or an elapsed time after the image of the surface of the coffee accumulated in the container 30 is changed after the power of the electronic device 20 is turned on. The predetermined time may be a preset time or may be a time according to the preference of the user by a user operation. For example, as the examples shown in FIG. 8 to FIG. 9C, when image information is acquired at the timing from time t1 to t8, the predetermined time is time t8 (or after time t8 has elapsed). Further, for example, whether the change of the acquired image information does occur or not can be determined on the basis of the fact that the acquired image information is analyzed by comparing successive images in time series, and time having the difference between images being equal to or less than a predetermined value continues for a predetermined period of time. That is, whether the change of the acquired image information does not occur or not can be determined on the basis of whether a predetermined time has elapsed or not since the image of the surface of the coffee accumulated in the container 30 has not changed. Incidentally, there is a possibility that it is judged that no change occurs due to the fogging of the lens 21.

When the termination condition is satisfied (step S104), the control unit 23 determines output information from the audio output unit 25 on the basis of the acquired feature quantity (step S105). For example, the control unit 23 extracts a feature quantity that matches the acquired feature quantity (e.g., information associating the times t1 to t8 shown in FIG. 9A with the areas A to I) from the judgement information shown in FIG. 6B. Next, the control unit 23 determines the information (output information) OI corresponding to the extracted feature quantity, and determines the audio information 61 (shown in FIG. 7) stored in the storage unit 24 in association with the determined information (data OI to be output).

Next, the control unit 23 causes the audio output unit 25 to output audio on the basis of the determined audio data (step S106). For example, as shown in FIG. 10, sound is output from the audio output unit 25.

[Examples Using Other Judgment Information]

Although an example which the sound output information is determined using the judgement information shown in FIG. 6A and FIG. 6B has been described above, the sound output information may be determined using other judgement information. Therefore, an example which other judgement information is used will be described here.

FIG. 12A and FIG. 12B is a diagram showing an example of used various types of information when output information is determined by the electronic device 20 according to the first embodiment.

FIG. 12A shows an example of an image pattern relating to the surface of the coffee accumulated in the container 30. As shown in FIG. 12A, a pattern of an image which is supposed to occur on the surface of the coffee accumulated in the container 30 is stored in the storage unit 24 as judgement information. In FIG. 12A, the image pattern is shown in a simplified manner for easy explanation. The number N of image patterns, where N is a positive integer, may be increased or decreased in accordance with the storage capacity of the storage unit 24.

FIG. 12B shows an example of judgement information (table) for determination of output information on the basis of information acquired using the judgement information (image patterns PA1 to PAN) shown in FIG. 12A. The judgement information shown in FIG. 12B is information indicating the correspondence relationship between the transition of the information on the coffee accumulated in the container 30 (for example, the surface of the coffee (liquid) 41 accumulated in the container 30) and the data OI to be output. Note that the judgement information shown in FIG. 12B corresponds to the judgement information shown in FIG. 6B, and as for the same information as FIG. 6B, it is the same as FIG. 6B, therefore description is omitted here.

For example, the control unit 23 (shown in FIG. 4) determines a circular area (a circular area corresponding to the surface of the coffee (liquid) 41 accumulated in the container 30) in the image acquired from the image acquisition unit 22 (shown in FIG. 4). Next, the control unit 23 compares the image included in the determined circular area with the respective image patterns PA1 to PAN in the judgement data shown in FIG. 12A, and extracts the image pattern having the highest degree of similarity as the feature quantity.

For example, each pixel of each image pattern PA1 to PAN shall represent a binary value (black, white). Further, the control unit 23 determines each pixel in the image included in the determined circular area to either the black region or the white region (e.g., binarization process). Next, the control unit 23 compares each pixel (black, white) in the image included in the determined circular area with each pixel (black, white) of each image pattern PA1 to PAN by the corresponding pixels (pixels of the same position in the circular area) and calculates the number of matched pixels for each image pattern PA1 to PAN. Next, the control unit 23 extracts the image pattern PA1 to PAN having the highest number of matched pixels as the image pattern having the highest degree of similarity.

Next, the control unit 23 associates the extracted image patterns PA1 to PAN with the elapsed time and stores the image patterns in the storage unit 24. For example, the control unit 23 stores, in the storage unit 24, the feature quantity (image patterns PA1 to PAN) determined for the respective images acquired at the timings of the times t1 to t8 in association with the times t1 to t8.

Next, the control unit 23 determines output information from the audio output unit 25 on the basis of the acquired feature quantity. For example, the control unit 23 extracts a feature quantity that matches the acquired feature quantity (e.g., information in which the times t1 to t8 and the image patterns PA1 to PAN are associated with each other), from the judgement information (table) shown in FIG. 12B. Next, the control unit 23 determines information (output information) OI corresponding to the extracted feature quantity and determines audio information stored in the storage unit 24 in association with the determined information (output information OI).

[Example of Using Drip Speed as Judgement Information]

For example, the transition of the size of the circular area corresponding to the surface of the coffee (liquid) 41 accumulated in the container 30 can be used as the judgement information. That is, the speed of the drip can be used as the judgement information.

For example, a plurality of sizes of a circular area corresponding to the surface of the coffee (liquid) 41 accumulated in the container 30 are stored in the storage unit 24 as judgement information. Then, the control unit 23 (shown in FIG. 4) compares the size of the circular area (the circular area corresponding to the surface of the coffee (liquid) 41 accumulated in the container 30) in the image acquired from the image acquisition unit 22 (shown in FIG. 4) with a plurality of sizes held in the storage unit 24, and extracts the size having the highest degree of similarity as feature quantity. Next, the control unit 23 stores the extracted size in association with the elapsed time in the storage unit 24. Next, the control unit 23 determines output information from the audio output unit 25 on the basis of the acquired feature quantity. For example, the control unit 23 extracts a feature quantity that matches the acquired feature quantity (e.g., information associating the sizes with the times t1 to t8) from the judgement information corresponding to FIG. 6B and FIG. 12B. Next, the control unit 23 determines information (output information) OI corresponding to the extracted feature quantity and determines audio information stored in the storage unit 24 in association with the determined information (output information OI).

Further, the height of the coffee (liquid) 41 accumulated in the container 30 may be used as the judgement information. In this case, a sensor for acquiring the height of the coffee (liquid) 41 accumulated in the container 30 (e.g., an ultrasonic distance sensor, an image sensor for acquiring an image of the side surface of the transparent container 30) is provided in the electronic device 20 or the coffee extractor 1, and use to acquire the height of the coffee (liquid) 41 accumulated in the container 30.

[Example of Using Dropped Ripples and the Direction of Coffee Droplet Advancement as Judgment Information]

For example, various kinds of information such as a ripple of a water droplet (coffee) falling on the surface of the coffee (liquid) 41 accumulated in the container 30, a direction in which a water droplet (coffee) falling on the surface of the coffee (liquid) 41 accumulated in the container 30 progresses (a direction of the progress on the surface), a length of the progress, and an amount of bubbles caused by a water droplet (coffee) which fall on the surface of the coffee (liquid) 41 accumulated in the container 30 can be used as judgment information. That is, a natural phenomenon occurring during the drip can be used as the judgement information.

For example, when detecting ripples of water droplets (coffee) falling on the surface of the coffee (liquid) 41 accumulated in the container 30, one or a plurality of ripple image patterns for specifying the ripples are stored in the storage unit 24. Then, the control unit 23 (shown in FIG. 4) detects that the ripple has occurred when the ripple image pattern matching is detected from the image of the circular area in the image acquired from the image acquisition unit 22 (shown in FIG. 4) (a circular area corresponding to the surface of the coffee (liquid) 41 accumulated in the container 30). In this case, the control unit 23 can store the type of ripples (can be identified by ripple image pattern), the position where the ripples are generated (the position in the circular area corresponding to the surface of the coffee (liquid) 41 accumulated in the container 30), the ripples generated timing (elapsed time) and the like in the storage unit 24 in association with the elapsed time. Next, the control unit 23 determines output information from the audio output unit 25 on the basis of the acquired feature quantity. For example, various types of information such as whether a ripple has occurred or not, the number of times a ripple has occurred, the type of a ripple, the generation time of a ripple, the position of a ripple and the like are stored in association with the data OI to be output, and the data OI to be output can be determined on the basis of the various types of information, and the audio information stored in the storage unit 24 can be determined in association with the determined information (data OI to be output).

In addition, for example, in the case of detecting the advancing direction of water droplet (coffee) falling on the surface of the coffee (liquid) 41 accumulated in the container 30 and the advancing length thereof, judgement information for detecting the water droplet (for example, information for detecting an object traveling linearly in each image consecutive in time series) is stored in the storage unit 24. Then, the control unit 23 (shown in FIG. 4) detects the occurrence of a water droplet traveling on the surface in an image of a circular area (a circular area corresponding to the surface of the coffee (liquid) 41 accumulated in the container 30) acquired from the image acquisition unit 22 (shown in FIG. 4). In this case, the control unit 23 can store the position where the water droplets traveling through the surface is generated (the position in the circular area corresponding to the surface of the coffee (liquid) 41 accumulated in the container 30), the length of the water droplets traveling through the surface, water droplets traveling through the surface in the storage unit 24 in association with the elapsed time such as the timing (elapsed time) that has occurred. Next, the control unit 23 determines output information from the audio output unit 25 on the basis of the acquired feature quantity. For example, various types of information such as whether a water droplet traveling on the surface has been generated or not, the number of times a water droplet has been generated traveling on the surface, the total length of the water droplet traveling on the surface, the generation time of a water droplet traveling on the surface, the position of a water droplet traveling on the surface, and the like are stored in association with the data OI to be output, and the data OI to be output is determined on the basis of the various types of information, and the audio information stored in the storage unit 24 can be determined in association with the determined data OI to be output.

For example, when detecting the amount of bubbles generated by water droplets (coffee) falling on the surface of the coffee (liquid) 41 accumulated in the container 30, a plurality of image patterns for detecting the amount of bubbles are stored in the storage unit 24 instead of the image pattern shown in FIG. 12A. Similarly to the determination method using the judgement information shown in FIG. 12A, the audio information can be determined.

The judgement information described above is an example, and other judgement information may be used. For example, the position (position on the surface) of the water droplet (coffee) falling on the surface of the coffee (liquid) 41 accumulated in the container 30, the degree of spreading of the water droplet on the surface, the density (e.g., the degree of coffee color) of the surface of the coffee (liquid) 41 accumulated in the container 30, the distribution of the bubble generated by the water droplets (coffee) falling on the surface of the coffee (liquid) 41 accumulated in the container 30, the ratio of the bubble to the surface, and the natural phenomenon generated during the drip of each of these transitions can be used as the judgement information. In addition, the determination may be performed by combining the respective pieces of judgement information described above. For example, a combination of dropped ripples and the direction of advancement of water droplets can be used to make the determination.

Further, in the first embodiment, an example in which the electronic device 20 is integrally formed has been described, but the electronic device 20 may be formed of a plurality of members. For example, the lens 21, the image acquisition unit 22, and other parts may be configured separately, and the transmission of the image information from the image acquisition unit 22 to the control unit 23 may be performed by wire or wireless. The position where the electronic device 20 is installed is not limited to the position shown in FIG. 1A, FIG. 1B, FIG. 3A to FIG. 3D. For example, if an image of the surface of the coffee (liquid) 41 that accumulates in the container 30 can be acquired through the lens 21, it may be provided at other positions. For example, the electronic device 20 may be disposed outside the transparent container 30 so that the lens 21 faces the surface of the coffee 41 accumulated in the container 30. However, in order to prevent the influence of heat generated in the container 30, it is preferable to perform heat insulating treatment with a heat insulating member or the like.

Second Embodiment: An Example of Providing Audio Information and Image Information Using Colors and Patterns Formed when Brewing Coffee In the first embodiment, an example which audio information is provided using colors or patterns formed when brewing coffee is shown, but other information may be provided. Therefore, in the second embodiment, an example which audio information and image information are provided using colors and patterns formed when coffee is brewed is shown. Note that the second embodiment is a modification of the first embodiment, and a part of the description of a common part to the first embodiment is omitted.

[Example of Appearance of Coffee Extractor]

Figure 13A:
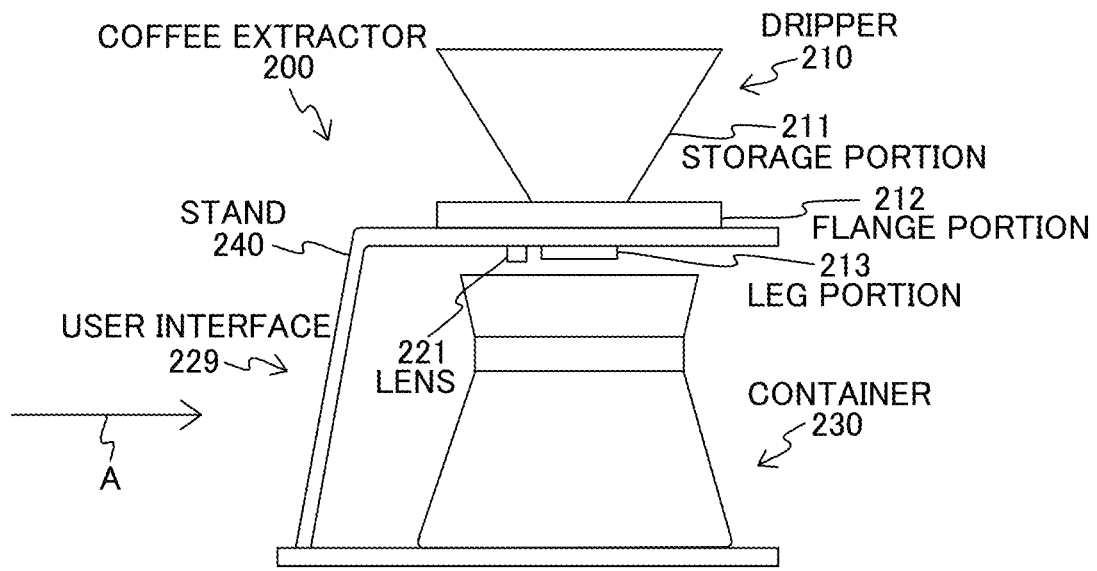
FIG. 13A is a perspective view showing an example of an external configuration of a coffee extractor 200 to which the electronic device 220 in the second embodiment is attached.
Figure 13B:
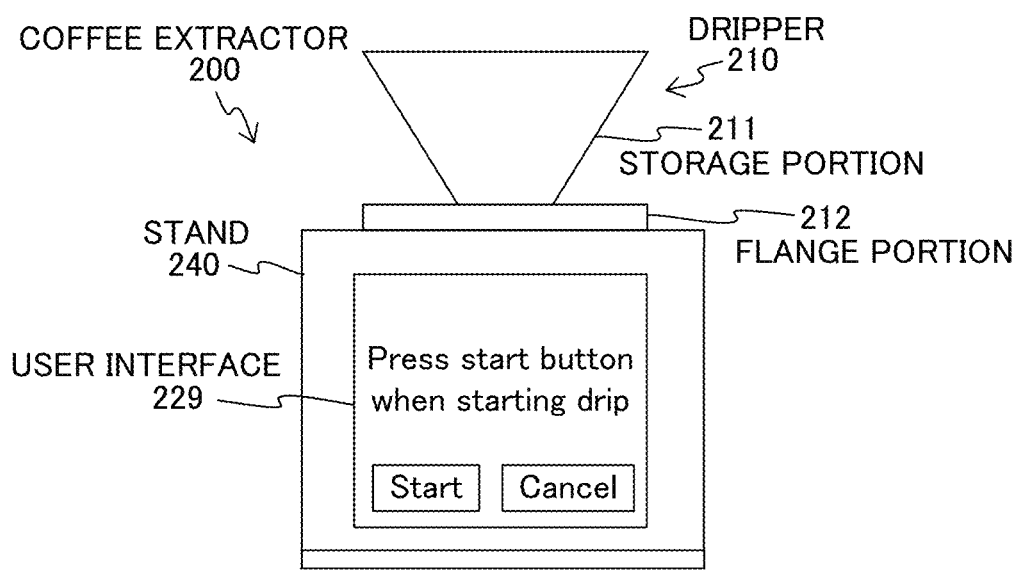
FIG. 13B is a perspective view showing an example of an external configuration of a coffee extractor 200 to which the electronic device 220 in the second embodiment is attached.

FIG. 13A and FIG. 13B is a perspective view showing an example of the external configuration of the coffee extractor 200 to which the electronic device 220 according to the second embodiment is attached. FIG. 13A shows a side view of the coffee extractor 200, and FIG. 13A shows a side view of the coffee extractor 200 (seen from the direction of the arrow A shown in FIG. 13A).

The coffee brewer 200 includes the dripper 210, the electronic device 220 (shown in FIG. 14), the container 230, and the stand 240. In the coffee extractor 200, the electronic device 220 is provided in the stand 240 instead of providing the electronic device 20 in the dripper 10 in the coffee extractor 1 shown in FIG. 1A and FIG. 1B. The container 230 is similar to the container 30 shown in FIG. 1A and FIG. 1B. The dripper 210 is substantially the same as the dripper 10 shown in FIG. 1A, FIG. 1B, FIG. 3A to FIG. 3D. In addition, here, a description will be given focusing on points different from the coffee extractor 1 in the first embodiment.

The stand 240 is a support base for supporting the dripper 210, and a flat plate-like member can be formed in a U-shape (shown in FIG. 13A). For example, the upper part of the stand 240 (the portion where the flange portion 212 shown in FIG. 13A is installed), holes (e.g., circular shape) having larger diameter than the diameter of the leg portion 213 of the lower part of the dripper 210, and smaller diameter than the diameter of the flange portion 212 of the dripper 210 are provided. When the dripper 210 is installed on the stand 240, the lower leg portion 213 of the dripper 210 can be installed so as to enter the hole of the stand 240.

Further, on the outside of the hole of the upper part of the stand 240 (the portion where the flange portion 212 shown in FIG. 13A is installed), the lens 221 is disposed. It is preferable to install the lens 221 at a position where the liquid (coffee) falling from the hole (inside of the leg portion 213) of the dripper 210 does not come into contact with, and is less affected by the heat of the liquid.

The user interface 229 is disposed at the center (back) of the stand 240. The user interface 229 can be configured by, for example, a touch panel that displays various types of information and accepts a user operation.

[Example of Functional Configuration of Electronic Devices]

Figure 14:
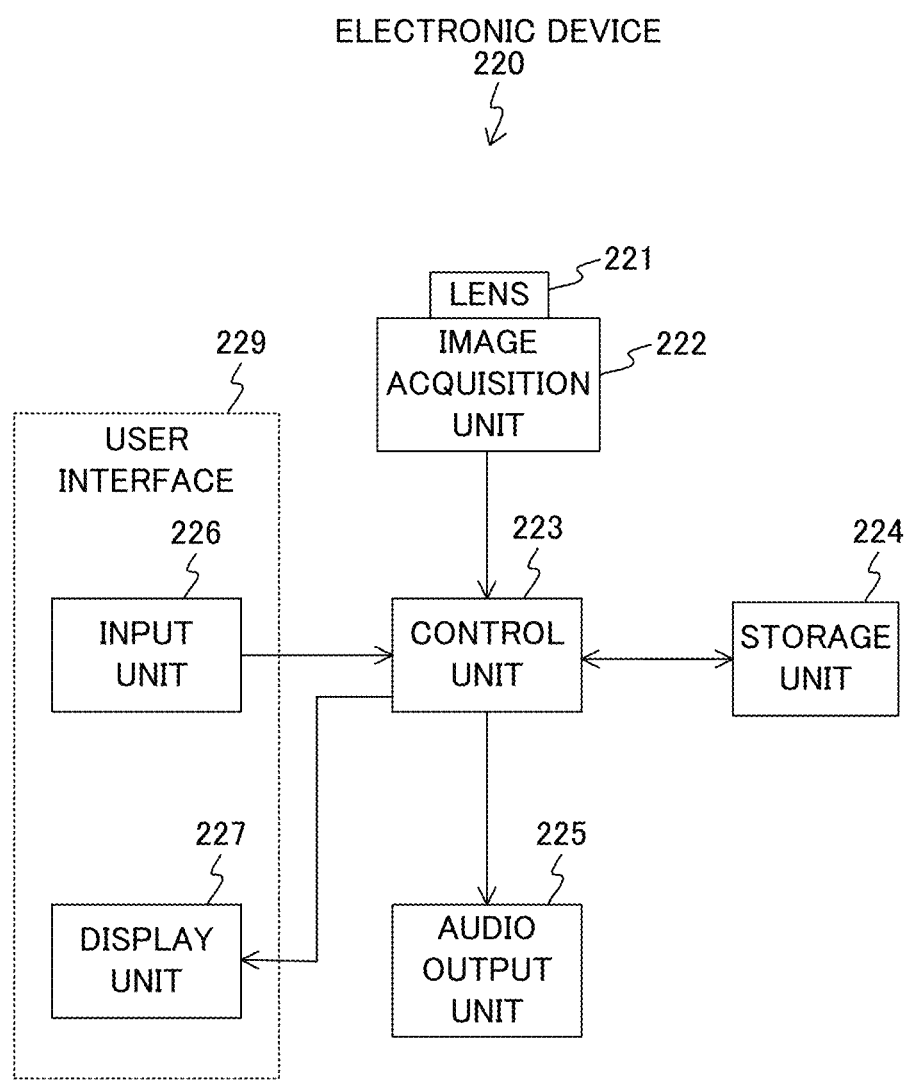
FIG. 14 is a block diagram showing a functional configuration example of the electronic device 220 in the second embodiment.

FIG. 14 is a block diagram showing an example of the functional configuration of the electronic device 220 according to the second embodiment.

The electronic device 220 includes the lens 221, the image acquisition unit 222, the control unit 223, the storage unit 224, the audio output unit 225, and the user interface 229. Incidentally, the electronic device 220 is obtained by adding the user interface 229 to the electronic device 20 shown in FIG. 4, the other portions are common to the electronic device 20 shown in FIG. 4. Therefore, here, the description will focus on the points different from the electronic device 20 shown in FIG. 4. As shown in FIG. 13A and FIG. 13B, the lens 221 and the image acquisition unit 222 are installed on the top of the stand 240, and the user interface 229 is installed on the back of the stand 240. Other parts may be integrated with the user interface 229 and installed at the center (back) of the stand 240 or may be installed at the bottom or top of the stand 240.

The user interface 229 includes the input unit 226 and the display unit 227.

The input unit 226 is an operation accepting unit that accepts an operation input performed by a user, and outputs operation information corresponding to the accepted operation input to the control unit 223. The input unit 226 is realized by, for example, a touch panel, a keyboard, a mouse, or a sensor such as a touch interface.

The display unit 227 is a display unit for outputting various information on the basis of the control of the control unit 223. As the display unit 227, for example, a display panel such as an organic EL (Electro Luminescence) panel or an LCD (Liquid Crystal Display) panel can be used. As described above, the input unit 226 and the display unit 227 can be integrally configured using a touch panel capable of performing an operation input by the user contacting or approaching the finger to the display surface. However, the input unit 226 and the display unit 227 may be configured separately, and the operation of the input unit 226 may be accepted by an operation member. In addition, an operation member separating from the user interface 229 such as a touch panel may be provided, and the operation may be accepted by the operation member.

[Example of Output Target Information]

FIG. 15 is a diagram showing an example of output information by the electronic device 220 according to the second embodiment. In this example, an example of using the judgement information shown in FIG. 6A, FIG. 6B.

FIG. 15 shows an example of output target information (information being output target) determined using the judgement information shown in FIG. 6B. For example, when OI1 is determined as the data OI to be output, information related to Santa (voice information 61 and image information 62) becomes an output target. The information related to Santa is, for example, information (audio information 61) for outputting a sound of "I am going to dream of Santa today" or information (image information 62) for displaying a photograph or a graphic image of Santa. In FIG. 15, for ease of explanation, characters to be sound output targets and images to be displayed are shown in a simplified manner. Examples of these outputs will be described with reference to FIG. 17.

[Example of Determining the Information to be Output Using the Color and Pattern Formed when Brewing Coffee]

FIG. 16A to FIG. 16C is a diagram showing an example of determination of output information by the electronic device 220 according to the second embodiment. The example shown in FIG. 16A to FIG. 16C shows an example which times t1 to t8 are used as the elapsed time when the coffee is extracted using the coffee extractor 200, similarly to the example shown in FIG. 9A to FIG. 9C. FIG. 16A and FIG. 16B are the same as FIG. 9A and FIG. 9B.

As shown in the first embodiment, the control unit 223 (shown in FIG. 14) extracts, from the judgement information shown in FIG. 16B, the feature quantity shown in the dashed rectangle 51 as the feature quantity corresponding with the feature quantity shown in FIG. 16A. The control unit 223 determines OIX1 as the data OI corresponding to the extracted feature quantity.

Next, the control unit 223 causes the audio output unit 225 to output audio on the basis of the audio information 61 stored in the storage unit 224 in association with OIX1 determined as the output target data OI. In addition, the control unit 223 causes the display unit 227 to display an image on the basis of the image information 62 stored in the storage unit 224 in association with OIX1 determined as the output target data OI.

For example, as shown in FIG. 16C, on the basis of the audio data 61 associated with OIX1 (shown in the dashed rectangle 54), the audio output unit 225 outputs the audio "Let's wait like snowman without haste today". Further, for example, as shown in FIG. 16C, an image of Santa is displayed on the display unit 227 on the basis of the image information 62 (shown in the dashed rectangle 54) associated with OIX1. An example of this output is shown in FIG. 17.

[Example of Outputting Audio Information and Image Information from Electronic Device when Brewing Coffee]

Figure 17:
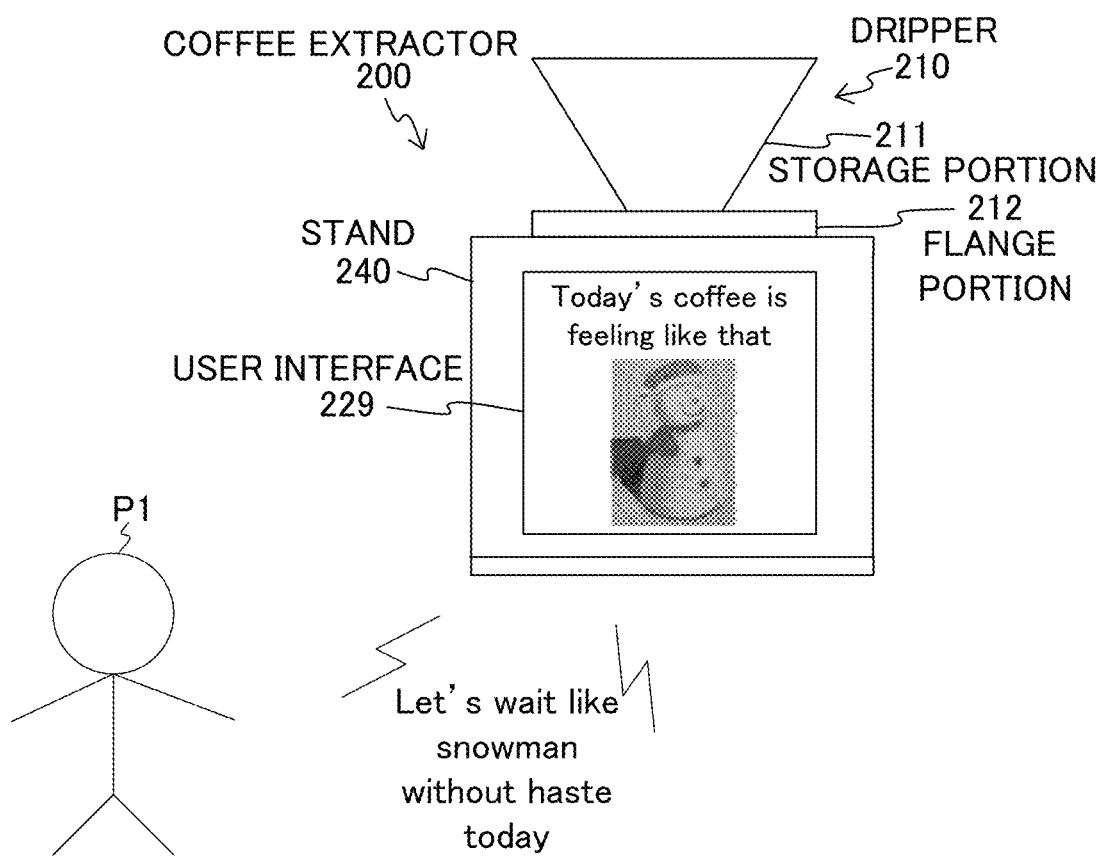
FIG. 17 is a diagram showing a simplified example of a case of outputting audio information and image information from the electronic device 220 in the second embodiment.

FIG. 17 is a simplified diagram showing an example of outputting audio information and image information from the electronic device 220 according to the second embodiment. The example shown in FIG. 17 shows an example of outputting voice information determined by the example shown in FIG. 8, FIG. 16A to FIG. 16C.

As described above, the control unit 223 causes the audio output unit 25 to output the sound of "wait as hard as snow today" on the basis of the audio (in the dashed rectangle 54 in FIG. 16C) associated with OIX1. In addition, the control unit 223 causes the display unit 227 to display a Santa image on the basis of the image data 62 (in the dashed rectangle 54 in FIG. 16C) associated with OIX1. As a result, the user P1 who is brewing coffee using the coffee extractor 200 can enjoy the sound and the image based on the feature quantity acquired by the extraction after brewing the coffee of user's ideals. Thus, by displaying the image together with the voice, the user P1 can visually enjoy the information based on the feature quantity acquired by the extraction. Although FIG. 17 shows an example which the sound and the image are output simultaneously, the sound and the image may be output at different timings, or only the image may be output.

[Operation Example for Outputting Audio and Image Information]

Figure 18:
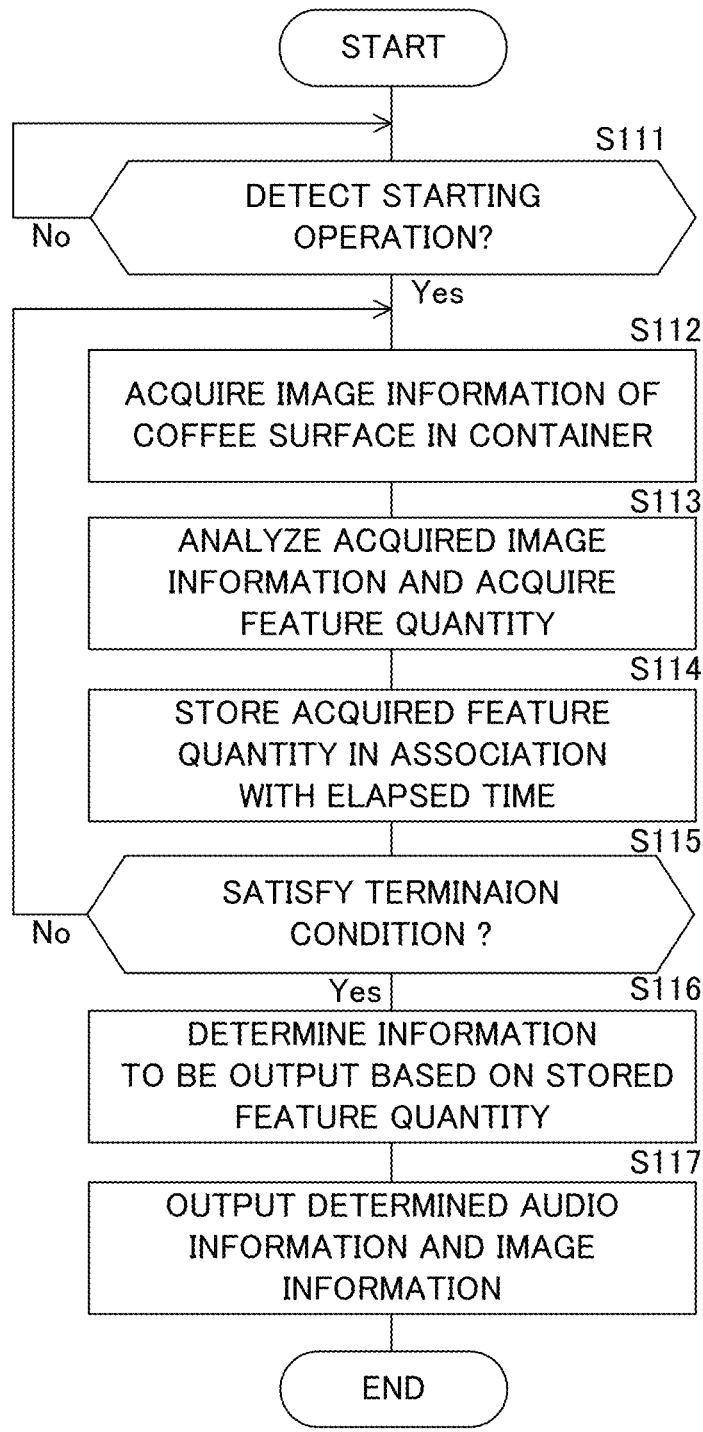
FIG. 18 is a flowchart showing an example of information output processing by the electronic device 220 in the second embodiment.

FIG. 18 is a flowchart showing an example of information output processing by the electronic device 220 according to the second embodiment. The step S112~S115 shown in FIG. 18 corresponds to the step S101~S104 shown in FIG. 11. Therefore, here, the description will focus on points different from the example shown in FIG. 11.

First, the control unit 223 of the electronic device 220 determines whether there is a starting operation or not (step S111). For example, it is determined whether there is a touch operation of the start button (shown in FIG. 13B) in the user interface 229 or not. If there is a start operation (step S111), the process proceeds to step S112. If there are no starting operations (step S111), the monitoring is continued.

As described above, the step S112~S115 corresponds to the step S101~S104 shown in FIG. 11.

Here, as a criterion for judging whether the end condition of the step S115 is satisfied or not, for example, it may be judged whether there is an end manipulation by the user or not in addition to the judgment criterion shown in the first embodiment. For example, after the touch operation of the start button (shown in FIG. 13B) is performed on the user interface 229, the end button may be displayed, and when the touch operation of the end button is performed, it may be determined that the end condition is satisfied.

When the termination condition is satisfied (step S115), the control unit 223 determines output information on the basis of the acquired feature quantity (step S116). That is, the control unit 223 determines the audio information and the image information stored in the storage unit 224 in association with the determined information, i.e., the data OI to be output.

Next, the control unit 223 causes the audio output unit 225 to output audio on the basis of the determined audio information, and causes the user interface 229 (display unit 227) to display an image on the basis of the determined image information (step S117). For example, as shown in FIG. 17, sound is output from the sound output unit 225, and an image is displayed on the user interface 229 (display unit 227).

Third Embodiment: An Example of Outputting Audio Information and Image Information in an External Device In the first and second embodiments, an example which audio information and image information are output by an electronic device attached to a coffee extractor has been described. However, the audio information and the image information may be output from a device other than the coffee extractor. Thus, as for the electronic device attached to the coffee extractor, since it is not necessary to provide an audio output unit and a display unit or the like, it is possible to reduce the manufacturing cost of the electronic device. Note that the third embodiment is a modification of the first and second embodiments, and a part of the description of a part common to the first and second embodiments is omitted.

[Example of Functional Configuration of Electronic Devices]

Figure 19:
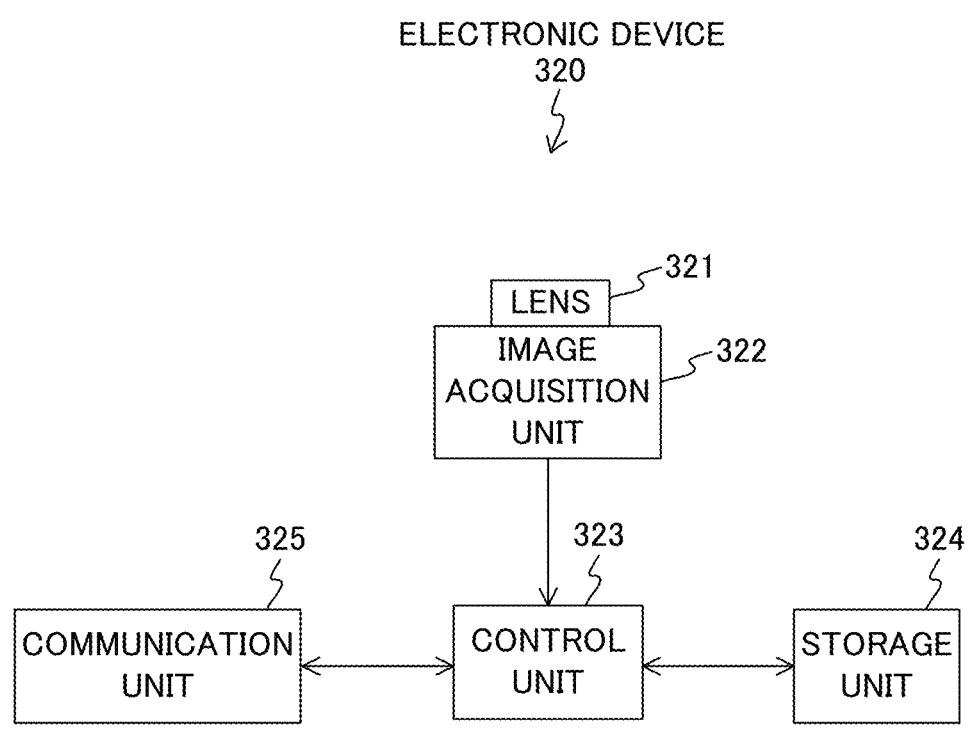
FIG. 19 is a block diagram showing a functional configuration example of the electronic device 320 in the third embodiment.

FIG. 19 is a block diagram showing an example of the functional configuration of the electronic device 320 according to the third embodiment.

The electronic device 320 includes a lens 321, an image acquisition unit 322, a control unit 323, a storage unit 324, and a communication unit 325. Incidentally, the electronic device 320 is obtained with the addition of the communication unit 325 in the electronic device 20 shown in FIG. 4 and the omitting the audio output unit 25, and other portions are common to the electronic device 20 shown in FIG. 4, the electronic device 220 shown in FIG. 14. Therefore, here, the description will focus on points different from the electronic device 20 shown in FIG. 4 and the electronic device 220 shown in FIG. 14. In FIG. 19, although not shown, the audio output unit or the user interface may be provided.

The communication unit 325 exchanges various types of information with other devices via a wired or a wireless line under the control of the control unit 323. For example, in the case of exchanging various types of information using wireless communication, the communication unit 325 transmits and receives radio waves through an antenna (not shown). For example, the communication unit 325 can perform wireless communication by wireless LAN (Local Area Network) (e.g., Wi-Fi (Wireless Fidelity), NFC (Near Field Communication), Bluetooth (registered trademark), infrared, portable radio wave, or the like. The communication unit 325 is realized by, for example, a communication module having an antenna and a wireless communication function or a communication module having a wired communication function.

[Example of Appearance Configuration of External Devices]

Figure 20A:
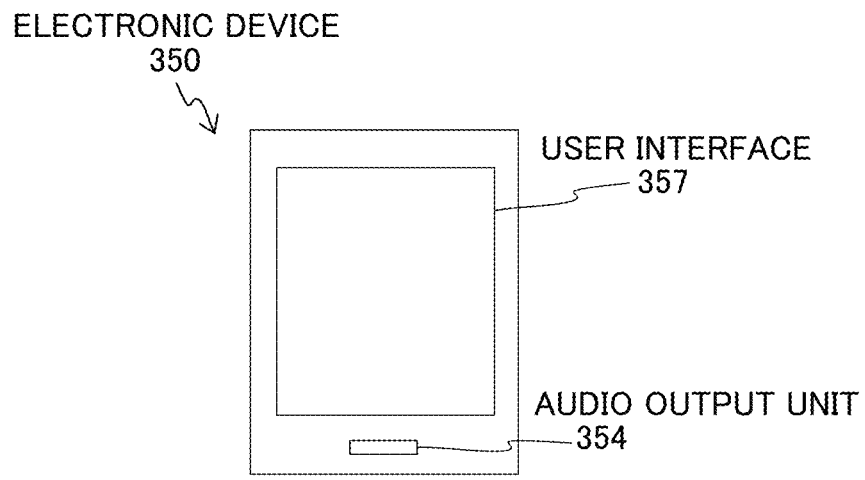
FIG. 20A is a perspective view showing an example of an external device (electronic device 350, 360) of the external configuration in the third embodiment.
Figure 20B:
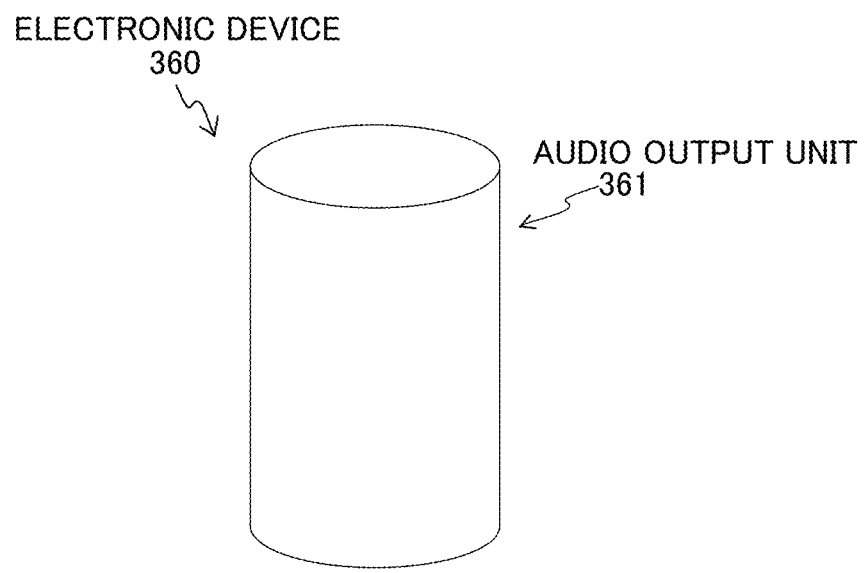
FIG. 20B is a perspective view showing an example of an external device (electronic device 350, 360) of the external configuration in the third embodiment.

FIG. 20A and FIG. 20B is a perspective view showing an example of the external configuration of the external devices 350 and 360 according to the third embodiment. FIG. 20A shows a portable electronic device 350. The electronic device 350 is a portable information processing device, and is a smart phone, a tablet terminal, a personal computer, or the like for example. FIG. 20B shows stationary electronics 360. The electronic device 360 is a stationary speaker device, for example, an AI speaker mounted with artificial intelligence (AI (Artificial Intelligence), a speaker having a wireless communication function, or the like.

[Example of Functional Configuration of Electronic Devices]

Figure 21:
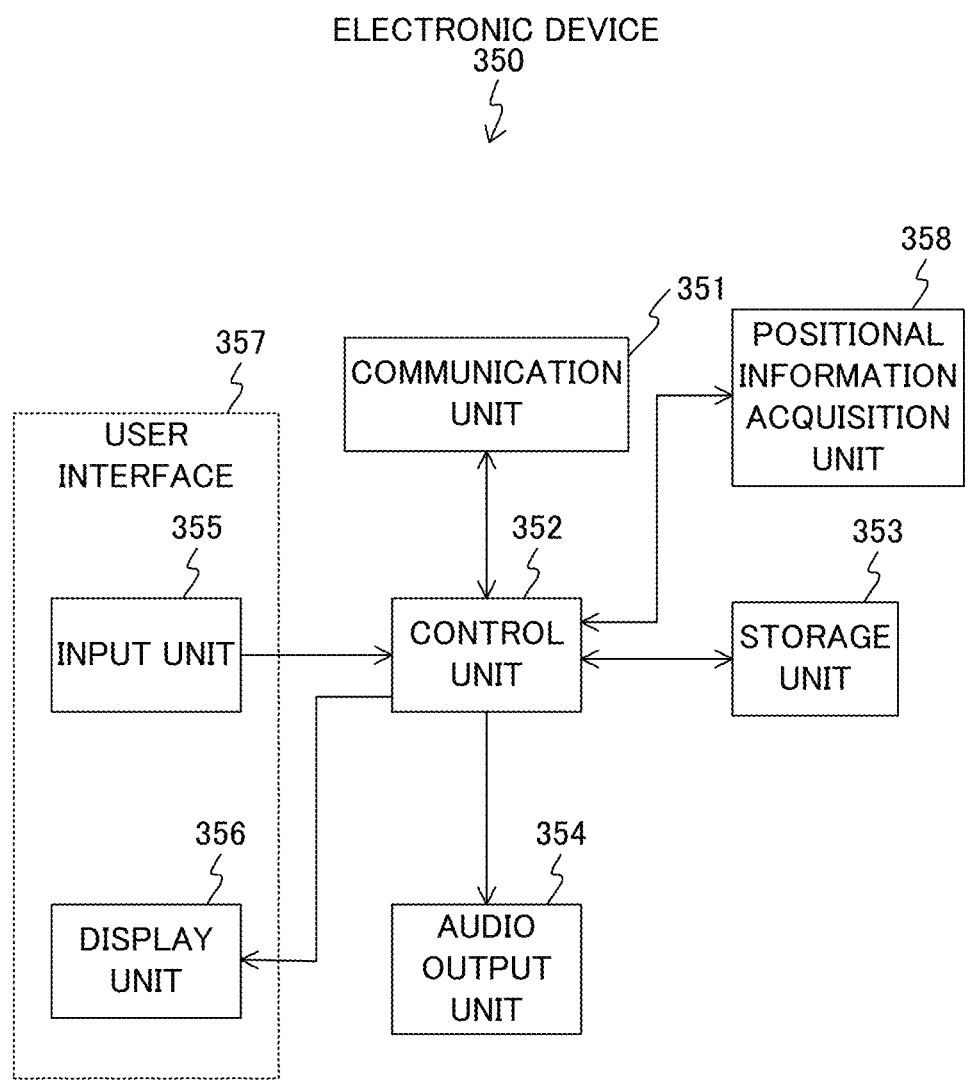
FIG. 21 is a block diagram showing a functional configuration example of the electronic device 350 in the third embodiment.

FIG. 21 is a block diagram showing a functional configuration example of the electronic device 350 in the third embodiment. As for the functional configuration of the electronic device 360 shown in FIG. 20A and FIG. 20B, since it is substantially the same as the electronic device 350, the description thereof will be omitted.

The electronic device 350 includes a communication unit 351, a control unit 352, a storage unit 353, an audio output unit 354, an user interface 357 (an input unit 355, a display unit 356), and a positional information acquisition unit 358. Incidentally, each part in the electronic device 350 is intended to correspond to each part of the same name in the electronic device 20 shown in FIG. 4 and the electronic device 220 shown in FIG. 14. Therefore, here, the description will focus on points different from the electronic device 20 shown in FIG. 4 and the electronic device 220 shown in FIG. 14. The communication unit 351 in the electronic device 350 performs wireless communication with the electronic device existing within a predetermined range, and can perform wireless communication by connecting to a predetermined network, for example, the Internet, via a base station installed by a communication provider such as a mobile phone company.

The positional information acquisition unit 358 acquires positional information about a position where the electronic device 350 exists, and outputs the acquired positional information to the control unit 352. The positional information acquisition unit 358, for example, can be realized by a GPS receiver for calculating the positional information on the basis of the GPS signal by receiving a GPS (Global Positioning System: Global Positioning System) signal. Further, the calculated positional information includes each data relating to the position such as latitude, longitude, and altitude at the time of receiving the GPS signal. Alternatively, a positional information acquiring device that acquires positional information by another method of acquiring positional information may be used. For example, the location information may be derived using the access point information by the wireless LAN (Local Area Network) existing in the vicinity, and the location information acquiring device for acquiring the location information may be used.

[Communication for Outputting Audio Information and Image Information from External Devices Other than Electronic Device]

Figure 22:
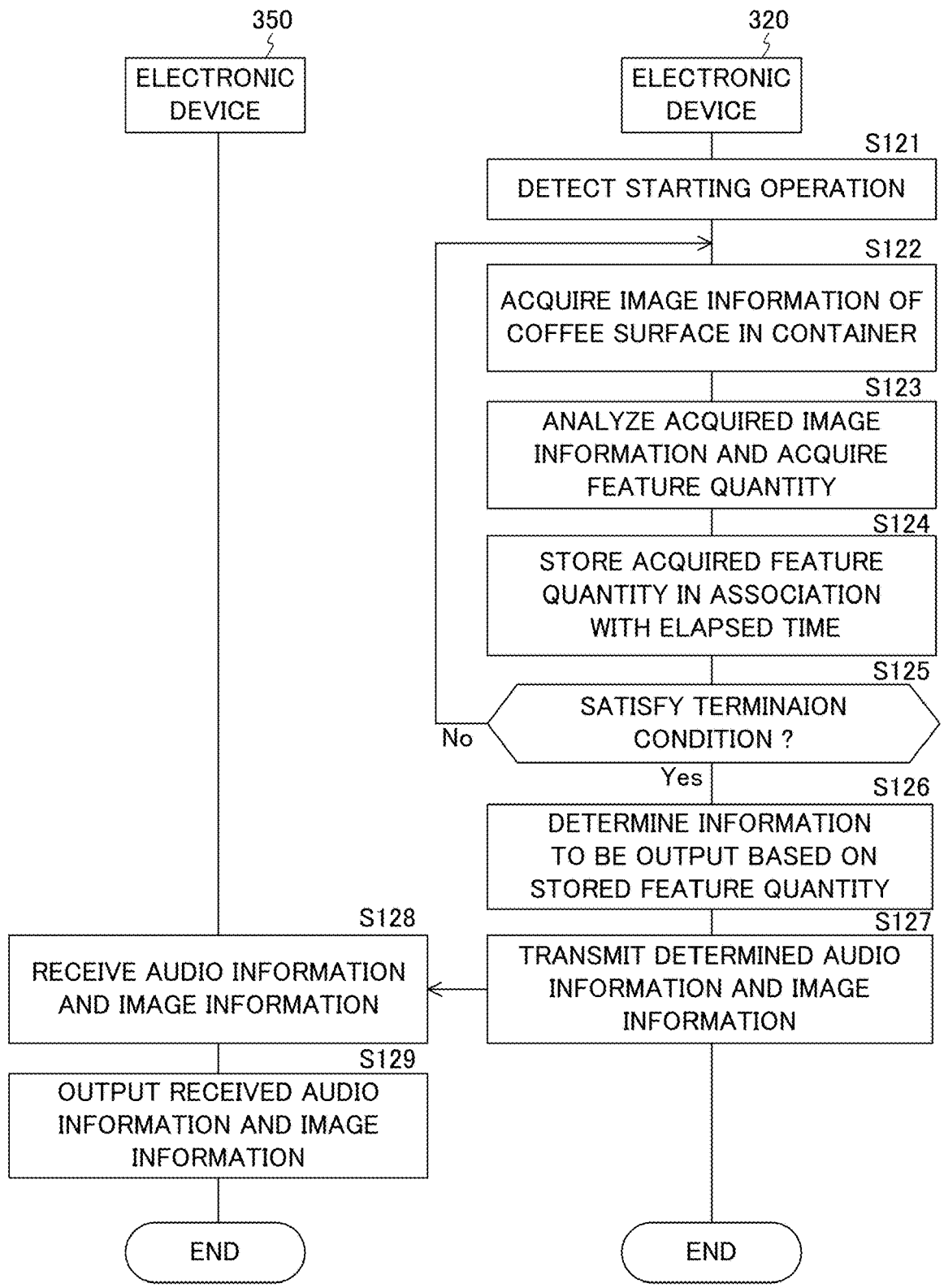
FIG. 22 is a flowchart showing a communication processing example by the electronic device 320 and the electronic device 350 in the third embodiment.

FIG. 22 is a flowchart showing a communication processing example by the electronic device 320 and the electronic device 350 in the third embodiment. The step S122~S126 shown in FIG. 22 corresponds to the step S112~S116 shown in FIG. 18. Therefore, here, the description will focus on points different from the example shown in FIG. 18. Further, it is assumed that an application (program) for realizing each process shown in FIG. 22 is set in advance in the electronic devices 320 and 350.

First, the control unit 323 of the electronic device 320 detects a start instruction (step S121). When a start operation member (not shown) is provided in the electronic device 320, the start instruction is detected when the user operates the start operation member. It is also possible for the user to perform a start operation using the electronic device 350, and to transmit start instruction information from the electronic device 350 to the electronic device 320 in response to the start operation. In this case, the start instruction is detected by receiving the start instruction information from the electronic device 350. Further, a sensor for detecting the start instruction (e.g., a human detection sensor, a temperature sensor, a water droplet sensor, a vibration sensor) is provided in the electronic device 320, the start instruction may be detected automatically by the sensor.

As described above, the step S122~S126 corresponds to the step S112~S116 shown in FIG. 18.

The control unit 323 determines information (audio information and image information) to be output (step S126). Next, the communication unit 325 transmits the determined audio information and image information to the electronic device 350 under the control of the control unit 323 (step S127).

The communication unit 351 of the electronic device 350 receives the information (audio information and image information) transmitted from the electronic device 320 (step S128). Next, the control unit 352 of the electronic device 350 stores the received information (audio information and image information) in the storage unit 353 (step S129). Then, the control unit 352 of the electronic device 350 outputs the received information (audio information and image information) (step S129). That is, the control unit 352 of the electronic device 350 outputs sound from the sound output unit 354 on the basis of the received sound information, and displays an image on the user interface 357 (display unit 356) on the basis of the received image information (step S129). For example, as shown in FIG. 23A, audio is output from the audio output unit 354, and an image is displayed on the user interface 357 (display unit 356).

[Example of Outputting Audio Information and Image Information from Device Other Than electronic device Installed on Coffee Extractor]

Figure 23A:
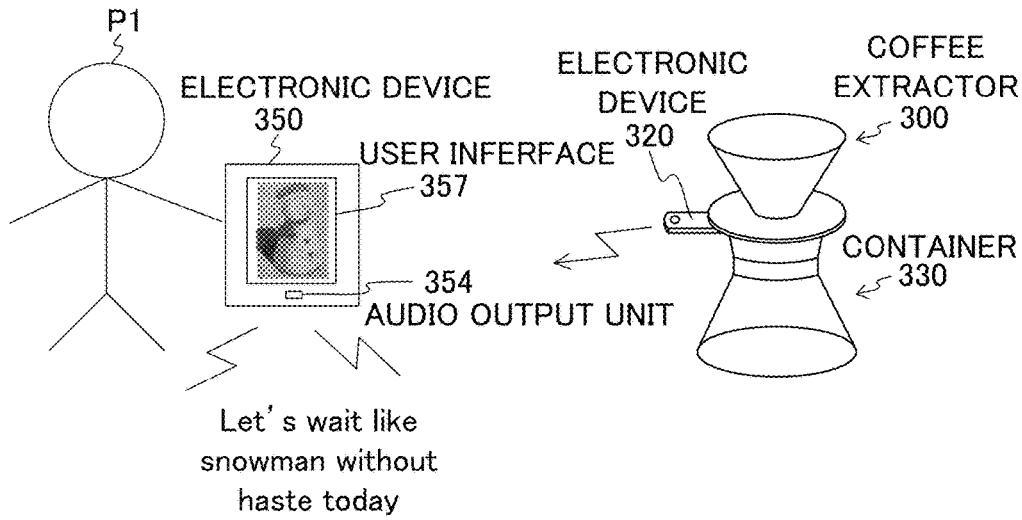
FIG. 23A is a diagram showing a simplified example of a case of outputting audio information and image information from the device other than the electronic device 220 (electronic devices 350, 360) in the third embodiment.
Figure 23B:
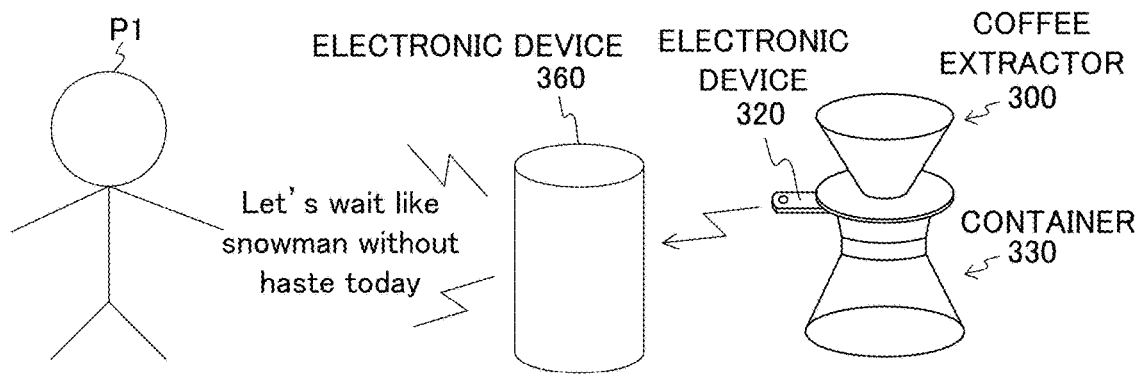
FIG. 23B is a diagram showing a simplified example of a case of outputting audio information and image information from the device other than the electronic device 220 (electronic devices 350, 360) in the third embodiment.

FIG. 23A and FIG. 23B is a diagram showing a simplified example of a case of outputting audio information and image information from a device other than the electronic device 220 (electronic devices 350, 360) in the third embodiment. FIG. 23A shows an example in which audio information and image information are output from the electronic device 350. FIG. 23B shows an example in which audio information and image information are output from the electronic device 360. The example shown in FIG. 23A and FIG. 23B shows an example of outputting voice information determined by the example shown in FIG. 8, FIG. 16A to FIG. 16C.

Further, it is assumed that an application (program) for realizing each process shown in FIG. 22 is set in advance in the electronic devices 350 and 360.

As described in the second embodiment, the control unit 323 of the electronic device 320 determines the audio information 61 (within the dashed rectangle 54 in FIG. 16C) and the image information 62 (within the dashed rectangle 54 in FIG. 16C) associated with OIX1 as the output target information. Next, the control unit 323 of the electronic device 320 performs control for wirelessly transmitting the audio information 61 (within the dashed rectangle 54 in FIG. 16C) and the image information 62 (within the dashed rectangle 54 in FIG. 16C) determined as the output target information from the communication unit 325 to the external device.

For example, in the case of outputting audio information and image information from the electronic device 350, the control unit 323 of the electronic device 320 performs control for wirelessly transmitting the audio information 61 (within the dashed rectangle 54 in FIG. 16C) and the image information 62 (within the dashed rectangle 54 in FIG. 16C) determined as the output target information from the communication unit 325 to the electronic device 350. The control unit 352 of the electronic device 350 that has received these pieces of information causes the sound output unit 354 to output a sound of "Let's wait like snowman without haste today" on the basis of the received sound information. In addition, the control unit 352 causes the user interface 357 to display a Santa image on the display unit 356 on the basis of the received image information. Thus, the user P1 who brews the coffee using the coffee extractor 300 can enjoy sound and images based on the feature quantity acquired by the extraction even at a location away from the coffee extractor 300 while tasting the coffee after the coffee having finished brewing the coffee that is user's ideals. Further, for example, the user P1 can store the sound output or the displayed image of the Santa in the storage unit 353 of the electronic device 350 and can enjoy the sound output later.

Further, for example, in the case of outputting audio information from the electronic device 360, the control unit 323 of the electronic device 320 performs control for wirelessly transmitting the audio information 61 determined as the output information (in the dashed rectangular 54 shown in FIG. 16C) from the communication unit 325 to the electronic device 360. The control unit of the electronic device 360 that has received the audio information causes the audio output unit to output a sound of "Let's wait like snowman without haste today" on the basis of the received audio information. As a result, the user P1 brewing coffee using the coffee extractor 300 can enjoy the sound based on the feature quantity obtained by the extraction even at a location away from the coffee extractor 300 while tasting the coffee after the user's ideals brewing coffee.

In the above description, an example which sound and images are output from the electronic devices 350 and 360 that can directly perform wireless communication with the electronic device 320 has been described. However, sound or images may be output from a device that cannot directly perform wireless communication with the electronic device 320. For example, in the electronic device 320, each piece of information (audio information, image information) determined as output target information is wirelessly transmitted from the communication unit 325 to the electronic devices 350 and 360, and the electronic devices 350 and 360 that have received each piece of information (audio information, image information) transfer each piece of information (audio information, image information) received from the electronic device 320 to a predetermined device (e.g., a device designated as a transmission destination from the electronic device 320 or a device preset as a transmission destination). For example, the electronic devices 350 and 360 can connect to a predetermined network (e.g., the Internet) by using wireless communication, and transmit each piece of information (audio information, image information) received from the electronic device 320 to a predetermined transmission destination. As a result, for example, the user P1 brewing coffee using the coffee extractor 300 can provide sound and images based on the feature quantity acquired by the extraction to a person located at a distance from the coffee extractor 300 after brewing the user's ideals (for example, the sound and the image are provided from the electronic device possessed by the person).

Fourth Embodiment: An Example which a Part of Processing Performed by an Electronic Device Attached to a Coffee Extractor is Processed by Another Electronic Device In the first to third embodiments, the output information is determined by the electronic device attached to the coffee extractor. Here, it is also conceivable that the electronic device attached to the coffee extractor is allowed to perform only a relatively simple process, and other processes are allowed to be performed by other equipment having a high throughput. Therefore, in the fourth embodiment, an example is shown which a part of the processing performed by the electronic device attached to the coffee extractor is processed by another electronic device.

In the fourth embodiment, description is made with reference to the electronic device 320 (shown in FIG. 19) and the electronic device 350 (shown in FIG. 21) described in the third embodiment.

For example, an electronic device 320 (shown in FIG. 19) attached to a coffee extractor 300 (shown in FIG. 23A and FIG. 23B) performs processing to acquire an image of the surface of the coffee (liquid) accumulated in a container 330 (shown in FIG. 23A and FIG. 23B). Then, the electronic device 320 transmits the acquired image information (an image of the surface of the coffee (liquid) accumulated in the container 330) from the communication unit 325 (shown in FIG. 19) to the electronic device 350 periodically or irregularly in sequence.

In the storage unit 353 of the electronic device 350 (shown in FIG. 21), the judgement information shown in the first to third embodiments (e.g., each judgement information shown in FIG. 6A, FIG. 6B, FIG. 12A, FIG. 12B) and the output target information (e.g., the output target information shown in FIG. 7, the output target information shown in FIG. 15) are stored. Further, the control unit 352 of the electronic device 350 (shown in FIG. 21) sequentially stores the image information received from the electronic device 320 via the communication unit 351 (an image of the surface of the coffee (liquid) accumulated in the container 330) in the storage unit 353. Next, the control unit 352 (shown in FIG. 21) of the electronic device 350 uses the judgement information stored in the storage unit 353 to determine the output target information about the image information (the image of the surface of the coffee (liquid) accumulated in the container 330) received from the electronic device 320. Next, the control unit 352 of the electronic device 350 outputs each piece of information determined by the determination process.

For example, as shown in FIG. 23A, the control unit 352 of the electronic device 350 causes the sound output unit 354 to output a sound of "Let's wait like snowman without haste today" on the basis of the sound information determined by the determination processing. In addition, the control unit 352 causes the user interface 357 to display a Santa image on the display unit 356 on the basis of the image information determined by the determination processing.

[Example of Communication in the Case that the Series of Processes are Performed in a Plurality of Electronic Devices]

Figure 24:
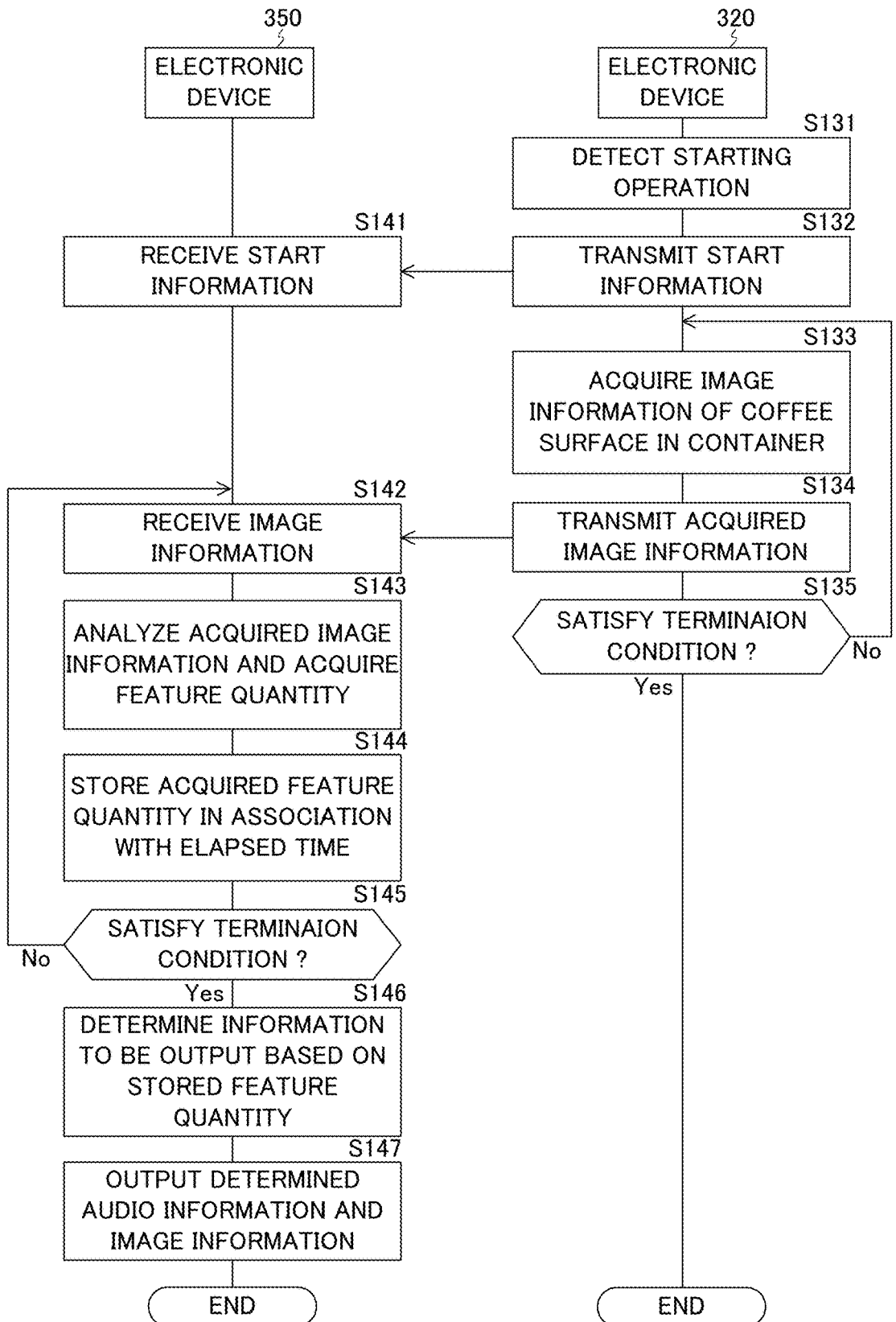
FIG. 24 is a flowchart showing a communication processing example by the electronic device 320 and the electronic device 350 in the fourth embodiment.

FIG. 24 is a flowchart showing an example of communication processing by the electronic device 320 and the electronic device 350 according to the fourth embodiment. Incidentally, the step S131, S133, S135, S143~S146 shown in FIG. 24 corresponds to the step S121~S126 shown in FIG. 22. Therefore, here, the description will focus on points different from the example shown in FIG. 22.

As for the control unit 323 of the electronic device 320, when detecting the start instruction (step S131), it transmits the start information for notifying the start of the operation from the communication unit 325 to the electronic device 350 (step S132).

As for the control unit 352 of the electronic device 350, after receiving the start information via the communication unit 351, it grasps the start of the operation of the electronic device 320 (step S141).

The control unit 323 of the electronic device 320 acquires an image acquired by the image acquisition unit 322 (captured image (including image data) of the coffee accumulated in the container 330) (step S133), and transmits the acquired image information to the electronic device 350 (step S134). In this case, the transmission of the image information from the electronic device 320 to the electronic device 350 may be performed periodically or may be performed irregularly.

The step S135 shown in FIG. 24 corresponds to the step S125 shown in FIG. 22.

After receiving the image information from the electronic device 320 (step S142), the control unit 352 of the electronic device 350 analyzes the received image information and acquires the feature quantity (step S143). Incidentally, the step S143~S146 shown in FIG. 24 corresponds to the step S123~S126 shown in FIG. 22.

Here, as a criterion for judgement whether the termination condition of the step S145 is satisfied or not, for example, it may be used as a criterion for judgement that the image information is not received from the electronic device 320 continuously for a predetermined time or longer, in addition to the judgment criterion shown in the first to third embodiments. For example, if reception of the image information from the electronic device 320 has not been continued for a predetermined time or longer, the control unit 352 of the electronic device 350 may determine that the termination condition is satisfied (step S145).

The control unit 352 of the electronic device 350 determines information (audio information and image information) to be output (step S146). Next, the control unit 352 of the electronic device 350 outputs the determined audio information and image information (step S147). That is, the control unit 352 of the electronic device 350 outputs sound from the sound output unit 354 on the basis of the determined sound information, and displays an image on the user interface 357 (display unit 356) on the basis of the determined image information (step S147). For example, as illustrated in FIG. 23A and FIG. 23B, audio is output from the audio output unit 354, and an image is displayed on the user interface 357 (display unit 356).

In the above description, an example has been described which the respective pieces of judgement information shown in FIG. 6A, FIG. 6B, FIG. 12A and FIG. 12B and the output target information shown in FIG. 7 and FIG. 15 are stored in advance in the storage units 24, 224, and 324 of the electronic devices 20, 220, and 320. However, these pieces of information may be obtained from the outside and used. For example, a communication unit (e.g., the communication unit 325 shown in FIG. 19) which is capable of communicating with another device via a wired line or a wireless line may be provided in the electronic device, and the electronic device may be connected to an external device (or a predetermined network (e.g., the Internet)) via the communication unit to acquire all or part of each information from the external device. In this case, each information may be acquired and used every time when the coffee extractor (electronic device) is used, or each information may be acquired and used periodically or irregularly.

Further, in the above, the example that each judgement information shown in FIG. 6A, FIG. 6B, FIG. 12A and FIG. 12B, the output target information shown in FIG. 7, 15 are stored in advance in the storage unit 24, 224, 324 of the electronic device 20, 220, 320 (or other devices in close proximity), and the electronic device 20, 220, 320 (or other devices in close proximity) perform each process for outputting the content has shown. However, each of these pieces of information may be stored in an external device (e.g., a server) existing in a remote place, each process for outputting the content may be performed by the external device, and the electronic devices 20, 220, and 320 (or other devices in the vicinity) may be made to acquire the information on the extraction of the coffee and output the content only.

In addition, for example, an image to be output may be output in cooperation with a specific rightful agent (for example, a company providing specific content or discount coupons). For example, when a specific image transition (e.g., an image pattern (shown in FIG. 12A)) is received from a specific rightful dealer and coincides therewith, information (e.g., a discount coupon, specific content) provided by the specific rightful dealer may be output from the electronic device.

Further, the user may register the output target information and determine the output target information from the registered output target information by the determination process. For example, the output target information (e.g., Santa) of the day when the coffee was brewed using the coffee extractor and the action history of the day (e.g., visited an amusement park, took an English language test, etc.) are registered (stored) in association with each other. In the case that the information determined as the output target when the coffee is brewed using the coffee extractor at a later date is the same as the registered output target information (e.g., Santa), the output target information (e.g., Santa) and the information on the action history of the registered date (e.g., visited an amusement park, took an English test, etc.) are output. This allows you to enjoy the taste of coffee while remembering what you did on the day when you made coffee, which is the same pattern in the past. In addition, it feels the same as the day when coffee, which is the same pattern in the past, was brewed, and you can enjoy coffee while thinking about various things.

The content to be output may be determined using artificial intelligence (AI (Artificial Intelligence)). For example, judgement information can be generated by using machine learning about a pattern when coffee is brewed using a coffee extractor (for example, a pattern of transition of the surface of coffee) and a mood and a physical condition of the day (for example, determination based on a search or a movement history of a smartphone or the like), and the content to be output can be determined by using the generated judgement information. For example, it is possible to output the content of a smile when the user feels well, and to output the content that is cheerful when the user feels bad. In this way, for example, it is possible to output the content by using some feature quantity relating to the surface of the coffee that is brewed when it is pleasant and the surface of the coffee that is brewed when it is unpleasant, and to estimate the mood at that time.

Fifth Embodiment: An Example of Aggregating Information from a Plurality of Coffee Extractors In the first to fourth embodiments, an example has been described in which audio information and image information are output using information acquired by one coffee extractor. In recent years, coffee extractors have been widely used in homes or the like around the world. In each home, coffee of their preference is brewed. Therefore, if it is possible to gather information on coffee brewed in each house and provide some information to each house on the basis of this information, it is considered that the enjoyment of brewing coffee can be enhanced. Similarly, if it is possible to gather information on coffee brewed at workplaces, schools, etc., outside the home, and to provide some information to the relevant parties on the basis of this information, it is considered that the enjoyment of brewing coffee can be enhanced. Therefore, in the fifth embodiment, an example is shown which information from a plurality of coffee extractors is aggregated and used.

[Configuration Example of Communication System]

Figure 25:
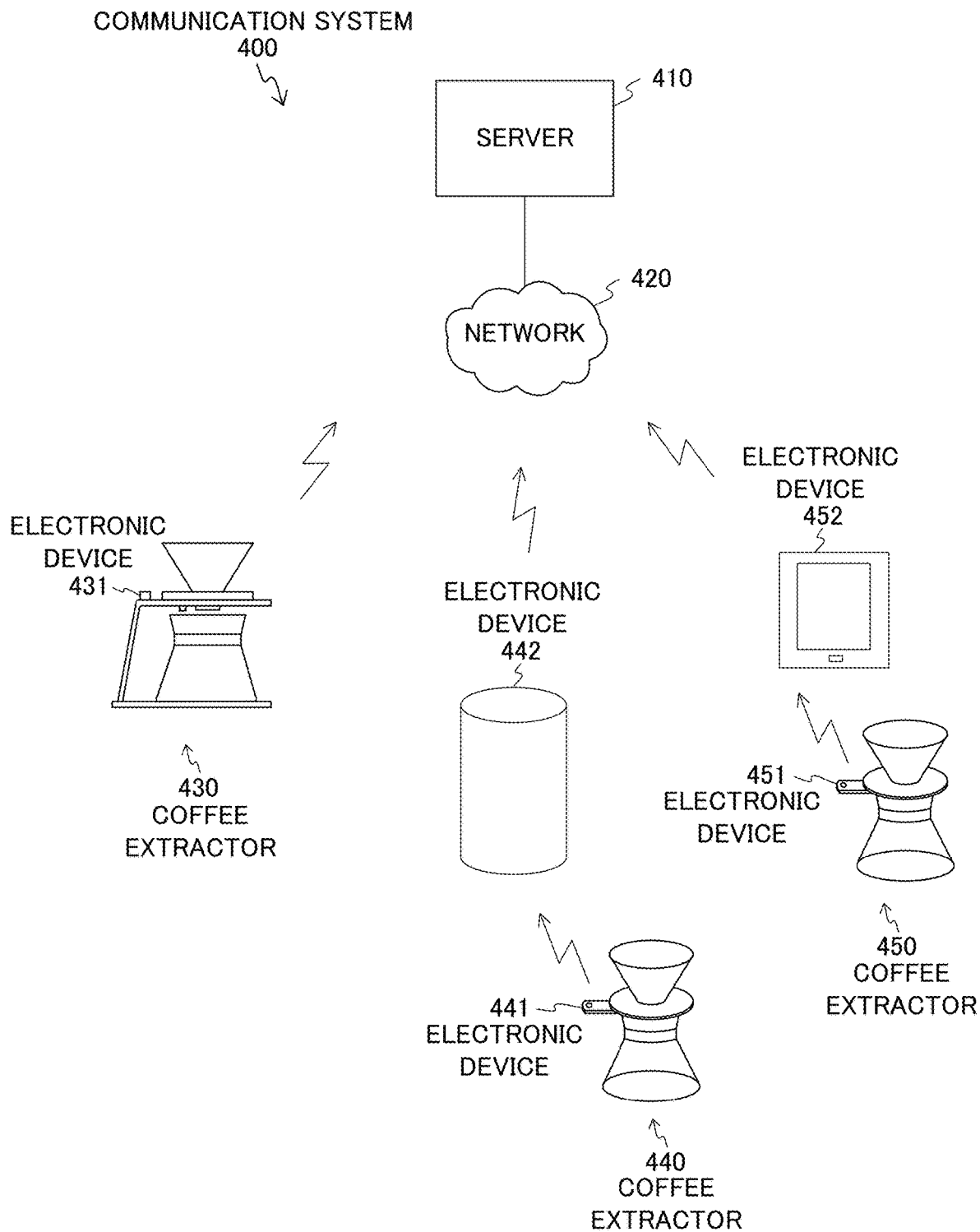
FIG. 25 is a diagram showing a system functional configuration example of the communication system 400 in the fifth embodiment.

FIG. 25 is a diagram showing an example of a system functional configuration of the communication system 400 according to the fifth embodiment.

The communication system 400 includes a server 410, a network 420, and electronic devices 431, 441, 442, 451, and 452. It should be noted that a base station, an access point, and the like for performing wireless communication are also assumed as devices constituting the communication system 400, but illustration and description thereof are omitted here.

The server 410 is a server (information processing device) that collects and manages information transmitted from each of the electronic devices 431, 441, and 451, and provides various types of information to each of the electronic devices 431, 441, 442, 451, and 452 using the managed information.

The network 420 is a network such as a public network or the Internet.

The electronics 431 are attached to the coffee extractor 430, the electronics 441 are attached to the coffee extractor 440, and the electronics 451 are attached to the coffee extractor 450. Further, the electronic device 442 performs wireless communication with the electronic device 441, the electronic device 452 performs wireless communication with the electronic device 451.

The electronic device 431 includes a communication unit, which corresponds to the communication unit 325 shown in FIG. 19 and can exchange information by connecting to the network 420 using wireless communication. Each of the electronic devices 441 and 451 has a communication unit (corresponding to the communication unit 325 shown in FIG. 19) and can exchange information with another device (the electronic devices 442 and 452) using wireless communication. Each of the electronic devices 441 and 451 is connected to the network 420 via other devices (electronic devices 442 and 452) by wireless communication to exchange information.

[Example of Functional Configuration of Electronic Devices]

Figure 26:
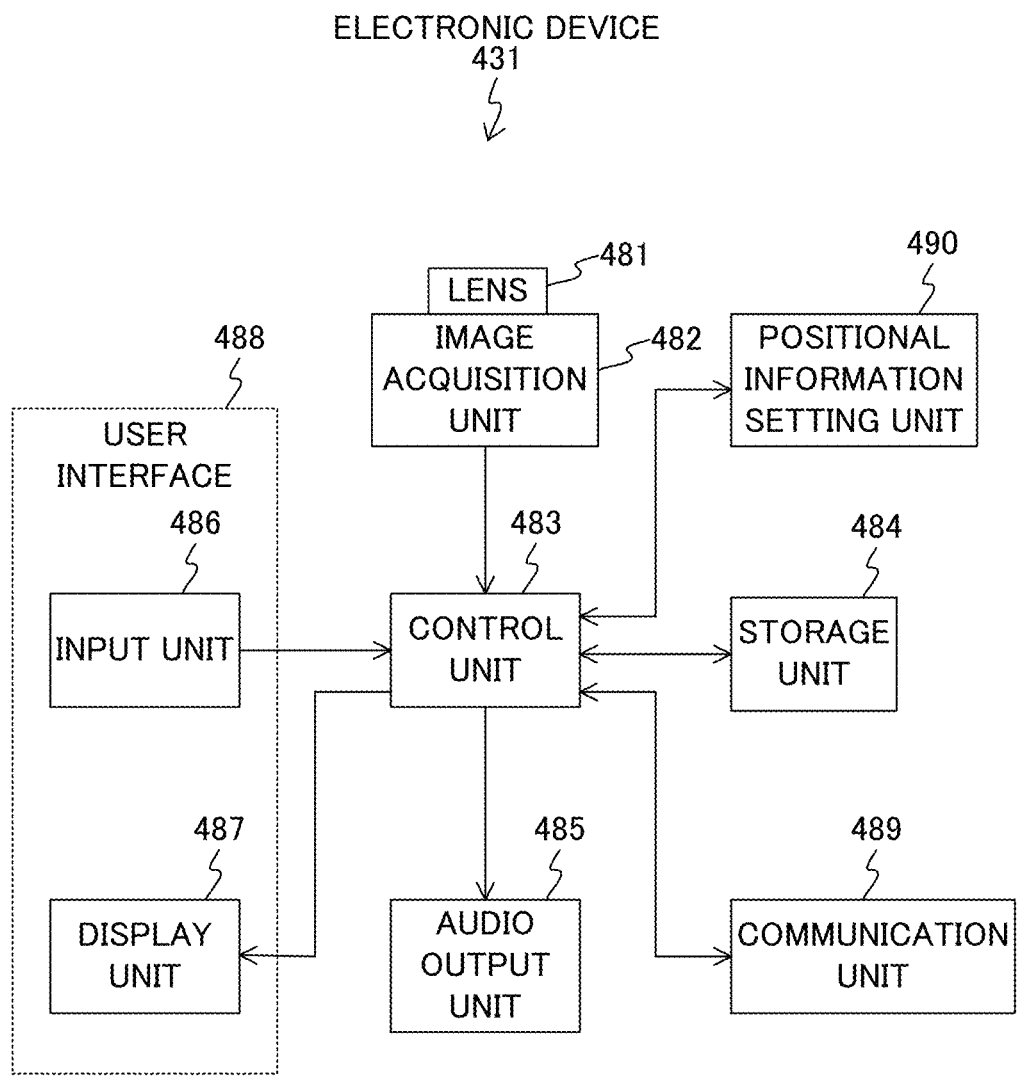
FIG. 26 is a block diagram showing a functional configuration example of the electronic device 431 in the fifth embodiment.

FIG. 26 is a block diagram showing an example of the functional configuration of the electronic device 431 according to the fifth embodiment. Note that the functional configuration of the electronic devices 441 and 451 shown in FIG. 25 is substantially the same as that of the electronic device 431 except that a user interface is not provided, and therefore description thereof is omitted. Further, the functional configuration of the electronic device 442 and 452 shown in FIG. 25, since it is substantially the same as the electronic device 431, the description thereof will be omitted.

The electronic device 431 includes a lens 481, an image acquisition unit 482, a control unit 483, a storage unit 484, an audio output unit 485, a user interface 488 (an input unit 486, a display unit 487), and a communication unit 489. Incidentally, each part in the electronic device 431 corresponds to each part of the same name in the electronic device 20 shown in FIG. 4, the electronic device 220 shown in FIG. 14, the electronic device 320 shown in FIG. 19. Therefore, here, the description will focus on points different from the electronic device 20 shown in FIG. 4, the electronic device 220 shown in FIG. 14 and the electronic device 320 shown in FIG. 19. The communication unit 489 in the electronic device 431 performs wireless communication with the electronic device existing within a predetermined range, and can communicate by connecting to a predetermined network, for example, the Internet, via a base station installed by a communication provider such as a mobile phone company.

The positional information setting unit 490 sets positional information on the position where the electronic device 431 exists, and outputs the set positional information to the control unit 483. The positional information setting unit 490 stores, for example, positional information (for example, latitude and longitude, area name (country, administrative section)) relating to the position where the coffee extractor 430 to which the electronic device 431 is attached is installed. For example, positional information on the position where the coffee extractor 430 is installed is acquired by a user operation or a positional information acquisition unit (e.g., a built-in GPS receiver).

[Example of Server Function Configuration]

Figure 27:
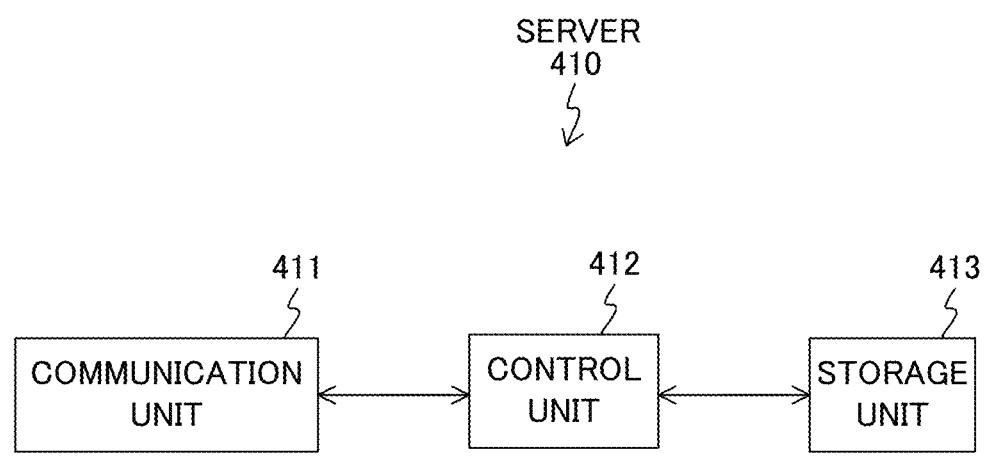
FIG. 27 is a block diagram showing a functional configuration example of the server 410 in the fifth embodiment.

FIG. 27 is a block diagram showing an example of the functional configuration of the server 410 according to the fifth embodiment.

The server 410 includes a communication unit 411, a control unit 412, and a storage unit 413.

The communication unit 411 exchanges various types of information with other devices via a wired line or a wireless line under the control of the control unit 412. For example, the communication unit 411 exchanges various types of information with the electronic devices 431, 441, 442, 451, and 452 via the network 420.

The control unit 412 controls each unit of the server 410 on the basis of a control program stored in the storage unit 413. The control unit 412 is implemented by, for example, a CPU (Central Processing Unit).

The storage unit 413 is a memory for storing various kinds of information. For example, various kinds of information (e.g., control programs) required for the server 410 to perform various kinds of processing are stored in the storage unit 413. The storage unit 413 stores management information for managing each piece of information acquired by the communication unit 411 via the network 420 (the information being transmitted from the electronic devices 431, 441, and 451). The storage unit 413 stores content to be provided to each electronic device (the electronic devices 431, 441, and 451) connected via the network 420.

[Configuration Example of Management Information]

FIG. 28A and FIG. 28B is a diagram showing an example of management information stored in the storage unit 413 according to the fifth embodiment. FIG. 28A shows an example of management information to be managed by the server 410. FIG. 28B shows an example of content provided from the server 410 to each electronic device.

The management information shown in FIG. 28A includes terminal identification information 461, reception time 462, reception information 463, judgement result information 464, and providing content information 465. These pieces of information (i.e., the terminal identification information 461, the reception time 462, and the reception information 463) are transmitted from the electronic devices connected to the server 410, and are sequentially stored in the storage unit 413 by the control unit 412.

The terminal identification information 461 is identification information (for example, device unique IDs (identification) and MAC (Media Access Control) addresses) for identifying the electronic devices. For example, the terminal identification information 461 is identification information for specifying an electronic device to which the content is to be transmitted. In FIG. 28A and FIG. 28B, for ease of explanation, the terminal identification information is represented by a combination of simple characters and numbers.

The reception time 462 is information on the time at which information is received from each electronic device connected to the server 410. In the management information shown in FIG. 28A, for example, each piece of information received in a predetermined time zone (for example, one day when a certain point on the earth is used as a reference) is sequentially stored.

The reception information 463 is information transmitted from each electronic device connected to the server 410. The received information is, for example, information transmitted from each electronic device on the basis of a predetermined rule. For example, as a predetermined rule, when the determination process using the judgement information shown in FIG. 6A and FIG. 6B is performed, a part of the information (e.g., the data OI (OIX1) to be output) shown in the dashed rectangle 51 FIG. 9B is transmitted. In this case, the data OI (OIX1) to be output is stored as the reception information 463. It should be noted that other information (for example, each piece of information (A, A, D, E, F, E, I, and F characters and their order) shown in FIG. 9A) may also be stored in the reception information 463 as a transmission target.

The judgement result information 464 stores the result determined by the control unit 412 on the basis of the information stored in the reception information 463. For example, the control unit 412 (shown in FIG. 27) of the server 410 determines identification information (for example, a serial number) to be assigned to each electronic device on the basis of the information stored in the reception information 463. For example, the control unit 412 can convert the information stored in the reception information 463 (the reception information of each electronic device) into a comparable numerical value (for example, the numerical value (1, 2, 3, . . . ) in the order (OI1, OI2, OI3, . . . ) of the data OI to be output shown in FIG. 6B) on the basis of a predetermined rule, and determine the identifying information (for example, the serial number) to be assigned to each electronic device on the basis of the comparison of the numerical values.

In addition, identification information (e.g., serial number) to be assigned to each electronic device may be determined on the basis of other rules. For example, the control unit 412 can determine identification information (e.g., serial number) to be assigned to each electronic device on the basis of the reception time 462 and the information stored in the reception information 463. For example, the control unit 412 can determine a value (for example, 1, 2, 3, . . . ) to be multiplied by the numerical value specified by the reception information 463 on the basis of the reception time 462, and can determine identification information (for example, a serial number) to be assigned to each electronic device on the basis of the calculation results. In addition, for example, the control unit 412 can perform arithmetic processing on the information stored at the reception time 462 on the basis of a predetermined rule (for example, in the case of 20171204 07:56, "35" obtained by simply adding the numerical value of each digit) and determine identification information (for example, serial number) to be assigned to each electronic device on the basis of the arithmetic result (for example, multiplication, addition, subtraction, division) of the numerical value of the arithmetic result and the numerical value specified by the reception information 463. In this manner, a rule which is capable of assigning identification information (e.g., serial number) to each electronic device is set, and identification information (e.g., serial number) to be assigned to each electronic device is determined on the basis of this rule. As described above, the identification information (for example, serial number) to be given to each electronic device does not indicate the advantage of the electronic device (or the user or the coffee brewed by the user), but means the identification information for giving the content.

The providing content information 465 is information for identifying the content determined on the basis of the information stored in the judgement result information 464. When the number of electronic devices to be managed is the same as the number of content that can be provided to the electronic devices to be managed, or when the number of content that can be provided to the electronic devices to be managed is larger than the number of electronic devices to be managed, the value of the judgement result information 464 and the information of the providing content information 465 correspond one-to-one. However, when the number of content that can be provided to the electronic device to be managed is smaller than the number of electronic devices to be managed, one piece of information in the providing content information 465 corresponds to a plurality of values in the judgement result information 464. That is, the same content may be provided to a plurality of electronic devices. The providing content information 465 corresponds to the provided content information 471 shown in FIG. 28B.

The content management information shown in FIG. 28B is composed of the provided content information 471 and the content 472.

The content 472 is provided to the electronic device that has transmitted the information to be stored in the reception information 463. Content may be, for example, content consisting solely of voice, content consisting of voice and images, content consisting of voice and moving pictures, content related to smell, taste, contact, and the like. Further, as shown in FIG. 28B, the content may be each of the characters A, B, C, XYZ of the animation having a plurality of types of characters. In this case, each character may not be provided in an overlapping manner so that the same character is not provided to different electronic devices, and some characters may be provided in an overlapping manner so that the same character is provided to some electronic devices.

In addition, information related to at least one movie out of a plurality of types of movie information (e.g., moving pictures for movie advertisement and pamphlets) may be provided as content. In addition, information related to at least one piece of music (e.g., a moving image of a singer or a moving image of a concert) may be provided as content. In addition, information related to at least one destination (for example, Kusatsu hot spring or Ikaho hot spring) out of a plurality of destination information (location, famous place, transportation means, discount ticket, etc.) may be provided as content. At least one of discount vouchers, complementary ticket, and a plurality of discount coupons usable on the Internet may be provided as content. In addition, at least one of discount vouchers, complementary ticket, and coupons of a plurality of stores may be provided as content. In addition, information relating to the point grant of at least one of a plurality of shop points may be provided as content. Also, information on horoscope (for example today's coffee horoscope) may be provided as content. In this way, the content can be information about one or more of animation characters, animals (e.g., animal appearing in a movie, amusement park in a travel destination), people (e.g., list of movie characters, famous people at travel destination), plants (e.g., famous product of a travel destination, flowers to watch), geographies (e.g., map of a trip destination, buildings of a trip destination, tourist location of a trip destination), music, etc. Further, for example, AR (Augmented Reality) may be applied to provide content. For example, each content can be displayed on an image (photograph) generated by a camera (e.g., a camera of a smartphone) of an electronic device. These contents may be output targets in the first to fourth embodiments.

[Examples of Storage of Information on Electronic Device and Content Provided to Electronic Device]

FIG. 29A and FIG. 29B is a diagram showing an example of storage of information relating to the electronic devices 431, 441, and 451 and an example of content provided to the electronic devices 431, 441, and 451 in the fifth embodiment. FIG. 29A corresponds to FIG. 28A, and FIG. 29B corresponds to FIG. 28B.

In the storage examples shown in FIG. 29A, it is assumed that the terminal identification information 461 "EX0431" indicates the terminal identification information of the electronic device 431, the terminal identification information 461 "EX0441" indicates the terminal identification information of the electronic device 441, and the terminal identification information 461 "EX0451" indicates the terminal identification information of the electronic device 451. Each piece of information shown in FIG. 29A, FIG. 29B will be described with reference to FIG. 30 to FIG. 32.

[Communication Example when the Server 410 Obtains Information from the Electronic Device 431]

Figure 30:
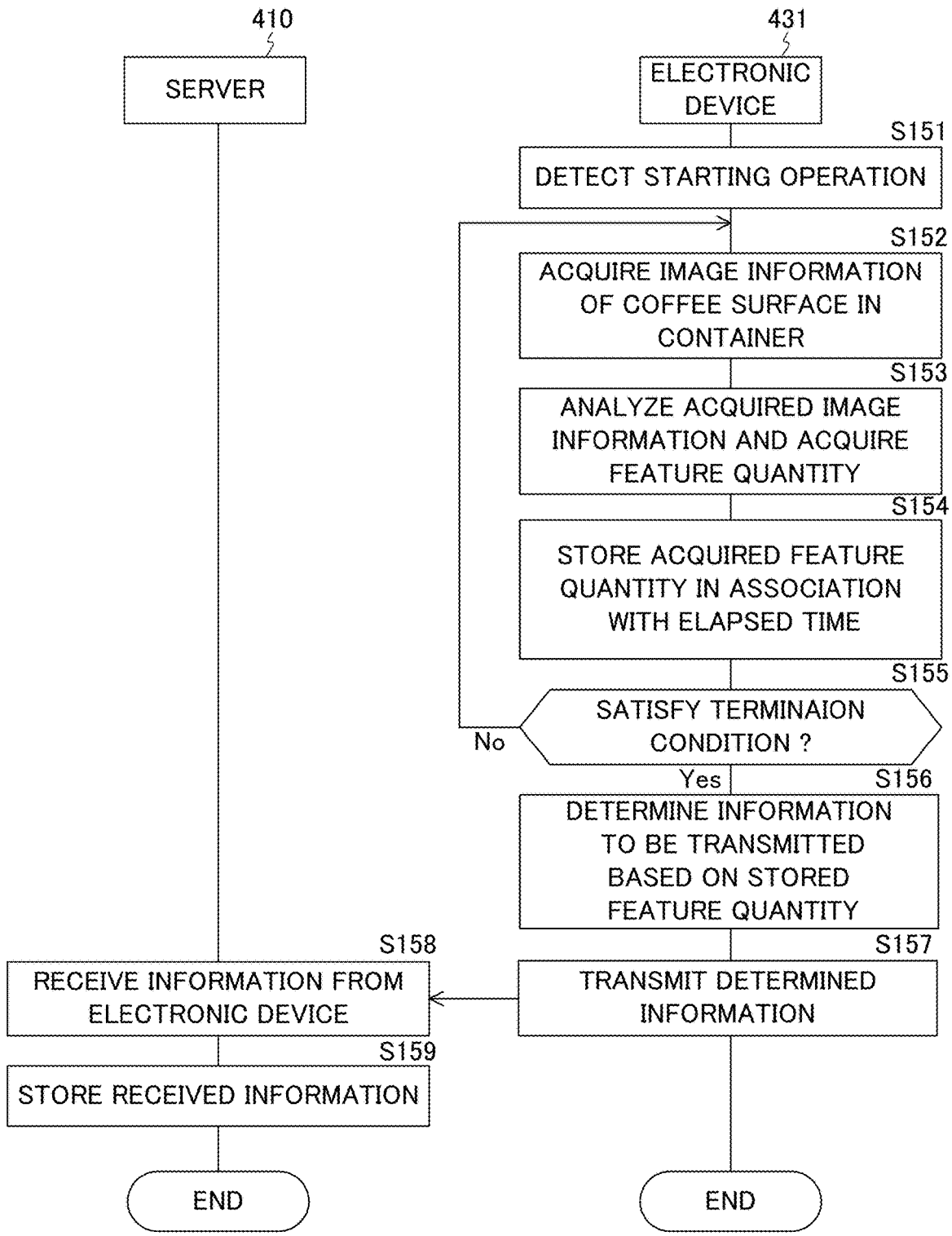
FIG. 30 is a flowchart showing an example of communication processing by the electronic device 431 and the server 410 according to the fifth embodiment.

FIG. 30 is a flowchart showing an example of communication processing by the electronic device 431 and the server 410 according to the fifth embodiment. The step S151~S155 shown in FIG. 30 corresponds to the step S121~S125 shown in FIG. 22. Therefore, here, the description will focus on points different from the example shown in FIG. 22. Further, it is assumed that a program for accessing the server 410 and performing various communication with the server 410 is preset in the electronic device 431. That is, it is assumed that an application (program) for realizing each process shown in FIG. 30 is previously set in the electronic device 431.

As described above, the step S151~S155 corresponds to the step S121~S125 shown in FIG. 22.

The control unit 483 (shown in FIG. 26) of the electronic device 431 determines output information (e.g., data OI (OIX1) to be output shown in FIG. 9B) (step S156). Next, the communication unit 489 (shown in FIG. 26) transmits the determined information to the server 410 under the control of the control unit 483 (step S157).

The communication unit 411 of the server 410 receives the information transmitted from the electronic device 431 (step S158). Next, the control unit 412 of the server 410 stores the received information in the storage unit 413 (step S159). For example, as shown in FIG. 29A, the received information (OIX1 (indicated by "X1" in FIG. 29A)) is stored as the received information 463 in association with the terminal identification information 461 "EX0431". As shown in FIG. 29A, information relating to the time at which the information (OIX1) is received from the electronic device 431 is stored as the reception time 462 in association with the terminal identification information 461 "EX0431".

As shown in FIG. 25, information on the electronic device 441 is transmitted from the electronic device 441 to the server 410 via the electronic device 442. In this case, the electronic device 442 transmits the terminal identification information related to the electronic device 441 to the server 410 together with the information (Y3) transmitted by the electronic device 441. Then, as shown in FIG. 29A, the information (Y3) transmitted by the electronic device 441 is stored as the reception information 463 in association with the terminal identification information 461 "EX0441", and the information on the time at which the information (Y3) was received from the electronic device 441 is stored as the reception time 462.

Further, as shown in FIG. 25, information regarding the electronic device 451 is transmitted from the electronic device 451 to the server 410 via the electronic device 452. In this case, the electronic device 452 transmits the terminal identification information related to the electronic device 451 to the server 410 together with the information (Z7) transmitted by the electronic device 451. Then, as shown in FIG. 29A, the information (Z7) transmitted by the electronic device 451 is stored as the reception information 463 in association with the terminal identification information 461 "EX0451", and the information on the time at which the information (Z7) was received from the electronic device 451 is stored as the reception time 462.

Since the information on the electronic device 441 is transmitted to the server 410 via the electronic device 442, the terminal identification information 461 may record the terminal identification information on the electronic device 442 instead of "EX0441". Instead of the "EX0441", terminal identification information (identification information of both the electronic device 441 and the electronic device 442, or information indicating that the electronic device 442 has transferred information of the electronic device 441) relating to the electronic device 441 and the electronic device 442 may be recorded. The same applies to information related to the electronic device 451.

[Communication Example when the Server 410 Provides Content to the Electronic Device 431]

Figure 31:
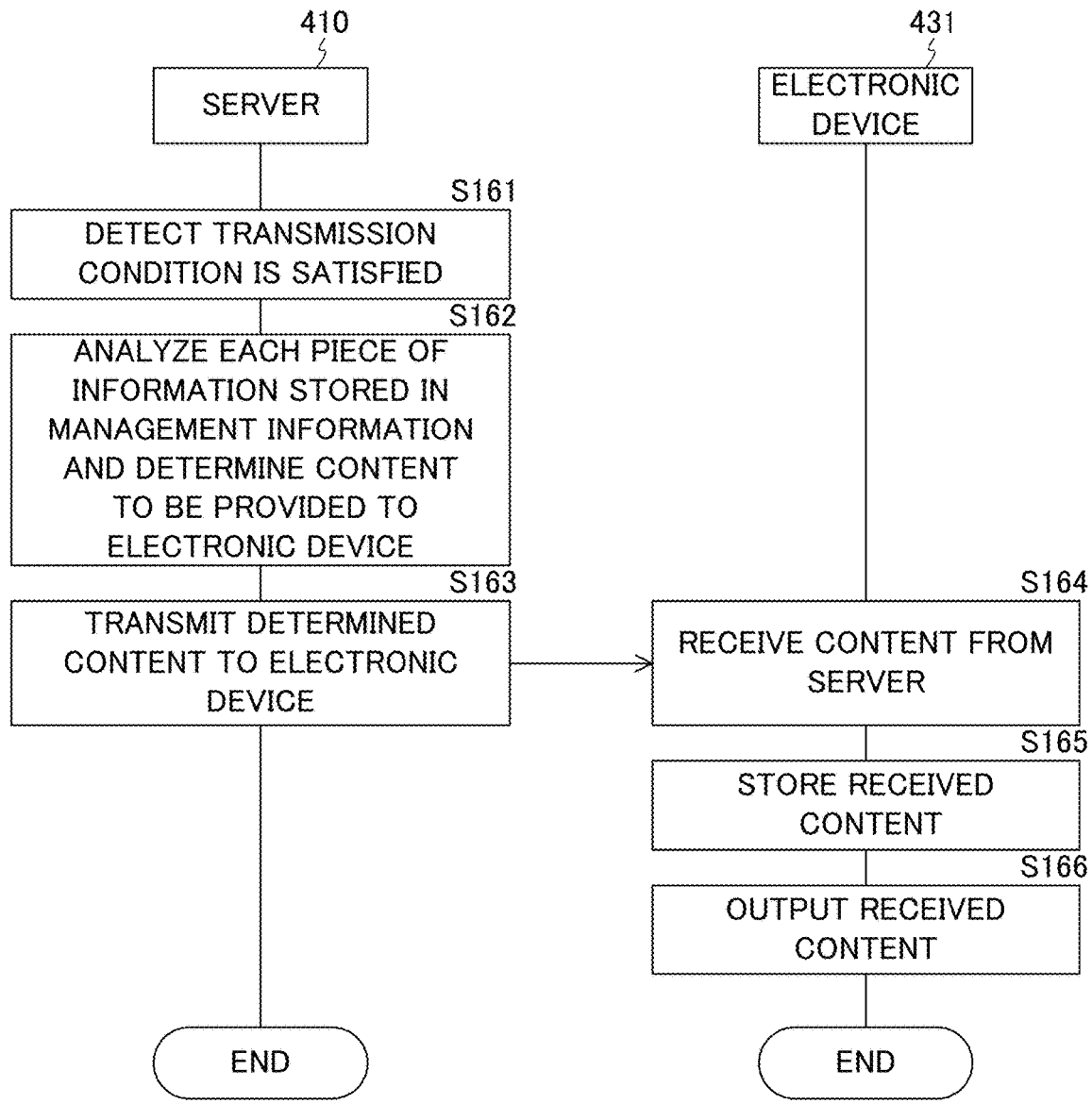
FIG. 31 is a flowchart showing an example of communication processing by the electronic device 431 and the server 410 according to the fifth embodiment.

FIG. 31 is a flowchart showing an example of communication processing by the electronic device 431 and the server 410 according to the fifth embodiment. It is assumed that the server 410 transmits information to the electronic device 431 on the basis of the terminal identification information 461 (shown in FIG. 29A).

First, the control unit 412 of the server 410 determines whether the transmission condition is satisfied or not (step S161). If the transmission condition is not satisfied, the process waits until the transmission condition is satisfied (step S161).

Here, the transmission condition may be, for example, that when the content is provided on a daily basis, the content is provided at 12:00 p.m. (24:00 p.m.) at a certain point in the world. For example, in the case where the server 410 is installed in Japan, it can be determined that the transmission condition is satisfied when Japan time comes to 12:00 p.m. (24:00 p.m.). When content is provided only within a limited area, it is possible to set the condition that the end time zone of the activity time in the area, for example, 9:00 p.m., has been reached. However, it is assumed that some users may wish to watch the coffee-related character just after brewing the coffee. Therefore, for example, even when the content is provided on a daily basis, the content may be provided by judging that the transmission condition is satisfied at fine intervals (e.g., 1 minute interval, 10 minute interval, 1 hour interval). This allows the user who brewed the coffee in the morning to see the character in the morning.

When the transmission condition is satisfied (step S161), the control unit 412 of the server 410 determines content to be provided to each electronic device on the basis of each piece of information stored in the management information (step S162). Specifically, the control unit 412 of the server 410 determines identification information (e.g., serial number) to be assigned to each electronic device on the basis of the information stored in the reception information 463, and stores the judgement result information 464 as a result of the judgement. Then, the control unit 412 of the server 410 determines the content to be provided to each electronic device on the basis of the information stored in the judgement result information 464, and stores information for identifying the content in the providing content information 465.

For example, when it is determined that the transmission condition is satisfied at a fine interval (e.g., 1 minute interval, 10 minute interval, 1 hour interval), the identification information (e.g., serial number) is ranked with respect to each electronic device that has transmitted the information during that interval. For example, assume a case where it is determined that the transmission condition is satisfied at intervals of 10 minutes. In this case, it is assumed that three electronic devices have transmitted information in the first 10 minutes, five electronic devices have transmitted information in the next 10 minutes, and four electronic devices have transmitted information in the next 10 minutes. In this case, 1-3 identification information (e.g., serial number) is determined for each electronic device that transmitted information during the first 10 minutes, 4-8 identification information (e.g., serial number) is determined for each electronic device that transmitted information during the next 10 minutes, and 9-12 identification information (e.g., serial number) is determined for each electronic device that transmitted information during the next 10 minutes.

Next, the communication unit 411 of the server 410 transmits the content corresponding to the information stored in the providing content information 465 to the respective electronic devices under the control of the control unit 412 (step S163). For example, as illustrated in FIG. 29A and FIG. 29B, content corresponding to the information "CT67" stored in the providing content information 465 (content related to "character ABC") is transmitted to the electronic device 431. Content corresponding to the information "CT217" stored in the providing content information 465 (content related to the "character EFG") is transmitted to the electronic device 442 (electronic device 441). Content corresponding to the information "CT347" stored in the providing content information 465 (content related to the "character HIJK") is transmitted to the electronic device 452 (the electronic device 451).

The communication unit 489 of the electronic device 431 receives the content transmitted from the server 410 (step S164). Next, the control unit 483 of the electronic device 431 stores the received content in the storage unit 484 (step S165). Next, the control unit 483 of the electronic device 431 outputs the received content (step S166). An example of this output is shown in FIG. 32.

[Example in which Server 410 Provides Content to Electronic Devices 431, 442, 443, 452]

Figure 32:
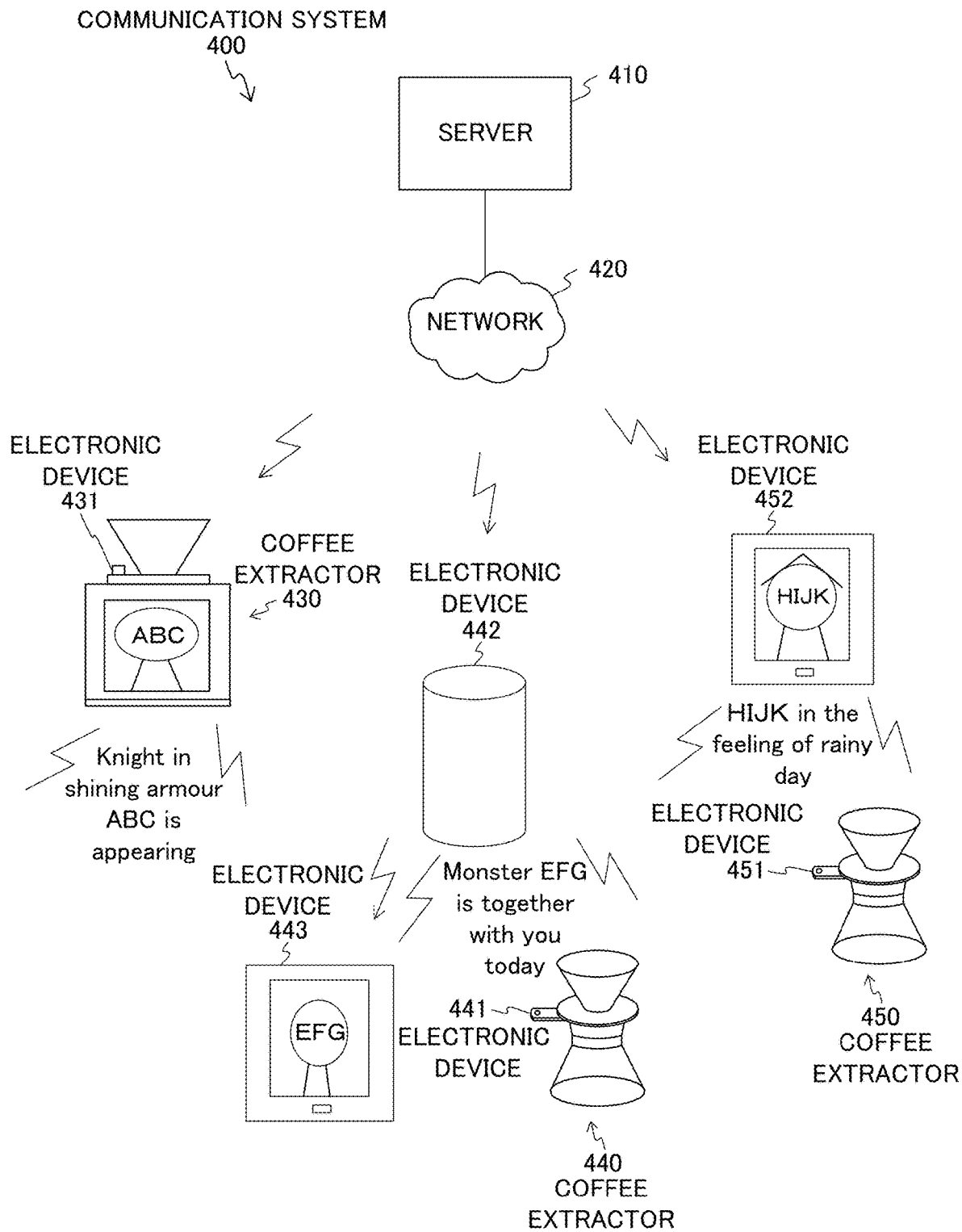
FIG. 32 is a diagram illustrating an example in which the server 410 in the fifth embodiment provides content to the electronics 431, 442, 443, 452.

FIG. 32 is a diagram showing an example in which the server 410 according to the fifth embodiment provides content to the electronic devices 431, 442, 443, and 452.

The server 410 transmits the content to each electronic device on the basis of the management information shown in FIG. 29A. For example, as shown in FIG. 29A, on the basis of the providing content information 465 "CT67" associated with the terminal identification information 461 "EX0431", the server 410 transmits the content related to the "character ABC" to the electronic device 431. Further, on the basis of the providing content information 465 "CT217" associated with the terminal identification information 461 "EX0441", the server 410 transmits the content related to the "character EFG" to the electronic device 441 (or the electronic device 442). Further, on the basis of the providing content information 465 "CT347" associated with the terminal identification information 461 "EX0441", the server 410 transmits the content related to the "character HIJK" to the electronic device 451 (or the electronic device 452).

The electronic device that has received the content outputs the received content. For example, as shown in FIG. 32, the electronic device 431 that has received the content related to the "character ABC" displays an image related to the "character ABC" on the user interface 488 (display unit 487) (shown in FIG. 26). Further, the electronic device 431 outputs the sound relating to the "character ABC" from the audio output unit 485 (shown in FIG. 26). The electronic device 442 that has received the content related to the "character EFG" transmits the content to the electronic device 443 (including the display unit), and displays the image related to the "character EFG" on the display unit of the electronic device 443. In addition, the electronic device 442 causes the sound output unit to output the sound related to the "character EFG". The electronic device 452 that has received the content related to the "character HIJK" displays images related to the "character HIJK" on the display unit. In addition, the electronic device 452 causes the sound output unit to output the sound related to the "character HIJK".

[Operation Example of Sending the Acquired Information to the Server]

Figure 33:
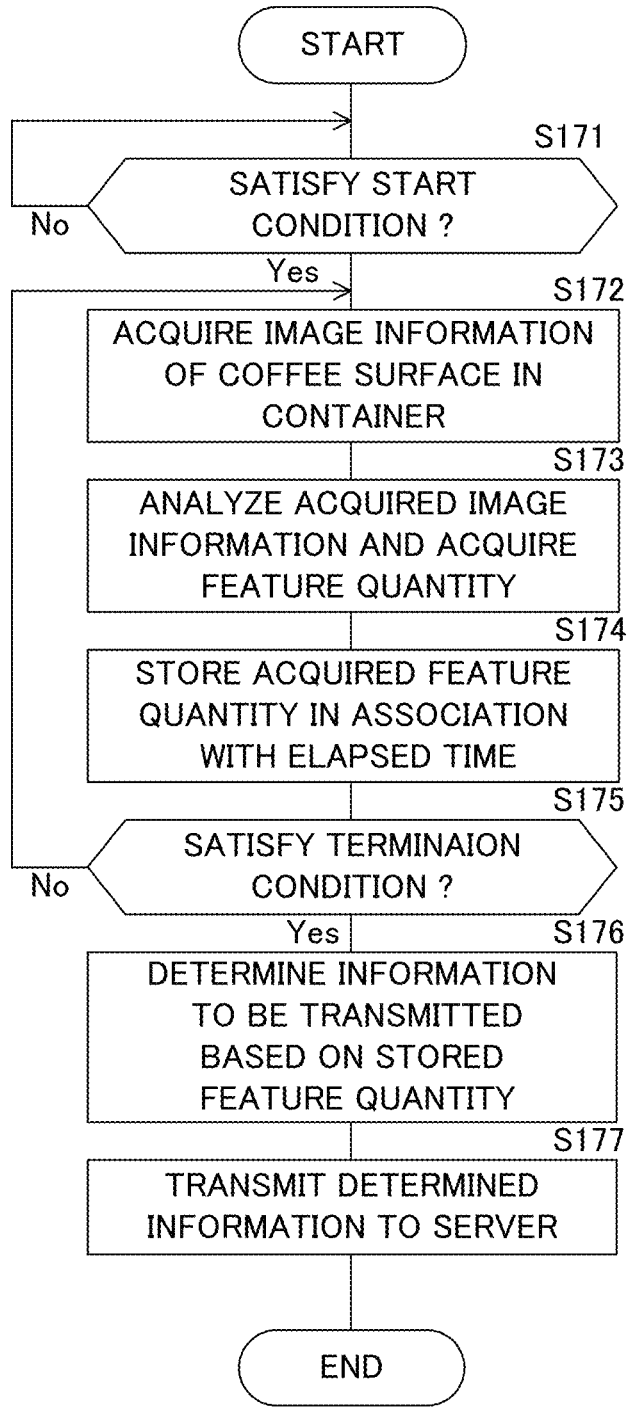
FIG. 33 is a flowchart showing an example of a transmission process by the electronic device 431 in the fifth embodiment.

FIG. 33 is a flowchart showing an example of transmission processing by the electronic device 431 according to the fifth embodiment. The step S171~S177 shown in FIG. 33 corresponds to the step S151~S157 shown in FIG. 30. Therefore, here, the description will focus on points different from the example shown in FIG. 30.

First, the control unit 483 of the electronic device 431 determines whether the start instruction is detected or not (step S171). When the start instruction is detected (step S171), the process proceeds to step S172. When the starting instruction is not detected (S171), the monitoring is continued.

[Operation Example for Outputting the Content Provided by the Server]

Figure 34:
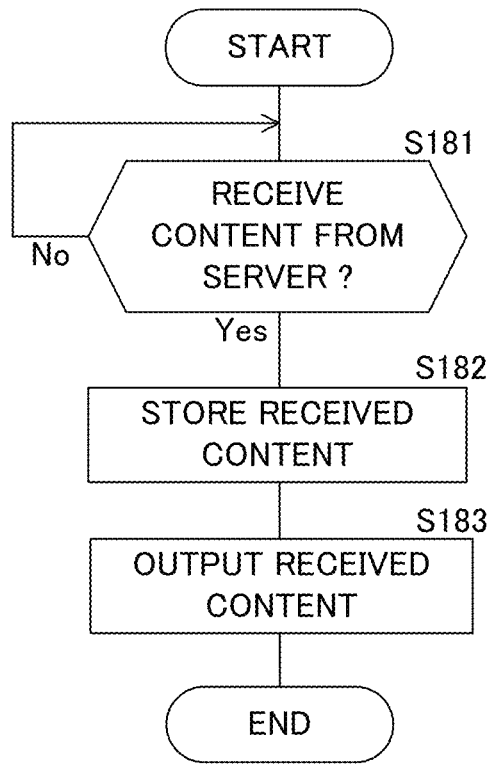
FIG. 34 is a flowchart showing an example of a content output process by the electronic device 431 according to the fifth embodiment.

FIG. 34 is a flowchart showing an example of content output processing by the electronic device 431 according to the fifth embodiment. Incidentally, the step S181~S183 shown in FIG. 34 corresponds to the step S164~S166 shown in FIG. 31. Therefore, here, the description will focus on points different from the example shown in FIG. 31.

First, the control unit 483 of the electronic device 431 determines whether content have been received from the server 410 or not (step S181). If the content is received from the server 410 (step S181), the process proceeds to step S182. Further, when the content is not received from the server 410 (step S181), monitoring is continuously performed.

[Example of Operation for Providing Content to Each Electronic Device]

Figure 35:
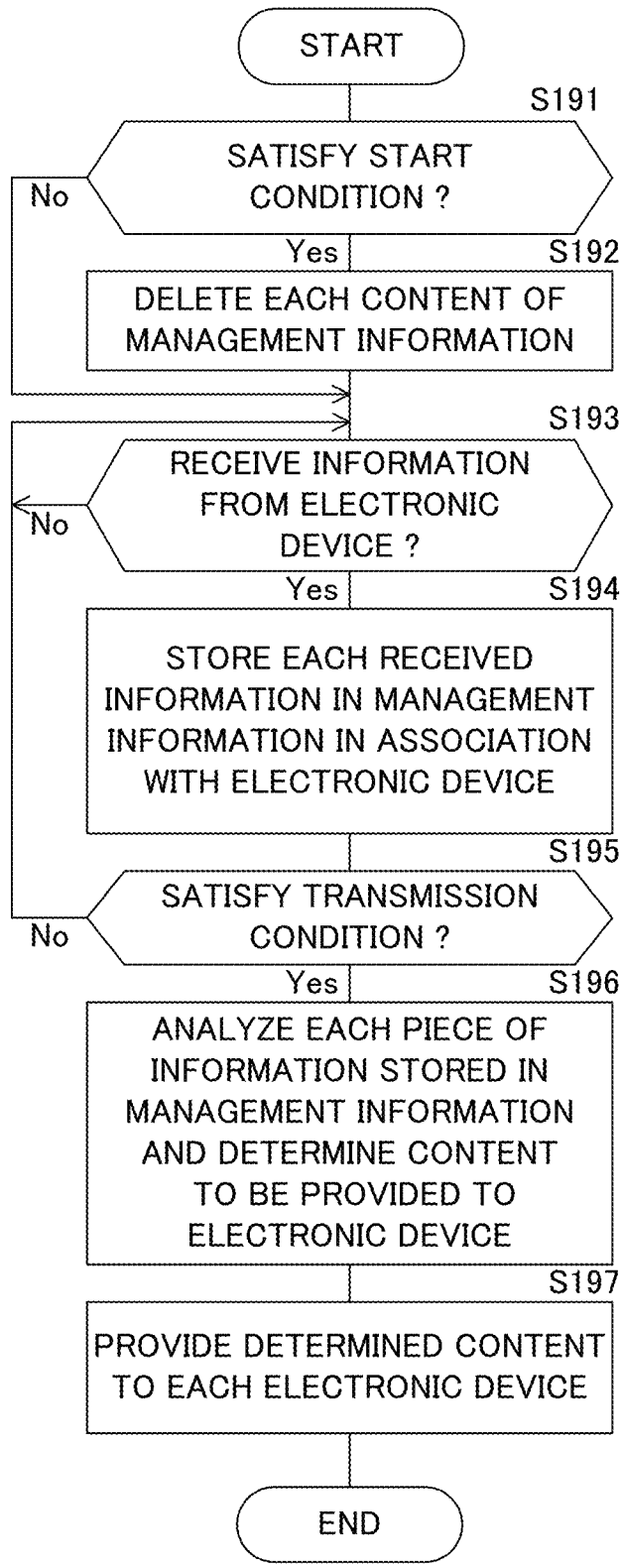
FIG. 35 is a flowchart illustrating an example of a content providing process performed by the server 410 according to the fifth embodiment.

FIG. 35 is a flowchart showing an example of content providing processing by the server 410 according to the fifth embodiment. Incidentally, the step S193~S197 shown in FIG. 35 corresponds to the step S158, S159, S161~S163 shown in FIG. 30 and FIG. 31. Therefore, here, the description will focus on points different from the examples shown in FIG. 30 and FIG. 31.

First, the control unit 412 of the server 410 determines whether the starting condition is satisfied or not (step S191). When the starting condition is satisfied (step S191), the process proceeds to step S192. If the starting condition is not satisfied (step S191), the process proceeds to step S193.

Here, the start condition may be, for example, that when the content is provided on a daily basis, the content is provided at midnight at a certain point in the world. For example, if the server 410 is installed in Japan, it can be determined that the start condition is satisfied when midnight of Japan time. When content is provided only within a limited area, it is possible to set the condition that the time zone for starting the activity time in the area (for example, 4:00 a.m.) has been reached.

When the starting condition is satisfied (step S191), the control unit 412 of the server 410 deletes the content of the management information in the storage unit 413 (step S192). As a result, it is possible to provide new content (characters) to each electronic device on the basis of the new information.

Next, the control unit 412 of the server 410 determines whether the information (e.g., output information determined by the determination process (e.g., data OI (OIX1)) to be output shown in FIG. 9B) is received from the electronic device or not (step S193). When the information is received from the electronic device (step S193), the process proceeds to step S194. When the information is not received from the electronic device (step S193), the monitoring is continued.

When information is received from the electronic device (step S193), the control unit 412 of the server 410 stores the received information in the storage unit 413 in association with the electronic device that transmitted the information (step S194).

Next, the control unit 412 of the server 410 determines whether the transmission condition is satisfied or not (step S195). If the transmitting condition is not satisfied, the process returns to step S193.

When the transmission condition is satisfied (step S195), the control unit 412 of the server 410 determines content to be provided to each electronic device on the basis of each piece of information stored in the management information (step S196).

Next, the communication unit 411 of the server 410 transmits the content corresponding to the information stored in the providing content information 465 to the respective electronic devices under the control of the control unit 412 (step S197).

[Operation Example when the Server Performs Each Processing]

In the above description, an example has been described in which the electronic device attached to the coffee extractor performs the determination process for determining the output information, and transmits the information determined by the determination process to the server 410. Here, as shown in the fourth embodiment, it is also conceivable that the electronic device attached to the coffee extractor is made to perform only a relatively simple process, and the server 410 having a high processing capability is made to perform other processes. Therefore, in FIG. 36, an example is shown in which the electronic device attached to the coffee extractor only acquires and transmits the image information on the surface of the coffee stored in the container, and the other processing is performed by the server 410.

[Example of Communication when a Series of Processes are Performed in a Plurality of Electronic Devices]

Figure 36:
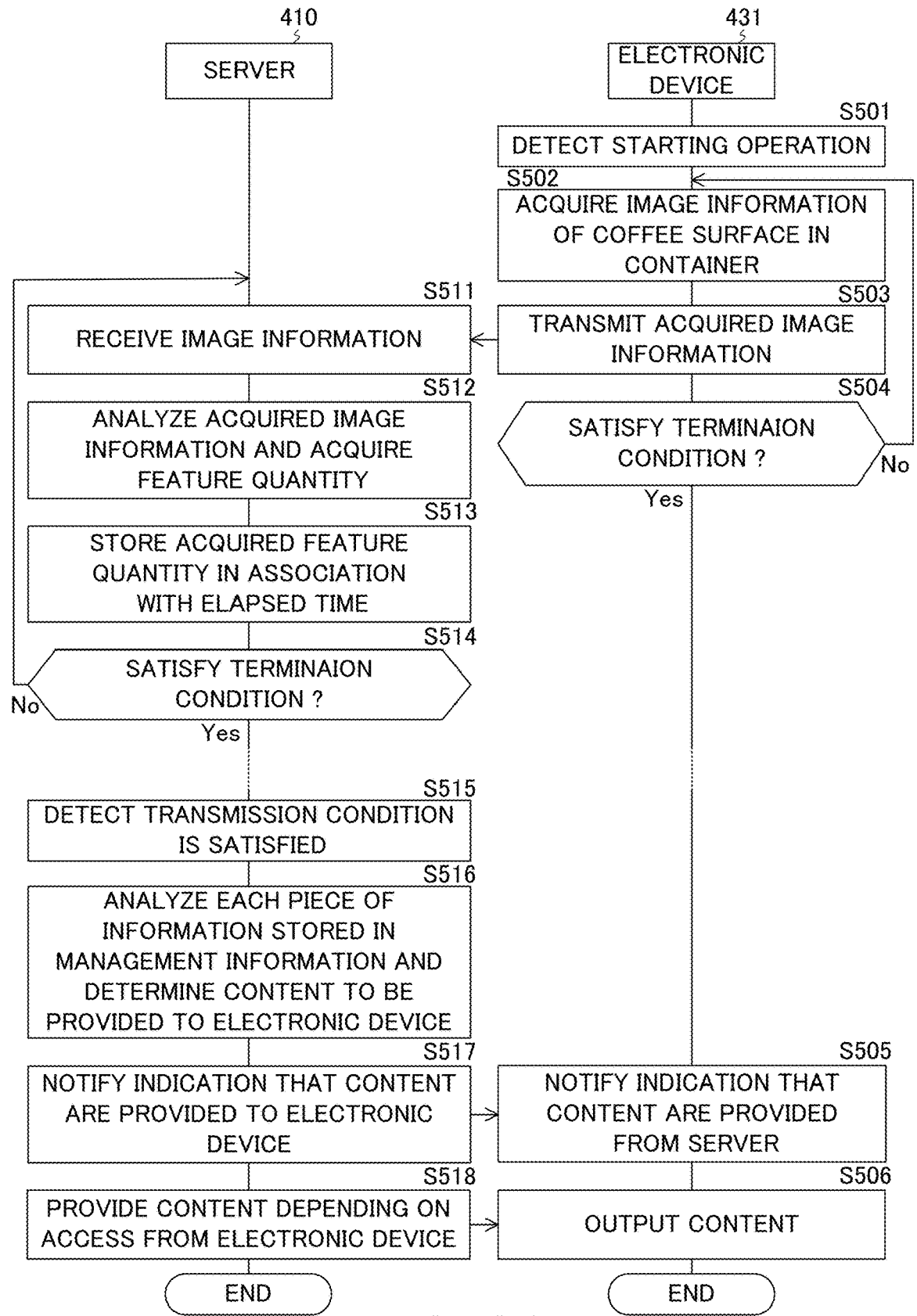
FIG. 36 is a flowchart showing a communication processing example by the server 410 and the electronic device 431 in the fifth embodiment.

FIG. 36 is a flowchart showing an example of communication processing by the server 410 and the electronic device 431 according to the fifth embodiment. The step S501~S504 shown in FIG. 36 corresponds to the step S131, S133~S135 shown in FIG. 24. The step S515, S516 shown in FIG. 36 corresponds to the step S161, S162 shown in FIG. 31. Therefore, here, the description will focus on points different from the examples shown in FIG. 24 and FIG. 31.

When the starting instruction is detected (step S501), the control unit 483 of the electronic device 431 acquires an image acquired by the image acquisition unit 482 (an image (including image data) obtained by capturing coffee accumulated in the container) (step S502), and transmits the acquired image data to the server 410 (step S503). In this case, the transmission of the image information from the electronic device 431 to the server 410 may be performed periodically or may be performed irregularly.

The step S504 shown in FIG. 36 corresponds to the step S135 shown in FIG. 24.

Upon receiving the image information from the electronic device 431 (step S511), the control unit 412 of the server 410 analyzes the received image information and acquires the feature quantity (step S512). Next, the control unit 412 of the server 410 associates the acquired feature quantity with the electronic device 431 and stores the acquired feature quantity in the storage unit 413 (step S513). As described above, until the termination condition is satisfied, the received image information is subjected to analysis processing, and the feature quantity acquired by the analysis processing (for example, the respective pieces of information shown in FIG. 9A and the respective pieces of information shown in FIG. 16A) are sequentially stored in the storage unit 413 in association with the electronic device 431 (step S511~S514). For example, each process shown in the first to fourth embodiments (e.g., each process of the step S102~S105 shown in FIG. 11, each process of the step S112~S115 shown in FIG. 18, each process of the step S123~S126 shown in FIG. 22, the step S143~S146 shown in FIG. 24, the step S153~S156 shown in FIG. 30, the step S173~S176 shown in FIG. 33) is performed, the processing result (feature quantity) is associated with the elapsed time, and stored in the storage unit 413 in association with the electronic device 431 (e.g., each information shown in FIG. 9A, each information shown in FIG. 16A).

When the transmitting condition is satisfied (step S515), the control unit 412 of the server 410 determines content to be provided to each electronic device on the basis of each piece of information stored in the managing information (step S516).

Next, the communication unit 411 of the server 410 transmits a notification indicating that content is provided to the electronic device 431 on the basis of the control of the control unit 412 (step S517). For example, notification means such as e-mail, SNS (Social Networking Service), and Internet-based notification means can be used. In the step S517, all or part of the content may be transmitted (for example, by attaching the content to an e-mail, transmitting the content by SNS, or transmitting the content on the Internet).

Further, when the communication unit 489 of the electronic device 431 receives the notification from the server 410, it notifies the user to that effect (step S505). For example, it is possible to notify by audio output by a message to that effect, display of a message to that effect, vibration, lighting of a lamp, flashing, or the like. The user who has seen this notification accesses the server 410 by operating the electronic device 431 (or other electronic device), connects the electronic device 431 (or other electronic device) and the server 410, and can receive the content from the server 410 (step S518, S506). As a result, the control unit 483 of the electronic device 431 outputs sound from the sound output unit 485 on the basis of the provided content, and displays images on the user interface 488 (the display unit 487) on the basis of the provided content (step S506). For example, as illustrated in FIG. 32, audio is output from the audio output unit, and an image is displayed on the user interface.

In the example shown in FIG. 36, it is assumed that all of the image information from the electronic device 431 cannot be received due to some cause, for example, fogging of the lens or interruption of the wireless communication. It is also assumed that information having different extraction times is transmitted from a plurality of electronic devices. It is also assumed that image information transmitted from a plurality of electronic devices is not transmitted on the basis of a unified rule.

For example, it is assumed that image information related to five images is transmitted from the electronic device 431, image information related to three images is transmitted from the electronic device 441, and image information related to one image is transmitted from the electronic device 451. In such a case, the control unit 412 of the server 410 analyzes each piece of image information received from the electronic devices 431, 441, and 451, and sets the feature quantity based on each piece of image information as comparable information. For example, when the judgement information shown in FIG. 6A and FIG. 6B is used, the control unit 412 of the server 410 analyzes the image information received from the electronic devices 431, 441, and 451, and obtains the feature quantity (A to I) based on the image information. Then, the control unit 412 of the server 410 calculates a comparable numerical value on the basis of the obtained feature quantity (A to I) and the number of received images. For example, assume that the feature quantity based on the five images received from the electronic device 431 are A, A, B, C, and A in the order of reception, the feature quantity based on the three images received from the electronic device 441 are A, C, and D in the order of reception, and the feature quantity based on the one image received from the electronic device 451 are G. In this case, a multiplier (5-1) is determined on the basis of the maximum number of receptions (5) and multiplied by each feature quantity to calculate a comparable numerical value. Specifically, the feature quantity A to I are converted into numerical values, and the feature quantity A, A, B, C, and A relating to the electronic device 431 are converted into 1, 1, 2, 3, and 1, and the feature quantity A, C, and D relating to the electronic device 441 are converted into 1, 3, and 4, and the feature quantity G relating to the electronic device 451 is converted into 7. Then, multipliers (5 to 1) are added in the order of reception to calculate a comparable numerical value. Specifically, for the electronic device 431, 22 (=1× 5+1×4+2×3+3×2+1×1) is calculated, for the electronic device 441, 29 (=1×5+3×4+4×3) is calculated, for the electronic device 451 calculates 35 (=7×5). In this case, 22 (electronic device 431)<29 (electronic device 441)<35 (electronic device 451), the identification number in this order (serial number) is determined. That is, 1 is determined for the electronic device 431, 2 is determined for the electronic device 441, and 3 is determined for the electronic device 451. Incidentally, it is also assumed that the value calculated as a comparable numerical value is the same in a plurality of electronic devices to each other. In this case, for example, the identification number can be determined on the basis of the reception time. For example, the numbers can be assigned in order from the electronic device having the earliest reception time.

In this manner, even when image information transmitted from a plurality of electronic devices is not transmitted on the basis of a unified rule, identification information (e.g., serial number) to be assigned to each electronic device can be determined, and content can be provided to each electronic device. Thus, for example, in a coffee shop, the content can be provided to a user who takes pictures of the surface of the coffee with an electronic device, such as a smart phone, and transmits the image to the server 410. That is, each user such as a user who drinks coffee brewed using a coffee extractor at home or at work, a user who drinks coffee brewed using instant coffee, or a user who drinks coffee brewed by another person at a coffee shop, can participate in a service of receiving at least one content out of a plurality of content and enjoy the provided content. Thus, in the 5 embodiment, content can be determined and provided by comparison of relative information.

It is also assumed that the image information transmitted from the plurality of electronic devices will be the same (or the same pattern) or similar (approximate) (or similar (approximate) pattern). In such a case, each electronic device that has transmitted the image information of the same (or the same pattern) or similar (approximate) (or similar (approximate) pattern) can be provided with some benefits or benefits in addition to the content determined by the above-described processes. For example, in the case of providing the content on a daily basis, the control unit 412 of the server 410 can determine on the basis of each piece of information stored in the management information whether there is an electronic device that has transmitted the same (or the same pattern) or similar (or a similar pattern) image information at 12:00 p.m. (24:00 p.m.) at the reference point or not. When there is an electronic device that has transmitted image information of the same (or the same pattern) or similar (or a similar pattern), the control unit 412 of the server 410 can provide other content (for example, a special character, an animation character, or a specific service) other than the determined content to each electronic device. As a result, the user who has received the normal content receives the content other than the content (i.e., any benefits or preferential treatment) thereby increasing the enjoyment further.

In the example shown in FIG. 36, the server 410 performs a series of processing on the basis of image information from the electronic device 431. However, a part of the processing performed by the server 410 may be performed by one or a plurality of other devices. In this case, the information processing system configured by a plurality of devices performs each processing (each processing performed by the server 410) shown in FIG. 36.

Thus, the server 410 (or a plurality of devices constituting this) is an example of an information processing device for determining the content to be provided to each person related to a plurality of containers (e.g., information independent of the coffee), an information processing system and communication system when the coffee produced by the material for generating coffee (e.g., coffee beans, ground powder, instant coffee) and the hot water accumulates in a container, during its generation, and when putting the generated coffee in a container, or after putting the generated coffee in a container, and the information acquired with respect to the generated coffee (information acquired from the coffee) is acquired for each coffee in a plurality of containers, on the basis of the acquired information.

The server 410 is an example of an information processing device, an information processing system, and a communication system that determine content to be provided to persons related to a plurality of containers on the basis of the acquired information, by acquiring information about each coffee in a plurality of containers when the extracted coffee is put in a container or after the extracted coffee is put in a container.

In addition, the server 410 (or a plurality of devices constituting this) may use, as information about the extracted coffee, for example, feature quantities regarding changes (e.g., color, pattern, generation of foam) in the surface of the extracted coffee in a container, for example, when putting the extracted coffee in a container or after putting the extracted coffee in a container. Further, the server 410 (or a plurality of devices constituting this) can determine the content to be imparted to each person associated with the plurality of containers, for example, by comparing each information acquired for each coffee contained in a plurality of containers.

[Example of Using Other Sensors]

In the above description, an example has been described in which various information (for example, transition of the surface) is acquired mainly when coffee is generated using an image sensor (image sensor, image pickup device) or after coffee is generated, but various information may be acquired when coffee is generated using other sensors or after coffee is generated. FIG. 37A to FIG. 37F shows an example of attaching various sensors to a coffee extractor (electronic device).

FIG. 37A to FIG. 37F is a diagram showing an example of attachment of a sensor to be attached to a coffee extractor or an electronic device in the first to fifth embodiments. Incidentally, the coffee extractor 600, 610, 620, 630, 640 shown in FIG. 37A to FIG. 37E has a stand 602, 612, 622, 632, 642 substantially the same as the coffee extractor 200 shown in FIG. 13A and FIG. 13B. The coffee extractor 650 shown in FIG. 37F does not have a stand substantially the same as the coffee extractor 1 shown in FIG. 1A and FIG. 1B. Also, the coffee extractor 600, 610, 620, 630, 640, 650 has a dripper 601, 611, 621, 631, 641, 651 and a container 603, 613, 623, 633, 643, 652. Incidentally, each sensor 604, 614, 624, 634, 644, 661 will be described in the following description of each sensor. The sensor 634 that enters the liquid (coffee) and the sensor 624 that may receive steam are preferable to apply a waterproof treatment. Further, for the sensor having the influence of the temperature of the steam it is preferable to apply a heat insulating treatment, heat-resistant treatment.

For example, a temperature sensor capable of measuring the temperature can be used. For example, a temperature sensor may be installed at a position where the temperature of the liquid (coffee) accumulated in the container in the coffee brewer can be measured, and the transition of the temperature from the start to the end of the coffee brewing can be acquired by the temperature sensor. For example, a temperature sensor may be mounted at a position of each sensor 604, 614, 624, 634, 644 shown in FIG. 37A to FIG. 37E. Then, the content to be output can be determined on the basis of the transition of the temperature.

In addition, for example, an odor sensor capable of measuring an odor can be used. The odor sensor may be, for example, a sensor capable of detecting a specific odor or a sensor capable of outputting some information according to the odor. For example, an odor sensor is attached to a position where the odor of a liquid (coffee) accumulated in a container of a coffee extractor can be measured, and the transition of the odor from the start to the end of coffee extraction can be acquired by the odor sensor. The location at which the odor sensor is mounted may be, for example, the interior of the container, the lower part of the dripper (to enter the interior of the container). For example, odor sensors may be mounted at the locations of the sensors 624, 634 shown in FIG. 37C, FIG. 37D. Then, the content to be output can be determined on the basis of the transition of the odor. For example, the content to be output can be determined by digitizing the information on each odor acquired in time series, calculating a comparable numerical value, and comparing the numerical value.

In addition, for example, a sound sensor, e.g., a microphone, capable of measuring sound can be used. For example, a sound sensor may be installed at a position where sound emitted from a liquid (coffee) accumulated in a container in a coffee extractor can be measured, and a transition of sound generated from the start to the end of coffee brewing can be acquired by the sound sensor. The location at which the sound sensor is mounted may be, for example, within the container, lower part of the dripper (to enter the interior of the container), or external to the container. For example, sound sensors may be mounted at positions of each sensor 604, 614, 624, 634, 644 shown in FIG. 37A to FIG. 37E. Then, the content to be output can be determined on the basis of the transition of the sound. For example, the content to be output can be determined by numerically calculating (e.g., adding and multiplying) the information on each sound acquired in time series, calculating a comparable numerical value, and comparing the numerical value.

Further, for example, a weight sensor which is capable of measuring a weight can be used. For example, a weight sensor may be attached to a position (e.g., the bottom of the container) at which the weight of the liquid (coffee) accumulated in the container in the coffee brewer can be measured, and the weight sensor may acquire the transition of the weight from the start to the end of the coffee brewing. The location at which the weight sensor is mounted may be, for example, the bottom of the container. For example, a weight sensor can be attached to the position of the sensor 644 shown in FIG. 37E. Then, the content to be output can be determined on the basis of the transition of the weight. For example, the content to be output can be determined by calculating (e.g., adding and multiplying) the numerical values of the respective weights acquired in time series to calculate a comparable numerical value and comparing the numerical values.

In addition, for example, a taste sensor which is capable of measuring taste can be used. For example, a taste sensor is attached to a position where the taste of a liquid (coffee) accumulated in a container in a coffee extractor can be measured, and the taste sensor can acquire the transition of the taste from the start to the end of the coffee extraction. The location at which the taste sensor is mounted may be, for example, the interior of the container, the lower part of the dripper (to enter the interior of the container). For example, a taste sensor may be attached at the location of a sensor 634 (e.g., a sensor that attaches to the opening of the container 633 in a clip format) shown in FIG. 37D. Then, the content to be output can be determined on the basis of the transition of the taste. For example, the content to be output can be determined by numerically calculating (e.g., adding and multiplying) the information on each taste acquired in time series, calculating comparable numerical values, and comparing the numerical values.

Figure 37A:
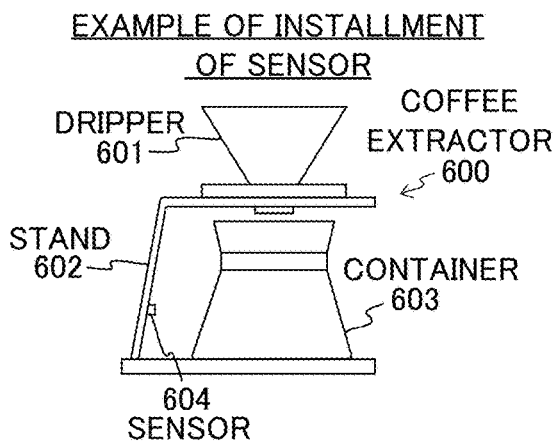
FIG. 37A is a diagram illustrating an example of mounting a sensor to be attached to the coffee extractor or the electronic device according to the first to fifth embodiments.
Figure 37D:
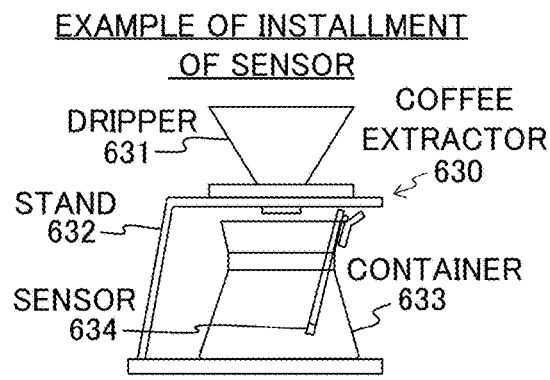
FIG. 37D is a diagram illustrating an example of mounting a sensor to be attached to the coffee extractor or the electronic device according to the first to fifth embodiments.
Figure 37B:
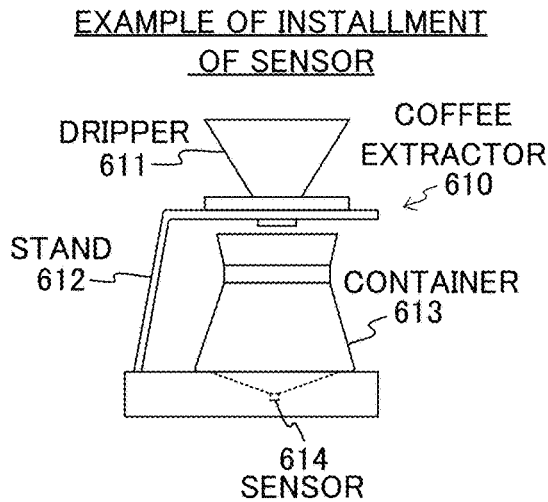
FIG. 37B is a diagram illustrating an example of mounting a sensor to be attached to the coffee extractor or the electronic device according to the first to fifth embodiments.
Figure 37E:
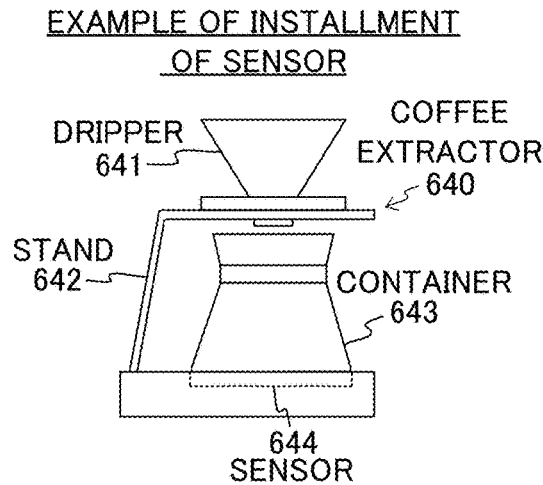
FIG. 37E is a diagram illustrating an example of mounting a sensor to be attached to the coffee extractor or the electronic device according to the first to fifth embodiments.
Figure 37C:
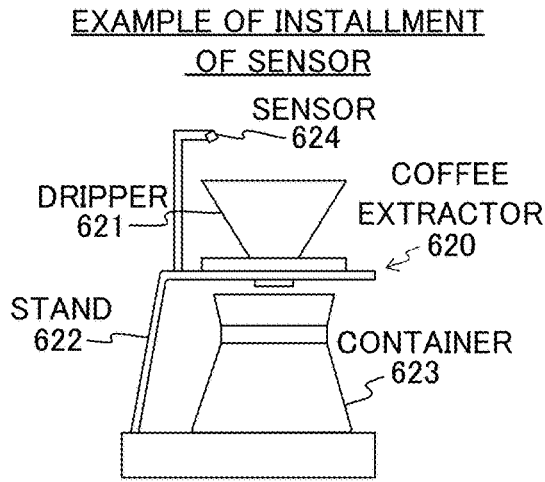
FIG. 37C is a diagram illustrating an example of mounting a sensor to be attached to the coffee extractor or the electronic device according to the first to fifth embodiments.
Figure 37F:
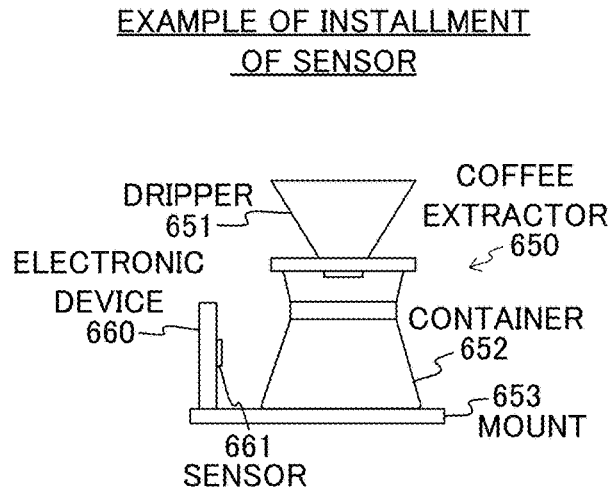
FIG. 37F is a diagram illustrating an example of mounting a sensor to be attached to the coffee extractor or the electronic device according to the first to fifth embodiments.

Each of the sensors described above is an example, and a sensor for acquiring other information may be used. In addition, each sensor used may have such a performance as to be able to acquire some information, for example, whether the temperature is 75 degrees or more or not, the presence or absence of a specific odor or not, the presence or absence of a specific sound or not, and the presence or absence of a specific taste or not. That is, a sensor that can acquire comparable information for each extraction can also be used. As shown in FIG. 37F, a sensor 661 provided in an electronic device 660 installed outside the coffee extractor 650 may be used. For example, an electronic device 660 (e.g., a smart phone) may be installed outside the container 652 so that image information regarding the liquid (coffee) accumulated in the container 652 of the coffee extractor 650 may be acquired. The sensor 661 (e.g., a camera) of the electronic device 660 is used to acquire image information on the liquid (coffee) accumulated in the container 652 of the coffee extractor 650, and this image information can be used. In this case, the electronic device 660 functions as the electronic device (the electronic device attached to the coffee extractor) described in the first to fifth embodiments. Further, a mounting portion for installing the electronic device 660 to the base for installing the container 652 (mount 653) (e.g., a smartphone mounting portion) is provided, it may be attached to the electronic device 660 to the mounting portion. In addition, other sensors (e.g., sensors for detecting vibration, microphones) of the electronic device 660 (e.g., smart phone) may be used to acquire information (e.g., vibration generated by a falling liquid, sound generated by a falling liquid) relating to the liquid (coffee) accumulated in the container 652 of the coffee extractor 650, and to use the information. As a result, anyone can easily install the electronic device 660 and enjoy the output of the content described in the first to fifth embodiments.

[Example of Using a Plurality of Sensors]

Although an example has been described above in which various information is acquired when coffee is produced using various sensors or after coffee is produced, various information may be acquired when coffee is produced using a plurality of sensors among the various sensors or after coffee is produced. FIG. 38A to FIG. 38D shows an example of attaching a plurality of sensors to an electronic device.

Figure 38A:
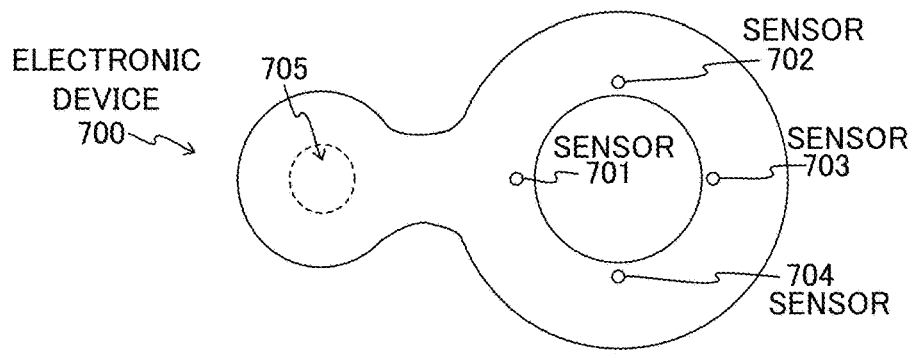
FIG. 38A is a diagram illustrating an example of mounting the sensor attached to the electronic device 700, 710, 720, 725 in the first to fifth embodiments.
Figure 38B:
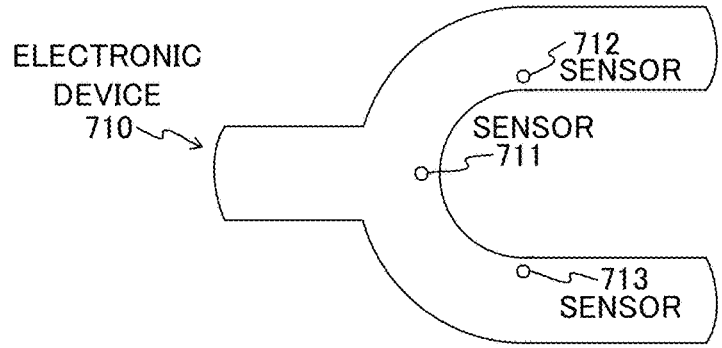
FIG. 38B is a diagram illustrating an example of mounting the sensor attached to the electronic device 700, 710, 720, 725 in the first to fifth embodiments.
Figure 38C:
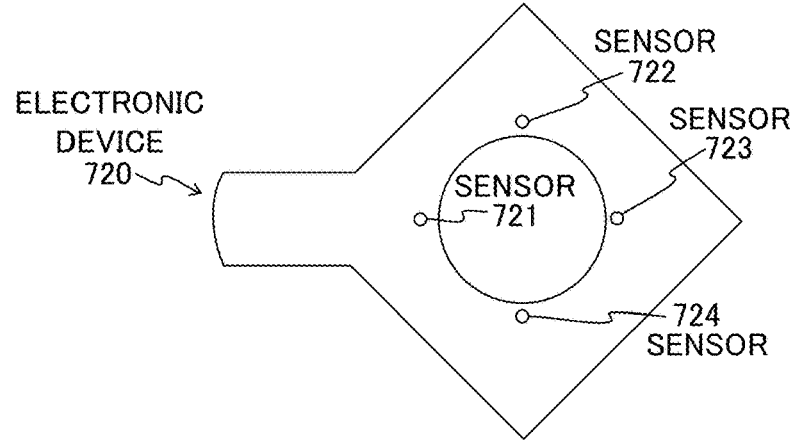
FIG. 38C is a diagram illustrating an example of mounting the sensor attached to the electronic device 700, 710, 720, 725 in the first to fifth embodiments.

FIG. 38A to FIG. 38D is a diagram illustrating an example of mounting a sensor to be attached to the electronic devices 700, 710, 720, and 725 in the first to fifth embodiments. Incidentally, the electronic devices 700, 710, 720, and 725 shown in FIG. 38A to FIG. 38D are modifications of the electronic device 20 shown in FIG. 1A to FIG. 3D. Further, the electronic device 700 shown in FIG. 38A is obtained by deforming the shape of the gripping portion 27 of the electronic device 20. Further, the electronic device 710 and 720 shown in FIG. 38B, FIG. 38C are obtained by deforming the shape of the annular portion 28 of the electronic device 20. Further, the electronic device 725 shown in FIG. 38D omits the gripping portion 27 of the electronic device 20, and it is obtained by deforming the shape of the annular portion 28. Further, in FIG. 38A to FIG. 38D, similarly to FIG. 3D, it shows a lower view of the electronic devices 700, 710, 720, 725.

Electronic device 700 shown in FIG. 38A, in place of the lens 21 of the electronic device 20 shown in FIG. 3D is provided with four sensors 701 to 704. Further, so that the user can easily hold the electronic device 700, it is provided with a recess 705 (recess) in the grip portion.

Electronic device 710 shown in FIG. 38B is obtained by deforming the shape of the annular portion 28 of the electronic device 20 shown in FIG. 3D into an U-shaped shape, which is provided with three sensors 711 to 713.

Electronic device 720 shown in FIG. 38C is obtained by deforming the shape of the annular portion 28 of the electronic device 20 shown in FIG. 3D into rectangular shape, which is provided with four sensors 721 to 724.

Figure 38D:
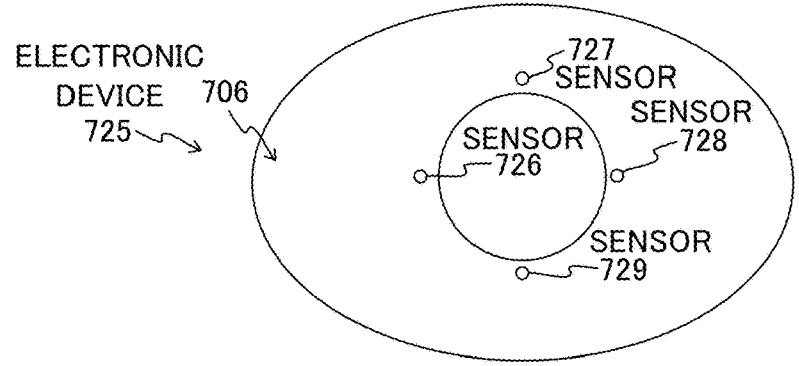
FIG. 38D is a diagram illustrating an example of mounting the sensor attached to the electronic device 700, 710, 720, 725 in the first to fifth embodiments.

Electronic device 725 shown in FIG. 38D is obtained by deforming the shape of the annular portion 28 of the electronic device 20 shown in FIG. 3D into an elliptical shape, which is provided with four sensors 726 to 729. Further, it is obtained by omitting the gripping portion 27 of the electronic device 20. Incidentally, each portion provided in the gripping portion 27 of the electronic device 20 (e.g., the operation unit 26, the audio output unit 25) can be provided on other portions (e.g., the side surface, a portion extending from the flange portion (e.g., a portion indicated by reference numeral 706)).

A plurality of sensors of the same type may be provided for the sensors 701 to 704 shown in FIG. 38A, and all of them may be different sensors. For example, the sensors 701-704 may be at least one of the sensors described above. Further, a plurality of sensors of the same type (e.g., image sensors) may be provided to increase the accuracy of the sensor. The same applies to sensors 711 to 713 shown in FIG. 38B, sensors 721 to 724 shown in FIG. 38C, and sensors 726 to 729 shown in FIG. 38D. Further, the position for providing the sensor is not limited to the example shown in FIG. 38A to FIG. 38D, it can be installed in a position where it is capable of exhibiting the performance of the sensor. Further, as for the electronic device to be attached to the coffee extractor, the configuration of the control unit or the like other than the sensor may be omitted. In this case, information from the sensor can be used by transmitting to other electronic devices by wired lines or the like.

[Variation of Coffee Extractor]

Figure 39:
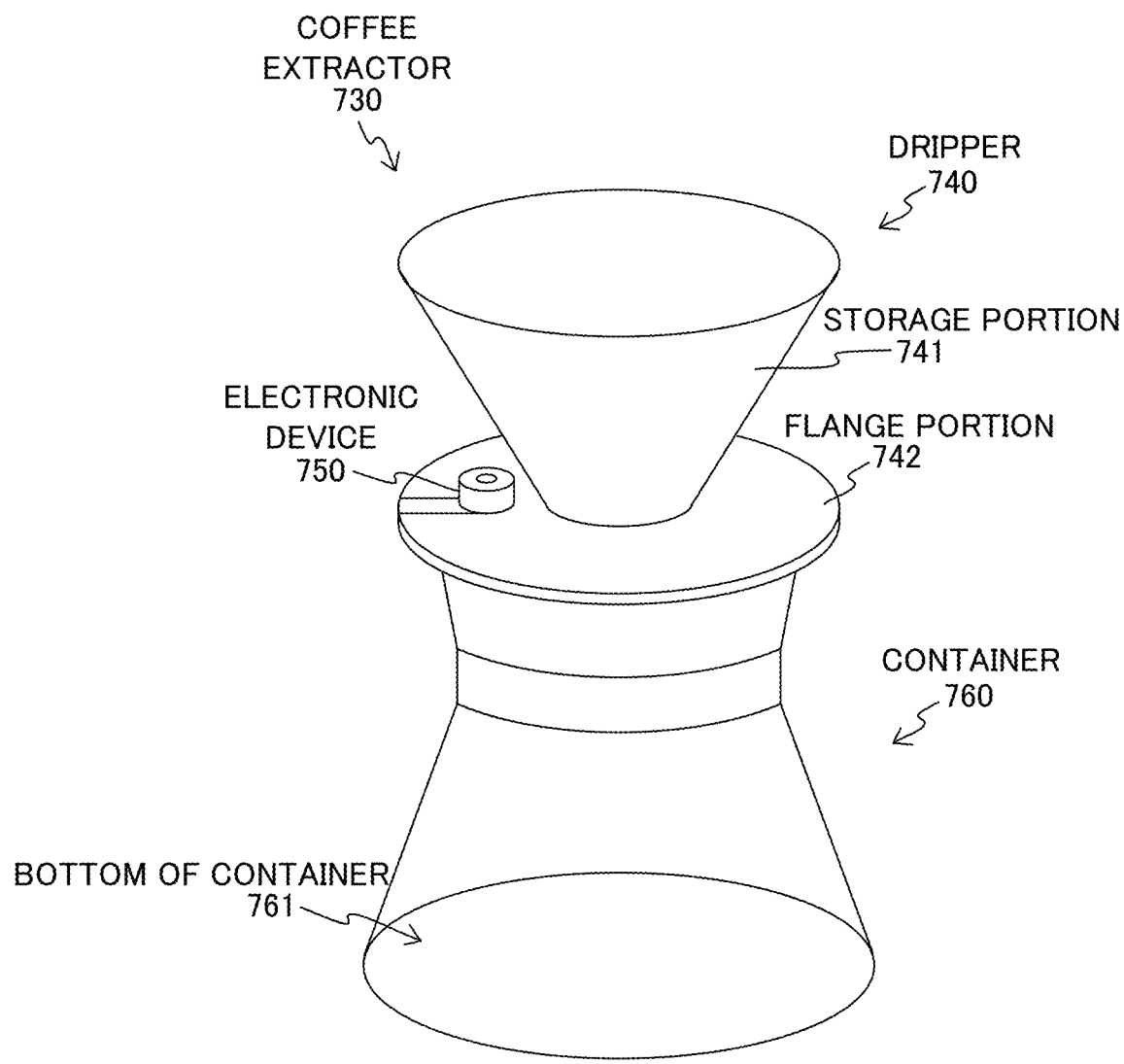
FIG. 39 is a diagram showing an appearance of a modification of the coffee extractor 1 (coffee extractor 730) in the first embodiment.
Figure 40A:
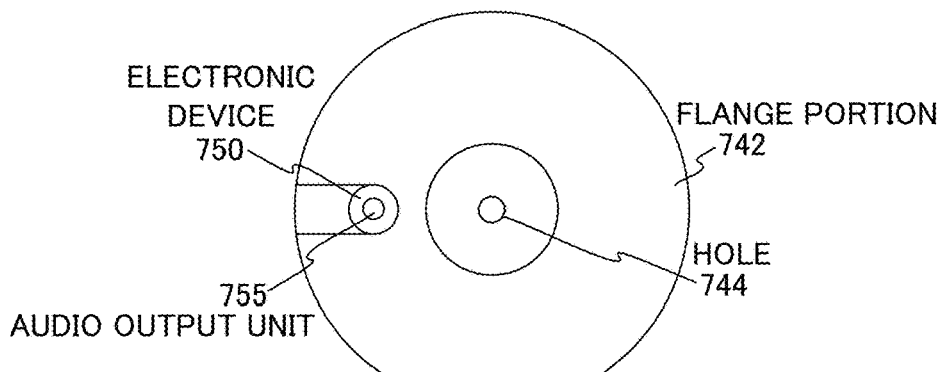
FIG. 40A is a diagram showing an appearance of a modification of the coffee extractor 1 (coffee extractor 730) in the first embodiment.
Figure 40B:
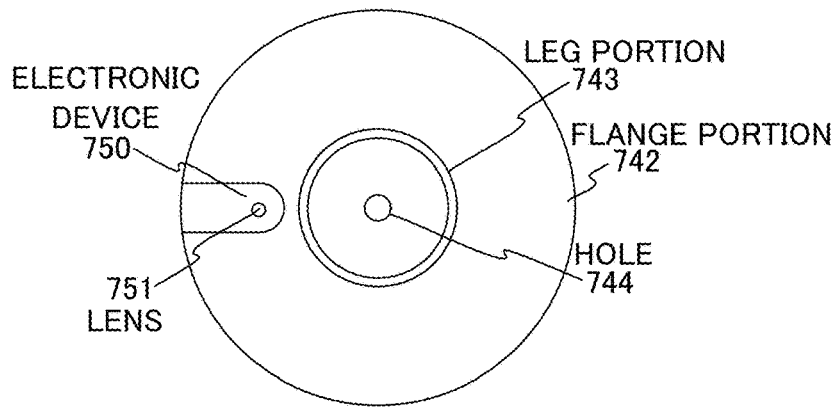
FIG. 40B is a diagram showing an appearance of a modification of the coffee extractor 1 (coffee extractor 730) in the first embodiment.
Figure 40C:
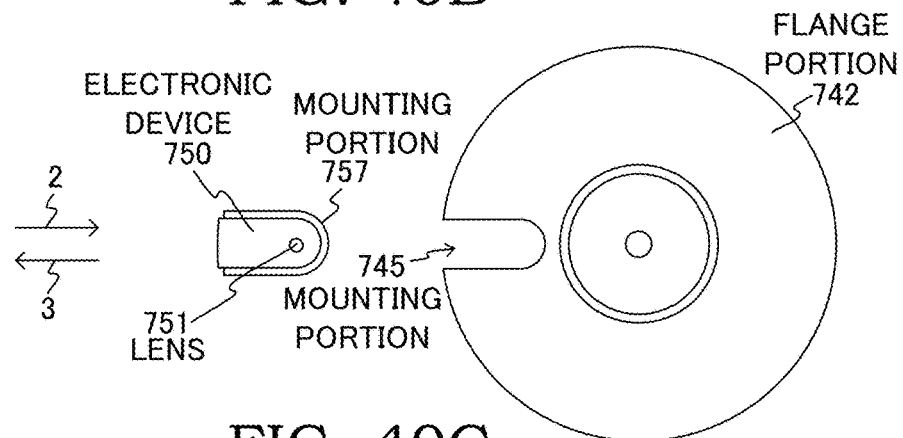
FIG. 40C is a diagram showing an appearance of a modification of the coffee extractor 1 (coffee extractor 730) in the first embodiment.
Figure 40D:
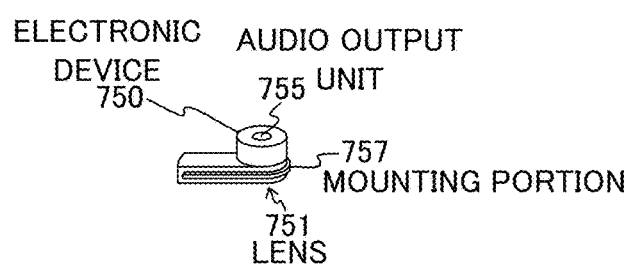
FIG. 40D is a diagram showing an appearance of a modification of the coffee extractor 1 (coffee extractor 730) in the first embodiment.

FIG. 39 to FIG. 40D are diagrams showing the appearance of a modification of the coffee extractor 1 according to the first embodiment, i.e., the coffee extractor 730. FIG. 39 shows a perspective view of the coffee extractor 1. Further, FIG. 40A shows a top view of the dripper 740 in a state of attaching the electronic device 750 to the flange portion 742, and FIG. 40B shows a bottom view of the dripper 740 in a state that the electronic device 750 is attached to the flange portion 742. In FIG. 40A, the accommodating portion 741 is omitted for easy explanation. Further, FIG. 40C shows a lower view of the electronic device 750 in a state of being removed from the flange portion 742, and FIG. 40D shows a perspective view of the electronic device 750 in a state of being removed from the flange portion 742.

Coffee extractor 730 includes dripper 740, electronics 750, and container 760. The dripper 740, the electronic device 750, and the container 760 correspond to the dripper 10, the electronic device 20, and the container 30 shown in FIG. 1A to FIG. 3D, respectively. Therefore, the following description focuses on points different from the dripper 10, the electronic device 20, and the container 30.

The dripper 740 is a coffee dripper having a storage portion 741 and a flange portion 742, and it is used by placing at the opening portion of the container 760. Further, at the flange portion 742, the electronic device 750 is attached.

The electronic device 750 is an electronic device removably attached to the flange portion 742, and it has an audio output unit 755, a lens 751, and a mounting portion 757. Further, the electronic device 750 is attached to slide into the recess of the mounting portion 745 of the flange portion 742 (recess corresponding to the shape of the convex portion of the mounting portion 757).

The mounting portion 757 is a portion for attaching the notch (mounting portion 745) provided in a part of the flange portion 742. The mounting portion 757 is a convex portion corresponding to the shape of the recess of the mounting portion 745, and it is formed so as to fit into the recess of the mounting portion 745. Incidentally, on the contrary to the example shown in FIG. 40A to FIG. 40D, the mounting portion 757 may be the shape of the recess, and the mounting portion 745 of the flange portion 742 may be the shape of the convex portion (the convex portion corresponding to the shape of the recess of the mounting portion 757), and the mounting portion 757 may be formed so as to fit the convex portion of the mounting portion 745. Further, here, although an example of attaching the electronic device 750 to the mounting portion 745 with a part of the flange portion 742 being a notch portion (mounting portion 745), other mounting methods may be used.

For example, when attaching the electronic device 750 to the flange portion 742, by aligning the convex portion of the mounting portion 757 in the recess of the mounting portion 745 of the flange portion 742, pushing the electronic device 750 in the direction of arrow 2 (FIG. 40C) slide. Further, when removing the electronic device 750 from the flange portion 742, to slide so as to pull the electronic device 750 on the outside of the flange portion 742 (the direction of arrow 3 (FIG. 40C)). Incidentally, at least one of the mounting portion 745 of the flange portion 742 and the mounting portion 757 of the electronic device 750 may be provided with a locking member for locking the electronic device 750 to the flange portion 742.

Thus, by making the mounting of the electronic device 750 sliding, it is easy to attach and detach the electronic device 750.

Further, the lens 751 of the electronic device 750 is disposed on the lower surface of the flange portion 742. The lens 751 of the electronic device 750 is arranged so that the optical axis direction of the lens 751 faces the surface of the coffee extract accumulated in the container 760 when the dripper 740 is set in the container 760.

Further, as for each device incorporated in the electronic device 750 it is preferable to perform a heat insulating treatment and waterproofing treatment. As for the lens 751, it is preferable to perform to anti-fogging treatment.

As described above, various methods can be used as a method of attaching the electronic device to the coffee extractor.

[Example of Obtaining and Using Other Information on Liquid (Coffee)]

Note that, in the above, an example has been described in which information relating to a liquid (coffee) accumulated in a container of a coffee extractor is acquired and used. However, other information about the liquid (coffee) may be acquired and used. For example, when a liquid (hot water) is poured into a dripper containing coffee powder, the coffee powder or liquid (hot water) in the storage portion of the dripper transitions according to the pouring condition. For example, the coffee beans may have different transitions (e.g., indentations or mountains in the middle) between finely ground and roughly ground coffee beans. Depending on the rate at which the liquid (hot water) is poured, different transitions may occur (e.g., hot water filled, hot water only in the dimples of powder, etc.). For example, depending on the degree of pouring and the degree of pulverization of the powder, the powder of coffee in the storage portion of the dripper may be filled with a liquid (hot water), and then a foam may be generated. For example, the coffee powder in the storage portion of the dripper may swell or become flat, depending on the degree of grinding of the powder. Therefore, when coffee is produced, or after coffee is produced, various types of information on coffee powder and liquid (hot water) in the storage portion of the dripper containing coffee powder may be acquired by using various types of sensors. For example, as shown in FIG. 37C, the image sensor (image sensor, image pickup device) can be installed on the upper side of the storage portion of the dripper, and image information on coffee powder and liquid (hot water) in the storage portion of the dripper can be acquired and used.

As other information on the liquid (coffee), for example, information on the case of grinding coffee beans by a coffee mill (device for grinding coffee beans) may be acquired and used. For example, it is possible to acquire and use information on sound or the like emitted when coffee beans are ground by a coffee mill. In addition, the information acquired on the coffee mill and the information acquired by the coffee extractor may be used in combination.

[Example of Using Time Information and Positional Information Together with Information on Liquids (Coffee)]

In the above description, an example has been described in which various types of information relating to a liquid (coffee) are acquired, and the content to be provided are determined using the acquired information. In addition, an example has been described in which content to be provided is determined on the basis of image information and time information on liquid (coffee). However, in the case that the electronic device uses the positional information (for example, in the case that the electronic device includes the positional information acquisition unit 358 shown in FIG. 21 or the positional information acquisition unit 490 shown in FIG. 26), the positional information can be used. For example, the electronic device (the electronic device attached to the coffee extractor and the electronic device transferring the information from the electronic device attached to the coffee extractor) can transmit the positional information (e.g., the information for specifying latitude and longitude and region) regarding the own device to the server 410 together with the information regarding the liquid (coffee). In this case, the control unit 412 of the server 410 can determine the content to be provided on the basis of the information (e.g., image information, sound information, etc.) relating to the liquid (coffee) and the positional information. For example, multiple content may be grouped into multiple groups (e.g., the number of countries providing content) and the groups allocated to each country may be changed sequentially each time the day changes. For example, each electronic device existing in a certain country A is provided with content selected from the content belonging to the group allocated to the country A on that day.

Further, the control unit 412 of the server 410 may determine the content to be provided on the basis of the positional information and the time information together with the information on the liquid (coffee). For example, the control unit 412 of the server 410 can calculate a comparable numerical value by digitizing the information on the liquid (coffee), digitizing both the positional information and the time information, and performing arithmetic operations (e.g., four arithmetic operations) of these numerical values to determine the content to be provided. The positional information may be numerically applied in units of countries, such as 1 for Country A, 2 for Country B, and so on, or may be applied in units of regions (e.g., prefectures) in a country. In addition, the numerical value may be calculated by performing an arithmetic operation (for example, a four-law arithmetic operation (for example, simple addition of each numerical value)) on latitude and longitude.

[Example of Obtaining and Using Information on Drinks Other than Coffee]

In the above, an example has been described in which, when the extracted coffee is placed in a container or after the extracted coffee is placed in a container, the content is output using the information acquired regarding the extracted coffee. However, the first to fifth embodiments can be applied to beverages other than coffee. For example, the first to fifth embodiment can also be applied to various drinks such as black tea, Japanese tea (e.g., green tea, hojicha, genmai tea, sencha, bancha, gyokuro), Chinese tea (e.g., tochu tea, oolong tea), herbal tea, medicated tea, etc., as well as various drinks such as cocoa, hot chocolate, etc. For example, when a tea is extracted in a tea container (e.g., tea pot), when hot water poured into tea leaves is put into the tea container, or after hot water poured into tea leaves enters the tea container, the content can be output using information obtained regarding the hot water (tea) poured into the tea leaves. In this case, at least one of the above-mentioned sensors may be mounted on or near the teacup to obtain the above-mentioned information. In addition, the server 410 can hold management information for each type (category) of the beverage, perform each processing described above for each type (category) of the beverage, and perform content providing processing for each type (category) of the beverage. In this case, for example, the same content may be provided to the electronic device that has transmitted the information on the coffee and the electronic device that has transmitted the information on the tea. In addition, the server 410 can perform the above-described processes on the electronic device that has transmitted the information on the beverage, regardless of the type of the beverage, and can perform the content providing process. In this case, for example, the same determination processing, judgement processing, and the like can be performed for each electronic device that has transmitted information on different beverages, and different content can be provided.

Sixth Embodiment: An Example of Obtaining and Outputting Information on Drinks

In the above, an example has been described in which, when the extracted beverage is placed in a container or after the extracted beverage is placed in a container, the content is output using the information acquired with respect to the extracted beverage. However, when the extracted beverage is placed in a container, or after the extracted beverage is placed in a container, the information itself (or the information subjected to some processing (e.g., an amplification process of a sound) acquired with respect to the extracted beverage may be output. Therefore, in the 6 embodiment, an example is shown in which the information itself acquired with respect to the extracted beverage is output when the extracted beverage is placed in a container or after the extracted beverage is placed in a container.

As described above, in the prior art, various devices can be used to brew beverages according to individual preferences. In addition, it takes a certain amount of time to brew a beverage using various devices. Therefore, in the case of brewing (extracting) a beverage using various devices, if various information can be acquired at the timing of brewing the beverage and this information can be provided to a person who has brewed the beverage, it is considered that the enjoyment of brewing the beverage increases. Therefore, an object of the sixth embodiment is to provide an enjoyment of brewing a beverage.

Figure 41A:
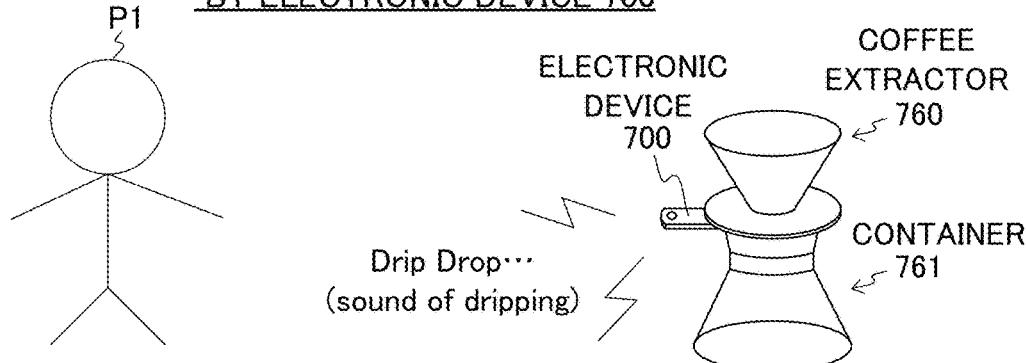
FIG. 41A is a diagram showing a simplified example of a case of outputting information acquired by the electronic device 700 in the sixth embodiment.
Figure 41B:
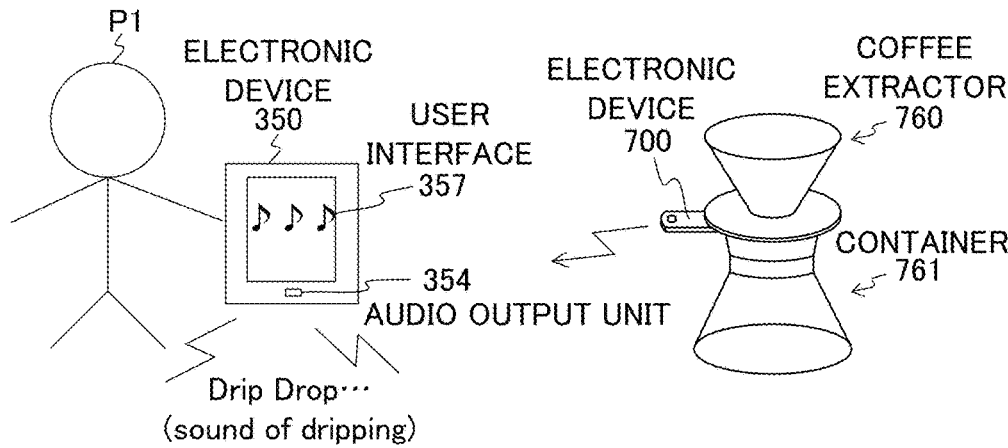
FIG. 41B is a diagram showing a simplified example of a case of outputting information acquired by the electronic device 700 in the sixth embodiment.
Figure 41C:
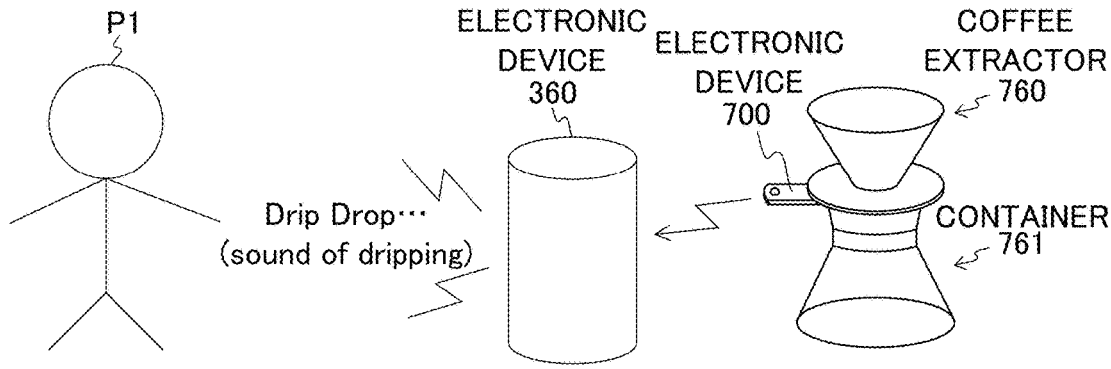
FIG. 41C is a diagram showing a simplified example of a case of outputting information acquired by the electronic device 700 in the sixth embodiment.

FIG. 41A to FIG. 41C is a simplified diagram showing an example of outputting information acquired by the electronic device 700 according to the sixth embodiment. Incidentally, the electronic device 700 corresponds to the electronic device 700 shown in FIG. 38A. Note that the electronic device 700 includes a communication unit, which corresponds to the communication unit 325 shown in FIG. 19.

FIG. 41A shows an example in the case of outputting the information acquired by the electronic device 700 from the electronic device 700. Incidentally, as shown in FIG. 38A, the electronic device 700 is provided with four sensors 701 to 704. Four sensors 701-704 are assumed to be, for example, sound sensors, image sensors, temperature sensors, and odor sensors.

For example, the control unit of the electronic device 700 can output the information acquired by each of the sensors 701 to 704 from the electronic device 700. For example, when the electronic device 700 includes an audio output unit, as shown in FIG. 41A, the sound generated at the time of extraction of coffee acquired by the sound sensor can be amplified and output. Thus, the user P1 brewing the coffee using the coffee extractor 760 can brew the coffee while hearing the sound generated while brewing the coffee, for example, the sound of the water drops of the coffee falling on the container being amplified. After brewing the coffee, the user P1 can enjoy the content based on the feature quantity acquired by the extraction while tasting the coffee.

For example, when the electronic device 700 includes a display unit, an image obtained by the image sensor at the time of extraction of coffee (the surface of the coffee in the container) can be displayed on the display unit. Thus, the user P1 brewing coffee using the coffee extractor 760 can brew the coffee while watching the transition during brewing the coffee, i.e., the transition of the surface of the coffee in the container. After brewing the coffee, the user P1 can enjoy the content on the basis of the feature quantity acquired by the extraction while tasting the coffee.

Further, for example, when the electronic device 700 includes the audio output unit and the display unit, the sound generated when the coffee is extracted acquired by the sound sensor can be amplified and output, and an image (the surface of the coffee in the container) at the time of coffee extraction acquired by the image sensor can be displayed on the display unit. The display of the value of the temperature at the time of coffee extraction acquired by the temperature sensor, the audio output, the display relating to the odor at the time of coffee extraction acquired by the odor sensor, the audio output may be made. As a result, the user P1 who is brewing coffee using the coffee extractor 760 can enjoy further extraction of coffee. The output can also be performed in the same manner when other sensors are used.

FIG. 41B shows an example in the case of outputting the information acquired by the electronic device 700 from another electronic device (electronic device 350). Incidentally, the example shown in FIG. 41B is the same as the example shown in FIG. 41A except that outputs the information acquired by the electronic device 700 from another electronic device (electronic device 350).

FIG. 41C shows an example in the case of outputting the information acquired by the electronic device 700 from another electronic device (electronic device 360). Incidentally, the example shown in FIG. 41C is the same as the example shown in FIG. 41A except that outputs the information acquired by the electronic device 700 from another electronic device (electronic device 360).

In the above description, an example has been described in which predetermined processing (for example, amplification of sound and generation of a display image (moving image)) is performed on information on extraction of coffee acquired by one or a plurality of sensors, and the processed information is output. However, it is also possible to perform predetermined processing (for example, amplification of sound and generation of a display image (moving image)) on information relating to extraction of coffee acquired by a plurality of sensors, and output the processed information as one information. For example, the information acquired by each sensor and the musical scale such as do re mi fa sol la si do may be converted into numerical values (e.g., 0, 1, 2, . . . ), and the information acquired by each sensor may be subjected to predetermined arithmetic processing, and the values calculated based on the arithmetic result may be sequentially applied to the numerical values of the musical scale and output as sound. For example, the percentage of black in a circular image is digitized (e.g., 0, 1, 2, . . . ) for image information acquired by an image sensor, the loudness of sound is digitized (e.g., 0, 1, 2, . . . ) for sound information acquired by a sound sensor, the temperature information acquired by a temperature sensor is converted (e.g., 0, 1, 2, . . . ) to a numerical value of temperature (or other numerical value), and the intensity of odor is digitized (e.g., 0, 1, 2, . . . ) for odor information acquired by an odor sensor. Next, predetermined arithmetic operations (e.g., four arithmetic operations) are performed on the numerical values calculated for each of these sensors, and numerical values for conversion to the scale are calculated. Next, the sound is output on the basis of the calculated numerical value (scale). The image output can also be performed on the basis of a value calculated based on the calculation result by performing a predetermined calculation process on the information acquired by each sensor. The sound output and the image output can also be grasped as an example of outputting the content on the basis of the information acquired by each sensor, as in the first to fifth embodiments. Each of these processes may be performed by another device and output by the other device. For example, as shown in FIG. 41B and FIG. 41C, information of coffee extraction acquired by a plurality of sensors may be sequentially transmitted to the electronic device 350, 360 over time, and each processing is to be done by the electronic device 350, 360, and the electronic device 350, 360 may output each information. Further, as shown in the fifth embodiment, information on extraction of coffee obtained by a plurality of sensors may be sequentially transmitted to the server 410 via the network 420, each process may be performed by the server 410, and output information based on the process may be sequentially received from the server 410 and output by the own device or another device.

As described above, each of the electronic devices 20, 220, 320, 350, 360, 431, 441, 442, 443, 451, 452, 660, 700, 710, 720, 725, 750, and the information processing device (e.g., the server 410) described in the first to sixth embodiments is an example of an information processing device, an information processing system, and a communication system that determine content (e.g., information unrelated to the beverage) on the basis of information acquired for the generated beverage (information acquired from the beverage) during beverage generation, during putting beverage into a container after beverage generation or after putting beverage into a container after beverage generation in the case that a beverage is produced by materials (for example, solid material, liquid material, solid material) and liquid and is put into a container.

Each of the electronic device 20, 220, 320, 350, 360, 431, 441, 442, 443, 451, 452, 660, 700, 710, 720, 725, and 750 and the information processing device (e.g., the server 410) described in the first to sixth embodiments is example of electronic devices, information processing devices, information processing systems, and communication systems that acquire and use information on a liquid that is stored in a container that stores a liquid that falls from an extraction device for extracting a beverage. For example, information about the liquid can be used to determine content to be provided to the user.

Further, the server 410 (or a plurality of devices constituting this) shown in the fifth embodiment is an example of an information processing device, an information processing system, and a communication system that obtain information (information acquired from the drink) for each drink contained in a plurality of containers and determine content to be provided to each person related to the plurality of containers (e.g., information unrelated to the beverage) on the basis of information acquired for the generated beverage (information acquired from the beverage) during beverage generation, during putting beverage into a container after beverage generation or after putting beverage into a container after beverage generation in the case that a beverage is produced by materials (for example, solid material, liquid material, solid material) and liquid and is put into a container.

Further, the server 410 (or a plurality of devices constituting this) shown in the 5 embodiment is an example of an information processing device, an information processing system, and a communication system which acquires information acquired regarding the extracted beverage for each beverage placed in a plurality of containers when the extracted beverage is placed in a container or after the extracted beverage is placed in a container, and determines the content to be provided to each person related to the plurality of containers on the basis of the acquired information.

Note that each of the control operations described in the first to sixth embodiments is executed on the basis of a program for causing a computer to execute each processing procedure, and each of the control operations can also be grasped as an invention of a method and a program. For example, the control operations described in the first to sixth embodiments can be realized by storing a program relating to the control operations described in the first to sixth embodiments in a storage medium of an information processing device such as an electronic device or a server, reading the program from the storage medium, and causing the information processing device to execute the read program. Further, the program may be stored in an external storage medium (e.g., a CD (Compact Disc), a DVD (Digital Versatile Disc), a memory card), or the like of the information processing device and used.

It should be noted that the first to sixth embodiments show an example for realizing the invention described in the claims, and are not limited thereto, and various modifications can be made within a range not deviating from the gist thereof.

DESCRIPTION OF SYMBOLS 1, 200, 600, 610, 620, 630, 640, 650 Coffee extractor
10, 210, 601, 611, 621, 631, 641, 651 Dripper
11, 211 Storage portion
12, 212 Flange portion
20, 220, 320, 350, 360, 431, 441, 442, 443, 451, 452, 660, 700, 710,
720, 725, 750 electronic device
21, 221, 321, 481 Lens
22, 222, 322, 482 Image acquisition unit
23, 223, 323, 352, 412, 483 Control section
24, 224, 324, 353, 413, 484 Storage unit
25, 225, 354, 361, 485 Sound output unit
30, 603, 613, 623, 633, 643, 652 Container
213 Exit
226, 355, 486 Input section
227, 356, 487 Display part
229, 357, 488 User interface
240, 602, 612, 622, 632, 642 Stand
325, 351, 411 Communication Department
358 positional information acquisition unit
400 Communication system
410 Server
420 Network
490 positional information setting unit
604, 614, 624, 634, 644, 661 Sensor
653 Installation table

The invention claimed is:

1. An electronic device for a beverage-making device working with a container, the electronic device comprising:
an image acquisition unit having an image sensor, configured to acquire a plurality of images of a beverage that is held in the container while the beverage is being made in the beverage-making device, the plurality of images having a temporal order; and
a controller configured to
process each of the plurality of images to obtain a feature quantity, which is a quantity of an image feature for said each image, the plurality of feature quantities being in the temporal order, and
determine, in accordance with the plurality of feature quantities in the temporal order, an audio and/or visual content to be outputted.

2. The electronic device according to claim 1, wherein each of the plurality of images is an image of a surface of the beverage held in the container.

3. The electronic device according to claim 2, wherein the image feature includes at least one of a color or a pattern, and
the pattern includes a pattern corresponding to a bubble appearing on the surface of the beverage.

4. The electronic device according to claim 1, wherein the beverage-making device further includes a dripper through which the beverage is dripped into the container, and
the electronic device is integrally formed with the dripper.

5. The electronic device according to claim 1, wherein the beverage-making device further includes a dripper through which the beverage is dripped into the container, and
the electronic device is configured to be removably attached to the dripper.

6. The electronic device according to claim 1, wherein the beverage-making device further includes a dripper through which the beverage is dripped into the container, and
the electronic device is configured to be disposed between the dripper and the container.

7. The electronic device according to claim 2, wherein the image acquisition unit further includes a lens that faces the surface of the beverage held in the container.

8. The electronic device according to claim 1, wherein the beverage-making device further includes a dripper through which the beverage is dripped into the container, and
the electronic device is integrally formed with a stand for supporting the dripper.

9. The electronic device according to claim 1, wherein the audio and/or visual content is outputted through an output unit, which is provided in the electronic device or separately from the electronic device.

10. An electronic device for a beverage-making device working with a container, the electronic device comprising:
an image acquisition unit having an image sensor, configured to acquire a plurality of images of a beverage that is held in the container while the beverage is being made in the beverage-making device, the plurality of images having a temporal order; and
a controller configured to
process each of the plurality of images to obtain a feature quantity, which is an quantity of an image feature for said each image, the plurality of feature quantities being in the temporal order, and
determine, in accordance with the plurality of feature quantities in the temporal order, an audio and/or visual content to be outputted, the audio and/or visual content including information other than the beverage or the making of the beverage.

11. The electronic device according to claim 10, wherein the beverage-making device further includes a dripper through which the beverage is dripped into the container, and
the electronic device is integrally formed with the dripper.

12. The electronic device according to claim 10, wherein the beverage-making device further includes a dripper through which the beverage is dripped into the container, and
the electronic device is configured to be removably attached to the dripper.

13. The electronic device according to claim 10, wherein the beverage-making device further includes a dripper through which the beverage is dripped into the container, and
the electronic device is configured to be disposed between the dripper and the container.

14. The electronic device according to claim 10, wherein each of the plurality of images is an image of a surface of the beverage held in the container, and
the image acquisition unit further includes a lens that faces the surface of the beverage held in the container.

15. The electronic device according to claim 10, wherein the beverage-making device further includes a dripper through which the beverage is dripped into the container, and
the electronic device is integrally formed with a stand for supporting the dripper.

16. The electronic device according to claim 10, wherein the audio and/or visual content is outputted through an output unit that is provided in the electronic device or separately from the electronic device.

* * * * *